US012042101B2

(12) United States Patent
Yoo et al.

(10) Patent No.: US 12,042,101 B2
(45) Date of Patent: Jul. 23, 2024

(54) DRYING APPARATUS AND RELATED METHODS

(71) Applicant: LG ELECTRONICS INC., Seoul (KR)

(72) Inventors: Hyun sun Yoo, Seoul (KR); Seung Yup Lee, Seoul (KR); Sang Yoon Lee, Seoul (KR); Byung Soo Oh, Seoul (KR); Hyun-Joo Jeon, Seoul (KR); So Ra Cheon, Seoul (KR); Ji sun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 989 days.

(21) Appl. No.: 17/014,655

(22) Filed: Sep. 8, 2020

(65) Prior Publication Data

US 2021/0290000 A1    Sep. 23, 2021

Related U.S. Application Data

(60) Provisional application No. 62/992,138, filed on Mar. 19, 2020.

(30) Foreign Application Priority Data

Apr. 29, 2020  (KR) .......................... 10-2020-0052545

(51) Int. Cl.
*A47K 10/48* (2006.01)
*F24H 9/20* (2022.01)
(Continued)

(52) U.S. Cl.
CPC ........... *A47K 10/48* (2013.01); *F24H 9/2071* (2013.01); *F24H 15/254* (2022.01); *F24F 8/22* (2021.01);
(Continued)

(58) Field of Classification Search
CPC ...... A47K 10/48; A47K 3/281; B01D 5/0027; B01D 5/0042; B01D 5/0072; B01D 5/009;
(Continued)

(56) References Cited

U.S. PATENT DOCUMENTS 1,381,002 A * 6/1921 O'Neil ..................... B01D 5/00
                                           261/DIG. 27
1,634,931 A * 7/1927 Cole ..................... F26B 21/086
                                           55/434.1
(Continued)

FOREIGN PATENT DOCUMENTS

CN   101686780 A   3/2010
CN   108095625 A   6/2018
(Continued)

*Primary Examiner* — Jorge A Pereiro
*Assistant Examiner* — Bao D Nguyen
(74) *Attorney, Agent, or Firm* — Bryan Cave Leighton Paisner LLP

(57) ABSTRACT

A forced airflow drying apparatus includes a body including a pair of air inlets to receive inlet air which is channeled to an upstream side of a filter unit, a pair of body airflow generators to generate a first forced airflow, each body airflow generator having a first end and a second end, where the first end of each body airflow generator is opened to a downstream side of the filter unit, a pair of thermoelectric devices configured to control a temperature of the first forced airflow, and a first air outlet, in communication with the second end of each body airflow generator, to receive the forced airflow from the body airflow generators and to expel the forced airflow out of the body. The forced airflow drying apparatus further includes a bar and a drive apparatus configured to movably drive the bar relative to the body, the bar including a second pair of airflow generators to generate a second forced airflow, a pair of resistance heaters to control a temperature of the second forced airflow prior to being (Continued)

expelled from the second air outlet, and a second air outlet to expel the second forced airflow from the bar.

20 Claims, 60 Drawing Sheets

(51) Int. Cl.
*F24H 15/254* (2022.01)
*F24F 8/22* (2021.01)
*F24H 15/176* (2022.01)
*F24H 15/20* (2022.01)
*F24H 15/265* (2022.01)
*F24H 15/33* (2022.01)
*F24H 15/345* (2022.01)
*F24H 15/37* (2022.01)

(52) U.S. Cl.
CPC ............ *F24H 15/176* (2022.01); *F24H 15/20* (2022.01); *F24H 15/265* (2022.01); *F24H 15/33* (2022.01); *F24H 15/345* (2022.01); *F24H 15/37* (2022.01)

(58) Field of Classification Search
CPC ....... A61L 9/20; D06F 58/206; E03C 1/0408; F26B 3/04; B60S 3/002; F24H 15/254; F24H 15/37; F24H 15/265; F24H 15/345; F24H 15/20; F24H 15/33; F24H 15/176; F24H 9/2071; F24F 8/22
See application file for complete search history.

(56) References Cited

U.S. PATENT DOCUMENTS

| | | | | |
|---|---|---|---|---|
| 1,918,927 A * | 7/1933 | Werner | ........... | A47K 10/48 454/305 |
| 2,218,596 A * | 10/1940 | Ashley | ........... | F25B 40/02 62/239 |
| 2,248,618 A * | 7/1941 | Fischer | ........... | A61L 2/10 34/275 |
| 2,289,035 A * | 7/1942 | Neeson | ........... | F24F 1/02 62/262 |
| 2,328,045 A * | 8/1943 | Worthen | ........... | F22D 1/32 165/113 |
| 2,448,834 A * | 9/1948 | Rousseau | ........... | B60S 3/002 15/316.1 |
| 2,501,280 A * | 3/1950 | Kemp | ........... | F24F 3/1411 96/111 |
| 2,627,669 A * | 2/1953 | Candor | ........... | D06F 58/206 62/331 |
| 2,904,894 A * | 9/1959 | Hurst | ........... | B60S 3/002 34/524 |
| 2,963,744 A * | 12/1960 | Cooper | ........... | B01D 39/1615 264/296 |
| 3,064,358 A * | 11/1962 | Giuffre | ........... | D06F 58/206 62/93 |
| 3,085,351 A * | 4/1963 | Hurst | ........... | B60S 3/002 134/45 |
| 3,090,490 A * | 5/1963 | Yocum | ........... | F25B 43/003 210/DIG. 6 |
| 3,128,161 A * | 4/1964 | Hudon | ........... | A47K 10/48 34/233 |
| 3,143,471 A * | 8/1964 | Coady | ........... | F26B 5/06 206/524.4 |
| 3,190,011 A * | 6/1965 | Sheilds | ........... | D06F 43/086 34/607 |
| 3,279,093 A * | 10/1966 | Dutton | ........... | B60S 3/002 417/361 |
| 3,362,456 A * | 1/1968 | King, Jr. | ........... | A23L 2/10 261/118 |
| 3,375,592 A * | 4/1968 | Heinicke | ........... | B60S 3/002 34/236 |
| 3,442,027 A * | 5/1969 | Hurwitz | ........... | B60S 3/002 34/571 |
| 3,442,092 A * | 5/1969 | Pratt | ........... | F24F 13/224 62/262 |
| 3,449,838 A * | 6/1969 | Chancellow, Jr. | ........... | A45D 20/16 34/233 |
| 3,464,186 A * | 9/1969 | Walker | ........... | B01D 53/26 96/115 |
| 3,583,686 A * | 6/1971 | Mackey | ........... | B60S 3/002 432/189 |
| 3,603,002 A * | 9/1971 | Spierer | ........... | A47K 10/48 338/230 |
| 3,613,255 A * | 10/1971 | Capra | ........... | B60S 3/002 34/570 |
| 3,621,199 A * | 11/1971 | Goldstein | ........... | A61F 7/0085 165/126 |
| 3,739,487 A * | 6/1973 | Clark | ........... | D06F 58/206 34/77 |
| 3,766,397 A * | 10/1973 | Rockson | ........... | A47K 10/48 34/202 |
| 3,805,410 A * | 4/1974 | Rupp | ........... | B60S 3/002 34/233 |
| 3,808,703 A * | 5/1974 | Kamiya | ........... | B60S 3/002 15/316.1 |
| 3,878,621 A * | 4/1975 | Duerre | ........... | A45D 20/16 392/363 |
| 3,965,494 A * | 6/1976 | Baker | ........... | B05B 7/066 4/615 |
| 4,112,590 A * | 9/1978 | Muller | ........... | D06F 58/24 34/77 |
| 4,154,003 A * | 5/1979 | Muller | ........... | D06F 58/24 34/469 |
| 4,180,988 A * | 1/1980 | Forte | ........... | F25B 13/00 62/474 |
| 4,255,940 A * | 3/1981 | Grahl | ........... | F25B 43/003 62/324.3 |
| 4,335,526 A * | 6/1982 | Smith | ........... | B60S 3/002 239/587.5 |
| 4,393,602 A * | 7/1983 | Smith | ........... | B60S 3/002 15/316.1 |
| 4,594,797 A * | 6/1986 | Houck, Jr. | ........... | A01K 13/001 34/233 |
| 4,621,438 A * | 11/1986 | Lanciaux | ........... | D06F 58/06 34/604 |
| 4,685,222 A * | 8/1987 | Houck, Jr. | ........... | A47K 10/48 34/667 |
| 4,701,594 A * | 10/1987 | Powell | ........... | A45D 20/16 34/667 |
| 4,707,933 A * | 11/1987 | Keck | ........... | A47K 10/48 34/241 |
| 4,756,094 A * | 7/1988 | Houck, Jr. | ........... | A47K 10/48 34/523 |
| 4,780,595 A * | 10/1988 | Alban | ........... | A47K 10/48 392/364 |
| 4,785,162 A * | 11/1988 | Kuo | ........... | F24H 3/0405 392/382 |
| 4,809,392 A * | 3/1989 | Larson | ........... | B60S 3/002 15/312.1 |
| 4,857,705 A * | 8/1989 | Blevins | ........... | A47K 10/48 200/81.9 R |
| 4,949,423 A * | 8/1990 | Larson | ........... | B60S 3/002 15/316.1 |
| 4,961,272 A * | 10/1990 | Lee | ........... | A47K 10/48 34/239 |
| 5,003,705 A * | 4/1991 | Lee | ........... | A47K 10/48 34/90 |
| 5,042,171 A * | 8/1991 | Obata | ........... | D06F 58/24 34/604 |
| 5,099,587 A * | 3/1992 | Jarosch | ........... | A47K 10/48 392/371 |
| 5,103,577 A * | 4/1992 | Michaels | ........... | A47K 10/48 34/91 |
| 5,119,640 A * | 6/1992 | Conrad | ........... | B01D 7/02 55/440 |
| 5,184,369 A * | 2/1993 | McElroy | ........... | B60S 3/002 15/316.1 |

(56) References Cited

U.S. PATENT DOCUMENTS

| | | | | |
|---|---|---|---|---|
| 5,187,881 A * | 2/1993 | McElroy | ............... | B60S 3/002 15/316.1 |
| 5,269,071 A * | 12/1993 | Hamabe | ............... | A47K 10/48 34/554 |
| 5,334,230 A * | 8/1994 | Sloka | ............... | B60T 17/004 96/144 |
| 5,367,739 A * | 11/1994 | Johnson | ............... | F26B 21/028 15/316.1 |
| 5,397,606 A * | 3/1995 | Jeffs | ............... | F26B 5/14 118/63 |
| 5,404,419 A * | 4/1995 | Artis, Jr. | ............... | F26B 9/003 392/382 |
| 5,427,077 A * | 6/1995 | Gilbert | ............... | F02M 17/22 261/107 |
| 5,432,974 A * | 7/1995 | Yasutake | ............... | B60S 3/06 134/123 |
| 5,454,136 A * | 10/1995 | Gougoulas | ............... | B60S 3/002 15/312.1 |
| 5,572,799 A * | 11/1996 | Masuyuki | ............... | F24F 3/1423 34/80 |
| 5,651,189 A * | 7/1997 | Coykendall | ............... | F26B 21/001 34/91 |
| 5,752,326 A * | 5/1998 | Trim | ............... | A47K 10/48 34/267 |
| 5,823,447 A * | 10/1998 | Maybach | ............... | B05B 1/048 239/596 |
| 5,860,437 A * | 1/1999 | Fernie | ............... | E03C 1/057 134/104.1 |
| 5,875,565 A * | 3/1999 | Bowman | ............... | B60S 3/002 34/666 |
| 5,930,912 A * | 8/1999 | Carder | ............... | A47K 10/48 34/90 |
| 5,974,685 A * | 11/1999 | Hironaka | ............... | A47K 10/48 62/3.4 |
| 6,021,584 A * | 2/2000 | Schwartz | ............... | F26B 21/004 34/666 |
| 6,047,416 A * | 4/2000 | Carrier | ............... | A47K 3/28 4/596 |
| 6,076,271 A * | 6/2000 | Kobayashi | ............... | F26B 21/086 34/79 |
| 6,094,835 A * | 8/2000 | Cromer | ............... | D06F 58/206 62/271 |
| 6,123,503 A * | 9/2000 | Belanger | ............... | F04D 29/441 415/212.1 |
| 6,148,539 A * | 11/2000 | Hatfield | ............... | A47K 10/48 34/223 |
| 6,154,916 A * | 12/2000 | Ayers | ............... | B60S 3/002 15/312.1 |
| 6,189,230 B1 * | 2/2001 | Huen | ............... | A47K 10/06 34/210 |
| 6,349,484 B1 * | 2/2002 | Cohen | ............... | A47K 10/48 34/233 |
| 6,422,729 B1 * | 7/2002 | Rohrbach | ............... | F21S 45/33 362/547 |
| 7,028,416 B1 * | 4/2006 | Dobie | ............... | B60S 3/002 34/666 |
| 7,093,374 B2 * | 8/2006 | Yang | ............... | D06F 73/02 34/607 |
| 7,900,371 B1 * | 3/2011 | Bullard | ............... | A47K 10/48 34/235 |
| 8,112,899 B1 * | 2/2012 | Duckworth | ............... | A47K 10/48 34/526 |
| 8,613,147 B2 * | 12/2013 | McElroy | ............... | F26B 21/004 34/232 |
| 9,101,251 B1 * | 8/2015 | Moorhouse | ............... | A47K 10/48 |
| 9,638,463 B2 * | 5/2017 | Cross | ............... | F24H 15/265 |
| 9,790,638 B2 * | 10/2017 | Song | ............... | D06F 58/10 |
| 9,943,211 B2 * | 4/2018 | Noriega | ............... | A47L 15/22 |
| 10,455,992 B2 * | 10/2019 | Satermo | ............... | A47K 10/48 |
| 10,582,815 B1 * | 3/2020 | Josey | ............... | A47K 10/48 |
| 11,259,672 B1 * | 3/2022 | Henry | ............... | A47K 10/48 |
| 11,305,032 B2 * | 4/2022 | Ellis | ............... | A62B 18/08 |
| 2003/0234100 A1 * | 12/2003 | Ross | ............... | A47K 10/48 62/331 |
| 2004/0172847 A1 * | 9/2004 | Saida | ............... | A45D 20/12 34/96 |
| 2004/0200089 A1 * | 10/2004 | Melendrez | ............... | A47K 10/48 34/90 |
| 2004/0213559 A1 * | 10/2004 | Schafer | ............... | A47K 10/48 392/382 |
| 2005/0066538 A1 * | 3/2005 | Goldberg | ............... | D06F 58/206 34/218 |
| 2005/0086735 A1 * | 4/2005 | Lim | ............... | A47K 3/32 4/596 |
| 2005/0086824 A1 * | 4/2005 | Ono | ............... | D06F 58/206 34/62 |
| 2006/0021248 A1 * | 2/2006 | Symons | ............... | A47K 10/48 34/283 |
| 2006/0117593 A1 * | 6/2006 | Ahn | ............... | D06F 58/206 34/607 |
| 2006/0130354 A1 * | 6/2006 | Choi | ............... | D06F 58/34 34/73 |
| 2006/0242856 A1 * | 11/2006 | Kim | ............... | D06F 58/30 34/73 |
| 2007/0039200 A1 * | 2/2007 | Hwang | ............... | D06F 34/26 34/474 |
| 2008/0034607 A1 * | 2/2008 | Ahn | ............... | D06F 58/206 34/130 |
| 2008/0034608 A1 * | 2/2008 | Ahn | ............... | D06F 58/206 34/108 |
| 2008/0052950 A1 * | 3/2008 | Park | ............... | D06F 39/125 34/524 |
| 2008/0216338 A1 * | 9/2008 | Doyle | ............... | B60S 3/002 34/443 |
| 2008/0235977 A1 * | 10/2008 | Kuwabara | ............... | D06F 58/206 134/105 |
| 2008/0253754 A1 * | 10/2008 | Rubin | ............... | A47K 10/48 392/381 |
| 2008/0285963 A1 * | 11/2008 | Hendrikse | ............... | A47K 10/48 392/380 |
| 2008/0289209 A1 * | 11/2008 | Han | ............... | D06F 58/206 34/74 |
| 2009/0038178 A1 * | 2/2009 | Ahn | ............... | D06F 58/24 165/181 |
| 2009/0113740 A1 * | 5/2009 | Grunert | ............... | D06F 58/206 34/82 |
| 2009/0178297 A1 * | 7/2009 | Charpie | ............... | F26B 21/004 34/80 |
| 2009/0178442 A1 * | 7/2009 | Kawabata | ............... | D06F 39/083 68/20 |
| 2009/0235554 A1 * | 9/2009 | MacNeil | ............... | B60S 3/002 34/524 |
| 2009/0260385 A1 * | 10/2009 | Hill | ............... | E03B 3/28 62/291 |
| 2010/0018588 A1 * | 1/2010 | Lee | ............... | E03C 1/0408 4/612 |
| 2010/0024241 A1 | 2/2010 | Cannetti | | |
| 2010/0050462 A1 * | 3/2010 | Attonito | ............... | A47K 10/48 34/201 |
| 2010/0101110 A1 * | 4/2010 | Lee | ............... | A47K 10/48 34/565 |
| 2010/0192397 A1 * | 8/2010 | Kim | ............... | F26B 21/086 34/201 |
| 2010/0264096 A1 * | 10/2010 | Ince | ............... | B01F 23/49 210/749 |
| 2011/0056220 A1 * | 3/2011 | Caggiano | ............... | B01D 53/002 219/757 |
| 2011/0226873 A1 * | 9/2011 | Bronstein | ............... | E03C 1/046 239/289 |
| 2011/0252968 A1 * | 10/2011 | Mäkinen | ............... | B01D 45/12 55/419 |
| 2012/0011739 A1 * | 1/2012 | Nakamura | ............... | A47K 10/48 34/523 |
| 2012/0042534 A1 * | 2/2012 | Martin | ............... | A47K 3/281 34/443 |
| 2012/0137536 A1 * | 6/2012 | Del Pos | ............... | D06F 58/16 34/108 |

(56) References Cited

U.S. PATENT DOCUMENTS

| | | | | |
|---|---|---|---|---|
| 2012/0159972 | A1* | 6/2012 | Haryanto | F24F 13/1406 62/132 |
| 2012/0167404 | A1* | 7/2012 | Hartoka | D06F 58/206 34/76 |
| 2012/0204577 | A1* | 8/2012 | Ludwig | G06F 1/20 62/3.3 |
| 2013/0025149 | A1* | 1/2013 | Farousi | A47K 10/48 34/88 |
| 2013/0055588 | A1* | 3/2013 | Nakamura | A47K 10/48 34/565 |
| 2013/0055743 | A1* | 3/2013 | Ogasawara | B60H 1/321 62/159 |
| 2013/0232813 | A1* | 9/2013 | Heo | F26B 21/086 34/515 |
| 2014/0000849 | A1* | 1/2014 | Hermann | A47L 15/483 165/104.19 |
| 2014/0041249 | A1* | 2/2014 | Jung | F26B 23/001 34/282 |
| 2014/0144036 | A1* | 5/2014 | Caldeira | D06F 58/206 34/86 |
| 2014/0223759 | A1* | 8/2014 | Gougoulas | F26B 5/00 34/90 |
| 2014/0291412 | A1* | 10/2014 | Henson | B05B 7/1606 239/548 |
| 2014/0366397 | A1* | 12/2014 | Wakizaka | D06F 58/206 34/524 |
| 2015/0068057 | A1* | 3/2015 | Pihlblad | F26B 25/06 34/245 |
| 2015/0274134 | A1* | 10/2015 | Turner | B05B 7/00 239/543 |
| 2016/0100720 | A1* | 4/2016 | Holguin | A47K 10/48 34/90 |
| 2016/0146513 | A1* | 5/2016 | Lee | F24F 3/1423 62/271 |
| 2016/0168777 | A1* | 6/2016 | Bison | D06F 58/206 62/238.7 |
| 2016/0302629 | A1* | 10/2016 | Casla Arruiz | F26B 21/004 |
| 2017/0175320 | A1* | 6/2017 | Masters | D06F 58/30 |
| 2017/0191215 | A1* | 7/2017 | Yoon | D06F 58/24 |
| 2017/0240142 | A1* | 8/2017 | Belanger | B60S 3/002 |
| 2018/0064298 | A1* | 3/2018 | Bullock | A47K 10/48 |
| 2019/0099050 | A1* | 4/2019 | Kirschman | A61L 9/20 |
| 2019/0153658 | A1* | 5/2019 | Je | D06F 58/206 |
| 2019/0298111 | A1* | 10/2019 | Wu | A47K 3/281 |
| 2020/0046178 | A1* | 2/2020 | Wright | F24H 3/0417 |
| 2020/0079328 | A1* | 3/2020 | Stephens, Jr. | F26B 3/04 |
| 2020/0085251 | A1* | 3/2020 | Youn | A45D 20/12 |
| 2020/0085262 | A1* | 3/2020 | Youn | A45D 20/14 |
| 2020/0305660 | A1* | 10/2020 | Benvenisti | A47K 10/48 |
| 2021/0137324 | A1* | 5/2021 | Verheul | F04D 25/0673 |
| 2021/0153698 | A1* | 5/2021 | Lo | B05B 13/0415 |
| 2021/0254266 | A1* | 8/2021 | Jung | D06F 58/50 |
| 2021/0353113 | A1* | 11/2021 | Soria Santos | A47K 10/48 |
| 2021/0369881 | A1* | 12/2021 | Hayden | A61L 2/0023 |
| 2022/0053906 | A1* | 2/2022 | Gale | A47K 10/48 |
| 2023/0279606 | A1* | 9/2023 | Shin | A61L 9/20 34/73 |

FOREIGN PATENT DOCUMENTS

| | | | |
|---|---|---|---|
| CN | 108514359 A | 9/2018 | |
| CN | 108784477 A * | 11/2018 | A47K 10/48 |
| CN | 108852101 A | 11/2018 | |
| JP | 03109593 U | 11/1991 | |

* cited by examiner

DRYING APPARATUS AND RELATED METHODS

FIELD OF THE DISCLOSURE

This application claims the benefit and priority to U.S. Provisional Application No. 62/992,138, filed on Mar. 19, 2020, and Korean Application No. 10-2020-0052545, filed on Apr. 29, 2020, all of which are hereby incorporated by reference in their entirety for all purposes as if fully set forth herein.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Regular showering or bathing are commonplace activities across modern society. In many cultures, a shower bath is taken on a daily basis. People may even wash more than once a day, for example, where they have done some form of exercise during the day.

As a result of washing, or also due to perspiration, a person may become wet. Drying of this moisture is important to a person's health in order to prevent bacterial and fungal growth on the person.

Given the right environment, such moisture may evaporate away on its own, but for expediency and comfort, most people towel themselves dry following washing or exercise. Toweling can be a good way to remove water from a person, but drying effectively to prevent bacterial and fungal growth—particularly around the feet—can be time consuming thus such areas may commonly be inadequately dried. Towel drying of hair, particularly for those with long hair, can additionally be a frustrating and involved process.

Aside from any issues with the use of towels to desirably dry a person, the number towels used and frequency of their use means that towels account for a significant proportion of total laundry loads. This is particularly the case in settings where towels are only used once, such as in gyms, sports clubs, and commonly in hotels.

Laundering of towels is energy intensive, and consumption of fresh water is also of concern from an environmental point of view. The depletion of fresh water resources is known to be a widespread issue across many parts of the world. The number of towels washed and frequency with which they are commonly washed consumes significant amounts of water resources.

Additionally, the drying apparatus described herein may be operated in a wet environment, such as a bathroom or a shower booth. Additionally, water may be splashed onto the drying apparatus while a user is drying themselves. Thus, the drying apparatus and/or the bathroom and/or the shower booth may become wet during use. Stagnant dirty water may cause an unpleasant odor and may cause germs to propagate resulting in a health risk.

It is desired to address or ameliorate one or more of the problems discussed above by providing a drying apparatus to at least provide the public with a useful alternative.

While certain aspects of conventional technologies have been discussed to facilitate the disclosure, Applicants in no way disclaim these technical aspects, and it is contemplated that the claimed invention may encompass or include one or more of the conventional technical aspects discussed herein.

SUMMARY

The present disclosure seeks to address one or more of the above-mentioned issues by providing apparatus and methods that improve health and hygiene, as well as have a positive impact on the environment. For instance, the apparatus and methods of the present disclosure provide for the efficient and effective drying of the person, or parts of the person, that diminishes or eliminates reliance upon towels.

It should be understood that, unless expressly stated otherwise, the claimed invention comprehends any and all combinations of the individual features, arrangements and/or steps detailed herein, including but not limited to those features, arrangements and/or steps set forth in the appended claims.

The disclosure describes a forced airflow drying apparatus comprising a body including a pair of air inlets to receive inlet air which is channeled to an upstream side of a filter unit, a pair of body airflow generators to generate a first forced airflow, each body airflow generator having a first end and a second end, where the first end of each body airflow generator is opened to a downstream side of the filter unit, a pair of thermoelectric devices configured to control a temperature of the first forced airflow, and a first air outlet, in communication with the second end of each body airflow generator, to receive the forced airflow from the body airflow generators and to expel the forced airflow out of the body. The forced airflow drying apparatus further comprises a bar and a drive apparatus configured to movably drive the bar relative to the body, the bar including a second pair of airflow generators to generate a second forced airflow, a pair of resistance heaters to control a temperature of the second forced airflow prior to being expelled from the second air outlet, and a second air outlet to expel the second forced airflow from the bar.

As used herein the term "and/or" means "and" or "or", or both.

As used herein "(s)" following a noun means the plural and/or singular forms of the noun.

For the purposes of this specification, the term "plastic" shall be construed to mean a general term for a wide range of synthetic or semisynthetic polymerization products, and includes hydrocarbon-based polymer(s).

For the purpose of this specification, where method steps are described in sequence, the sequence does not necessarily mean that the steps are to be chronologically ordered in that sequence, unless there is no other logical manner of interpreting the sequence, or expressly stated.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Other aspects of the embodiments of the invention may become apparent from the following description which is given by way of example only and with reference to the accompanying drawings.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

Preferred embodiments or aspects of the invention will be described by way of example only and with reference to the drawings, in which.

DETAILED DESCRIPTION OF PREFERRED EMBODIMENTS

Reference is made in detail to one or more embodiments of the present invention, examples of which are illustrated in the accompanying drawings.

A drying apparatus may be provided according to the disclosure for a range of applications. In at least a primary application, the drying apparatus may be a dryer for drying a person, such as following bathing or showering. The drying apparatus may be provided as a supplement to towel drying, or in various preferred forms may be provided as a substitute for towel drying. By the use of the drying apparatus as a body dryer, a person may present themselves and be dried by one or more forced airflows of the drying apparatus.

Figure 1:
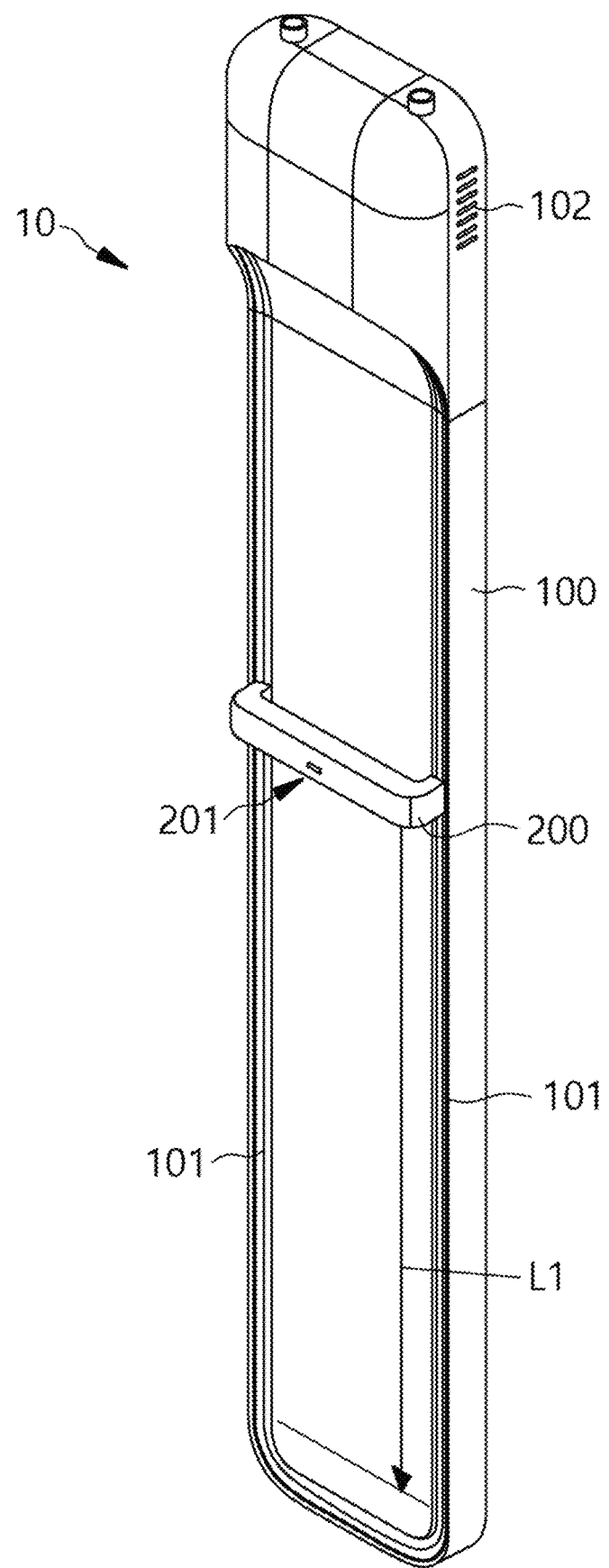
FIG. 1 is a perspective view of a drying apparatus according to an embodiment of the present invention.
Figure 2:
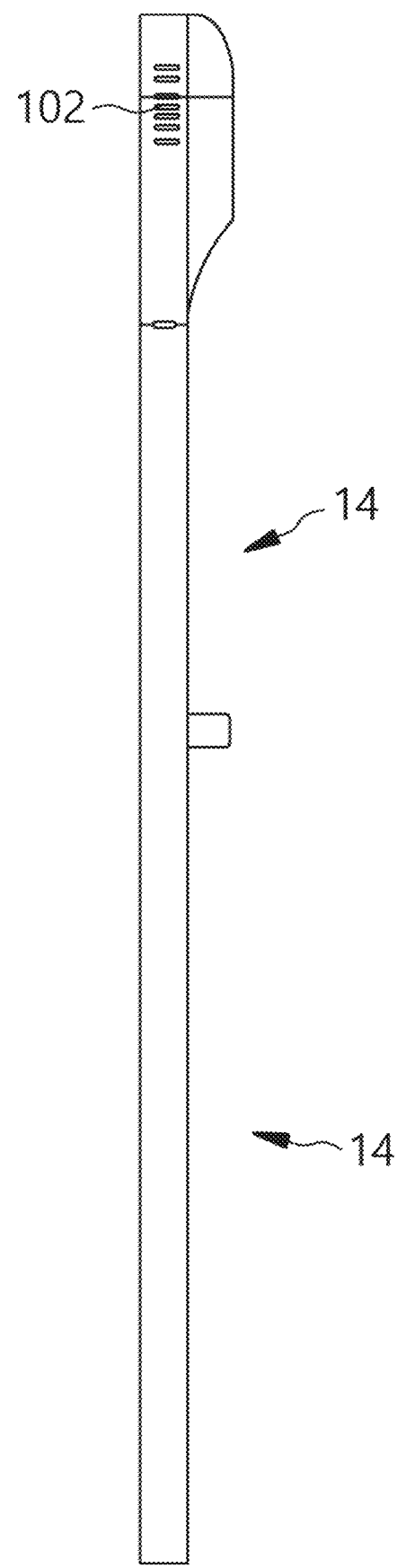
FIG. 2 is a side view of the drying apparatus according to the embodiment of FIG. 1.
Figure 3:
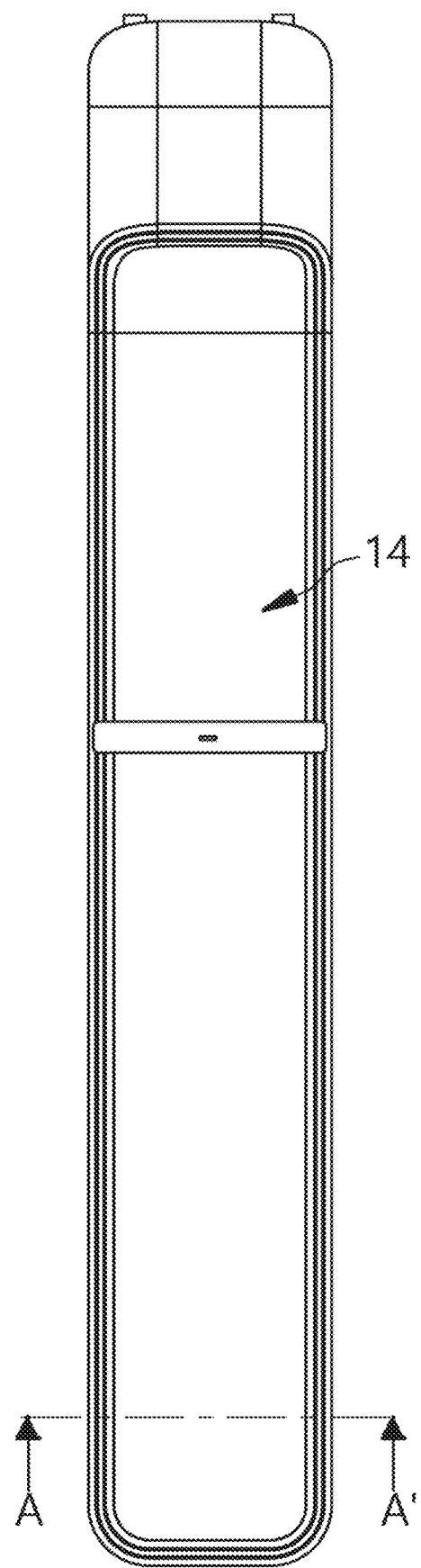
FIG. 3 is a front view of the drying apparatus according to the embodiment of FIG. 1.

FIG. 1 is a perspective view of a drying apparatus according to an embodiment of the present invention; FIG. 2 is a side view of the drying apparatus; and FIG. 3 is a front view of the drying apparatus.

Referring to FIG. 1, a drying apparatus 10 may comprise a body 100 and a bar 200. While the term "bar" is used, "bar" should not be construed as being limited to a bar shape but may have various kinds of shapes according a design criteria or an intended result. The bar 200 may be supported by the body 100, and may be moveable relative to the body 100. The bar 200 may be driven relative to the body 100 by a drive apparatus, as will be explained in greater detail herein.

The drying apparatus 10 may be sized so as to correspond to human body dimensions. For example, in the configuration of the drying apparatus as shown in FIG. 1, the drying apparatus 10, and in particular the body 100, may be sized in proportion to human body dimensions to enable the delivery of the forced airflow across the human body.

The forced airflow may be provided through a first air outlet 101 distributed along a periphery of the body 100. The forced airflow may also be provided through a second air outlet 201 located at the bar 200. Unlike the first air outlet 101 which is stationary with respect to the body 100, the second air outlet 201 moves as the bar 200 travels along a longitudinal length L1 of the body 100 to expel forced airflow to different parts of the human body.

The body 100 may define a drying side or face 14 adjacent to which a user may present themselves for drying by the drying apparatus 10. The drying face 14 may generally define a face or plane from which the forced airflow is provided by the drying apparatus 10 through the first air outlet 101 and/or the second air outlet 201. For example, FIG. 2 shows a side view and FIG. 3 shows a front view of such a drying face 14.

For example, when the drying apparatus 10 is to be provided within a confined space, such as a bathroom, it may be desirable that a minimum of space is taken up by the drying apparatus 10, and perhaps, be aesthetically pleasing. To this end, the portion including the drying face 14 of the body 100 may be provided having a low profile, such as is seen in the side view of FIG. 2. This low profile may provide for a slim look.

To achieve this low profile, at least some internal components of the body 100 which are bulky may be distributed toward an upper region of the body 100 (in the vicinity of the air inlets 102 shown in FIG. 2), so as not to interfere with the low profile of the portion having the drying face 14. The upper region of the body 100 may be at or above the head of a user. The upper region may include the bulky components such as flow generators, thermoelectric devices, flow guides, and the like. In an alternative embodiment, the internal components of the body 100 may be distributed toward a lower region of the body 100 (not shown) providing for an upper region of the body to have a minimized depth.

Figure 4:
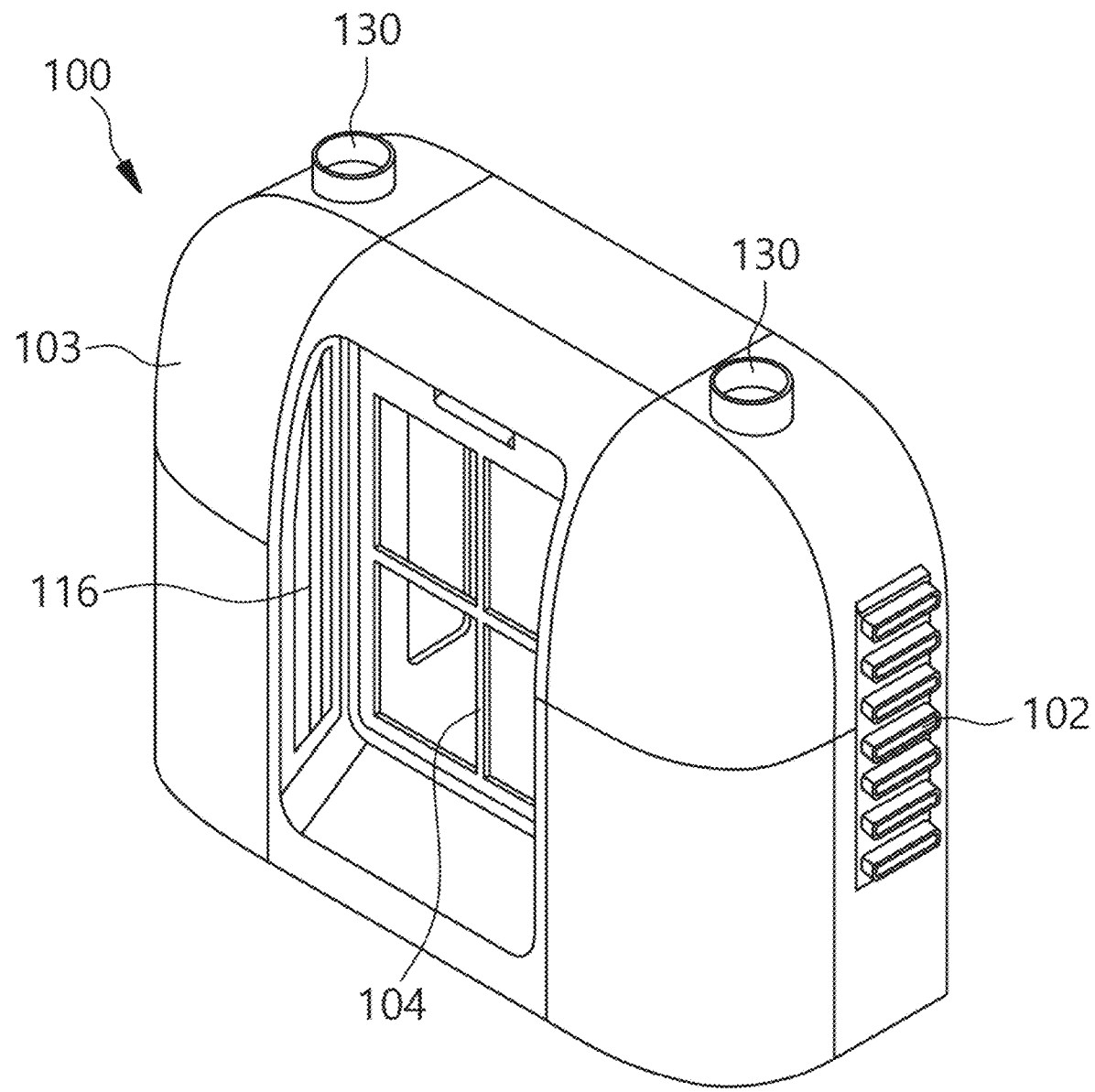
FIG. 4 is a view of an upper region of the drying apparatus according to the embodiment of FIG. 1.
Figure 5:
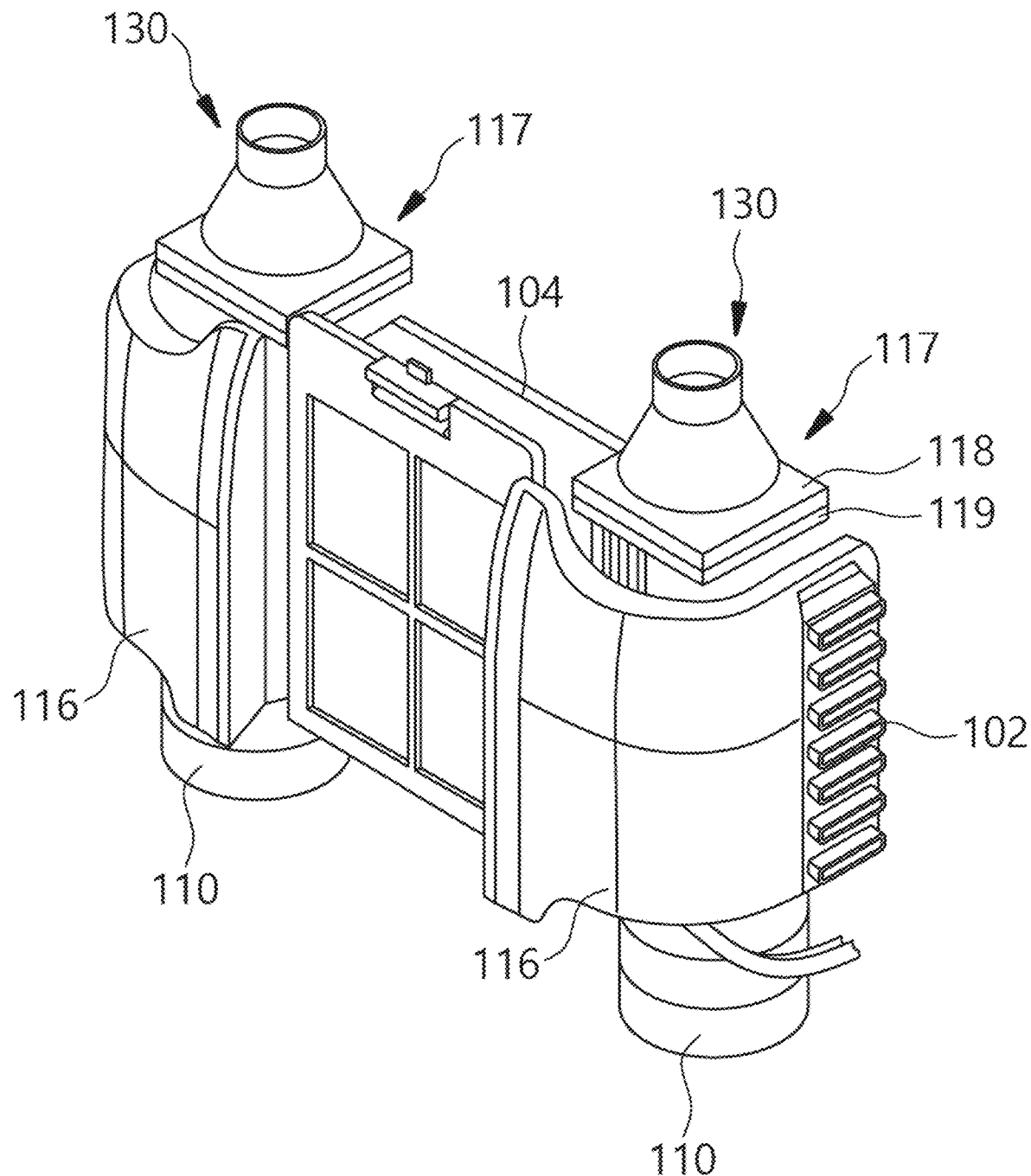
FIG. 5 is a view showing some internal components of the upper region of FIG. 4.

FIG. 4 is a view of details of an example upper region of the body 100. In particular, in FIG. 4 a front cover of the upper region has been removed to expose an outlet of one of two flow guides 116, adjacent to a filter unit 104. The other air flow guide 116 is not visible in FIG. 4, but may be provided on the other side of FIG. 4. The filter unit 104 is in opposition to and/or cooperation with flow guide 116 and arranged in a recess at the center of the body 100. The filter unit 104 may or may not be replaceable. Front cover (not shown in FIG. 4) may be removed to replace an old filter unit 104 with a new filter unit. FIG. 5 shows the coverings of the upper region removed to expose some internal components of the upper region of the body 100 shown in FIG. 4.

Referring to FIGS. 4 and 5, together, the upper region of the body 100 may include a pair of flow generators 110, a pair of flow guides 116, a pair of thermoelectric devices 117 (this device includes, for example, a thermoelectric module, a thermoelectric cooler, or other suitable devices), a pair of air inlets 102, the filter unit 104, and the flow generator housing 103 to house the internal components. While one embodiment uses thermoelectric devices 117 which are devices using thermoelectric effect such as Peltier effect, alternative embodiments may include air conditioning or heat-pump systems using a pump, compressors, and evaporators, resistive heating elements, combustion, or other chemical reaction to control temperature. However, other types of air conditioning devices may be used. In one aspect, the upper region may be considered as an air conditioning system of the body 100.

In the illustrated embodiment, a pair of flow generators 110 are used. In alternative embodiments, only a single flow generator, or a greater number of flow generators, may be used. A flow generator may be an axial fan or the like. Embodiments that include multiple flow generators may cooperate to produce an even airflow into the body 100. Embodiments also include generating independent airflows into the body 100 to vary the strength of the airflow at various portions of the body 100. In the present embodiment, outside air may be received into the flow generator housing 103, by operation of the pair of flow generators 110, through a pair of air inlets 102. The pair of air inlets 102 provide inlet points for outside air into the body 100.

As seen in FIG. 5, each flow generator 110 has its own respective air inlet 102. However, a single inlet 102 may be used with the pair of flow generators 110. Alternatively, more than two air inlets may be used with the pair of flow generators.

Air received at the air inlets 102 is ducted by respective flow guides 116 located between the air inlets 102 and the filter unit 104. In the present embodiment, each flow guide 116 may also in part define an outlet air flow pathway 105 (see FIG. 7) which may be a portion of a flow path where filtered air from the filter unit 104 flows to a respective flow generator 110. Further details of the flow path including the outlet air flow pathway 105 will be described in connection with the description of FIGS. 6 and 7.

Because the present embodiment is described as comprising a pair of flow guides 116, it will be understood that the following description of one flow guide 116 also reflects the other flow guide of the flow guide pair 116. To this end, each flow guide 116 may have a curved form as seen in FIG. 5. One end of each flow guide 116 is connected to a respective air inlet 102, and the other end opens to the upstream side of the filter unit 104. The body of each flow guide 116 includes a curved inner surface and a curved outer surface. The curved inner surface faces the outlet air flow pathway 105 and forms part of the flow path between the downstream side of the filter unit 104 and a respective flow generator 110.

Thus, each flow guide 116 forms a flow path between a respective air inlet 102 and the upstream side of the filter unit 104. Also each flow guide 116 forms, at least in part, a wall of the flow path between the downstream side of the filter unit 104 and a respective flow generator 110. In this configuration, each flow guide 116 may duct air received from a respective air inlet 102 and pass the air to the filter unit 104. Air passed through the filter unit 104 may flow to the outlet air flow pathway 105 where a flow generator 110 may force the air to the first air outlet 101.

In the configuration above, each flow guide 116 may function to separate between the inlet side and outlet side of the filter unit 104. Each flow guide 116 may also function to separate the air received from the air inlet 102 from the filtered air flowing towards the flow generator 110.

In an alternative configuration, the flow guide 116 may not have a dual function of guiding inlet air to the filter unit and guiding filtered air between the filter unit outlet and the flow generator. For example, the air inlets 102, the flow guides 116, the filter unit 104, and the flow generators 110 may be arranged to be linear or sequentially adjacent to each other. Here, each flow guide 116 only ducts the air between the air inlet 102 and the filter unit 104.

A pair of thermoelectric devices 117 may also be included in the upper region of the body 100. Each thermoelectric device 117 may be a semiconductor device that heats and/or cools air, for example, using the Peltier effect. In alternative embodiments, other types of known thermal elements may be employed, such as, a heater, a cooler, or a combination thereof. For example, a refrigeration cycle, having a compressor, evaporator, and condenser, may be utilized to provide cooling and/or heating of air. In another example, a resistance heater may be utilized to provide heating of the air.

In the present embodiment, there is a pair of thermoelectric devices 117. Thus, in the following description of one of the thermoelectric device 117, it will be understood that other thermoelectric device is the same. To this end, each thermoelectric device 117 has a first side 118 and a second side 119. Depending on the direction of current supplied to the thermoelectric device 117, one side may be cooled or heated while the other side is respectively heated or cooled. For example, when the first side (i.e., outward) 118 is cooled, the second side (i.e., inward) 119 is heated. Conversely, when the first side 118 is heated, the second side 119 is cooled.

Each thermoelectric device 117 may heat or cool the air in the outlet air flow pathway 105 (see FIG. 7) that has passed through the filter unit 104. To facilitate this, the second side 119 of the thermoelectric device 117 may be exposed to the outlet air flow pathway 105. Depending on the operation mode of the thermoelectric device 117, the second side 119 may heat or cool the air passing through the outlet air flow pathway 105. The heated or cooled air may then be sucked into a respective flow generator 110.

A processor may control the direction of the current flowing through thermoelectric device 117. For example, a voltage source coupled to the thermoelectric device 117 may be coupled to an analog-to-digital converter (A/D). The A/D converter may be able to generate positive or negative values to control the voltage and therefore the current applied to the thermoelectric device 117. In other embodiments, the A/D converter could have half of its output values corresponding to negative current and half corresponding to positive current.

An exhaust vent 130 may be provided at the upper region of the body 100 when a thermoelectric device 117 is used in the drying apparatus. FIG. 5 shows a pair of exhaust vents 130 associated with the pair of thermoelectric devices 117 that are included in the upper region of the body 100, as illustrated in FIG. 5. Each exhaust vent 130 may be coupled to the first side 118 of a respective one of the thermoelectric devices 117. One or more exhaust vents 130 may be provided at the upper region of the body.

When the thermoelectric device 117 operates as a heater, the cool exhaust air may be vented by a respective exhaust vent 130 to the outside of the drying apparatus 10. When the thermoelectric devices 117 operates as a cooler, the hot exhaust air may be vented by the exhaust vents 130.

Figure 6:
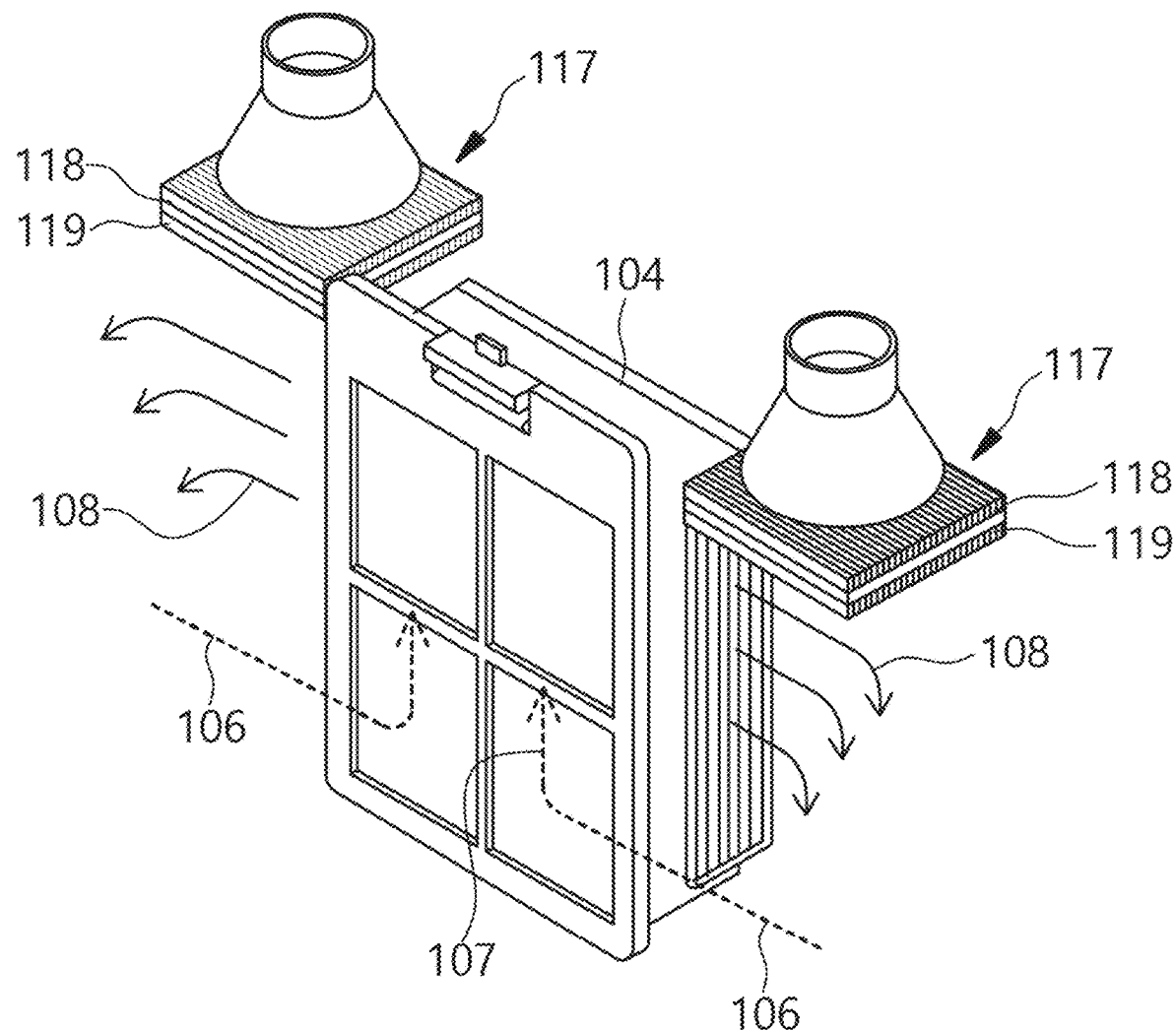
FIG. 6 is a view of an air flow through the internal components of the upper region of FIG. 5.
Figure 7:
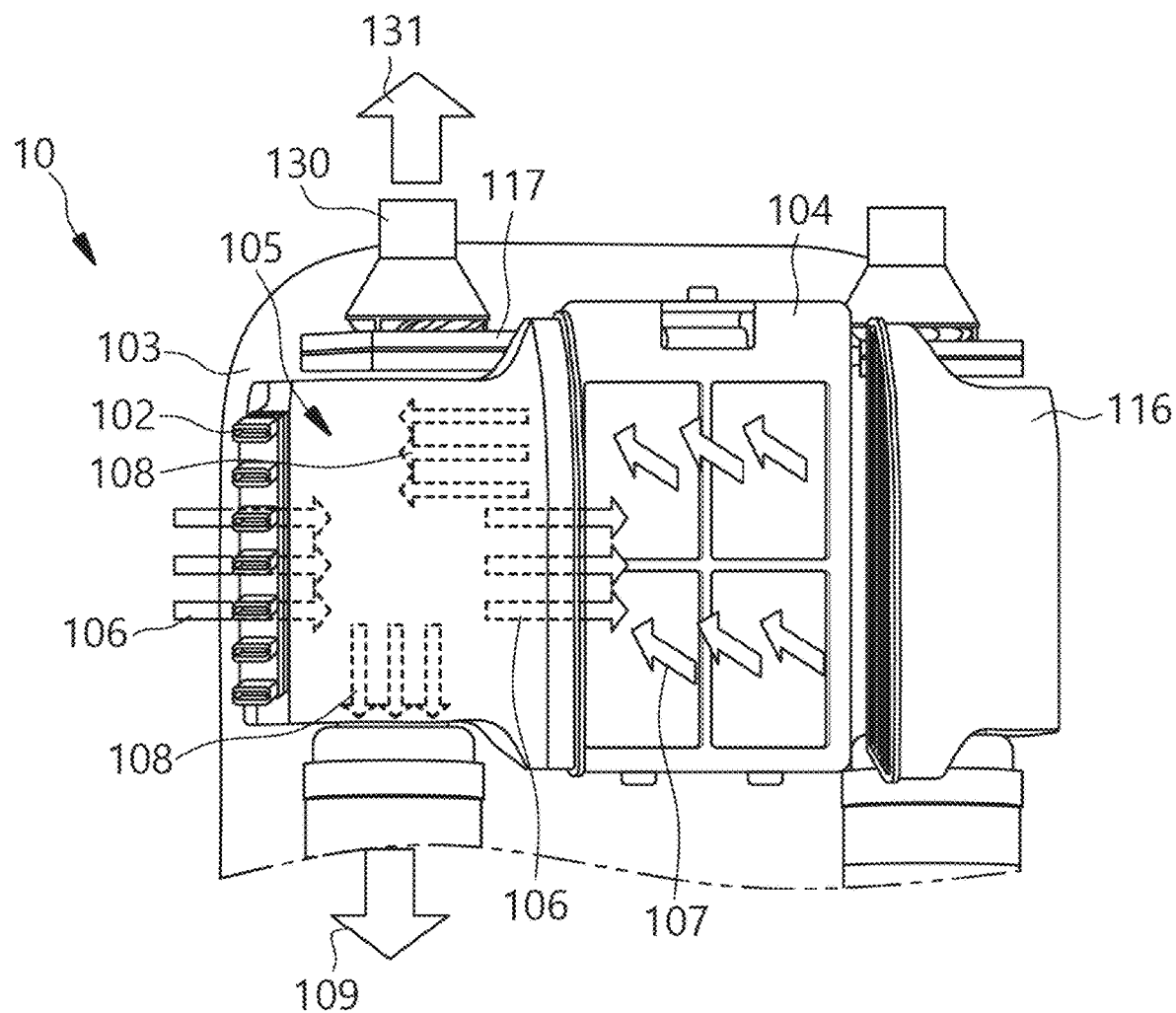
FIG. 7 is another view of the air flow through the internal components of the upper region.

FIG. 6 is an illustration of air flow through the parts of the upper region of the body 100 according to the embodiment of the present invention. FIG. 7 is another illustration of the air flow through the parts of the upper region of the body 100. The air flow through the components of the upper region of the body 100 will be described with respect to one flow generator 110 as the air flow will be similar for the other flow generator 110.

The present embodiment will now be described in greater detail with reference to FIGS. 6 and 7. When the flow generator 110 operates, air is received through the air inlet 102 and through the flow guide 116 thereby arriving at the front surface of the filter unit 104 as illustrated by air flow arrows 106 and 107 in FIG. 7. The air then passes through the front surface of the filter unit 104. The filtered air exits through the sides of the filter unit 104.

The filtered air, after exiting filter unit 104, arrives at the outlet air flow pathway 105 illustrated by air flow arrows 108 in FIG. 7. The filtered air in the outlet air flow pathway 105 may be heated or cooled by the thermoelectric device 117. The exhaust air from the thermoelectric device 117 may then be vented by the exhaust vent 130 as described above, and as illustrated by air flow arrow 131. The heated or cooled air illustrated by air flow arrow 108 is sucked down into and through the flow generator 110, and then forced, by the flow generator 110, onwards to the first air outlet 101, as illustrated by air flow arrow 109 in FIG. 7.

A configuration of an air conditioning system of the body 100 has been described above. The drying apparatus 10 having the configuration above may vent cool air or hot air to condition a space in which the drying apparatus is occupying. The space may be a bathroom. During hot days the drying apparatus 10 may cool the bathroom. During cold days the drying apparatus 10 may heat the bathroom. The drying apparatus may also use the air conditioning system described herein to dry a user. For example, the cool air or hot air forced by the flow generator 110 is vented by the first air outlet 101 along the periphery of the body 100 at the drying face 14 (see FIGS. 1-3). A user presenting themselves at the drying face 14 may dry themselves through the vented cool air or hot air.

Figure 8:
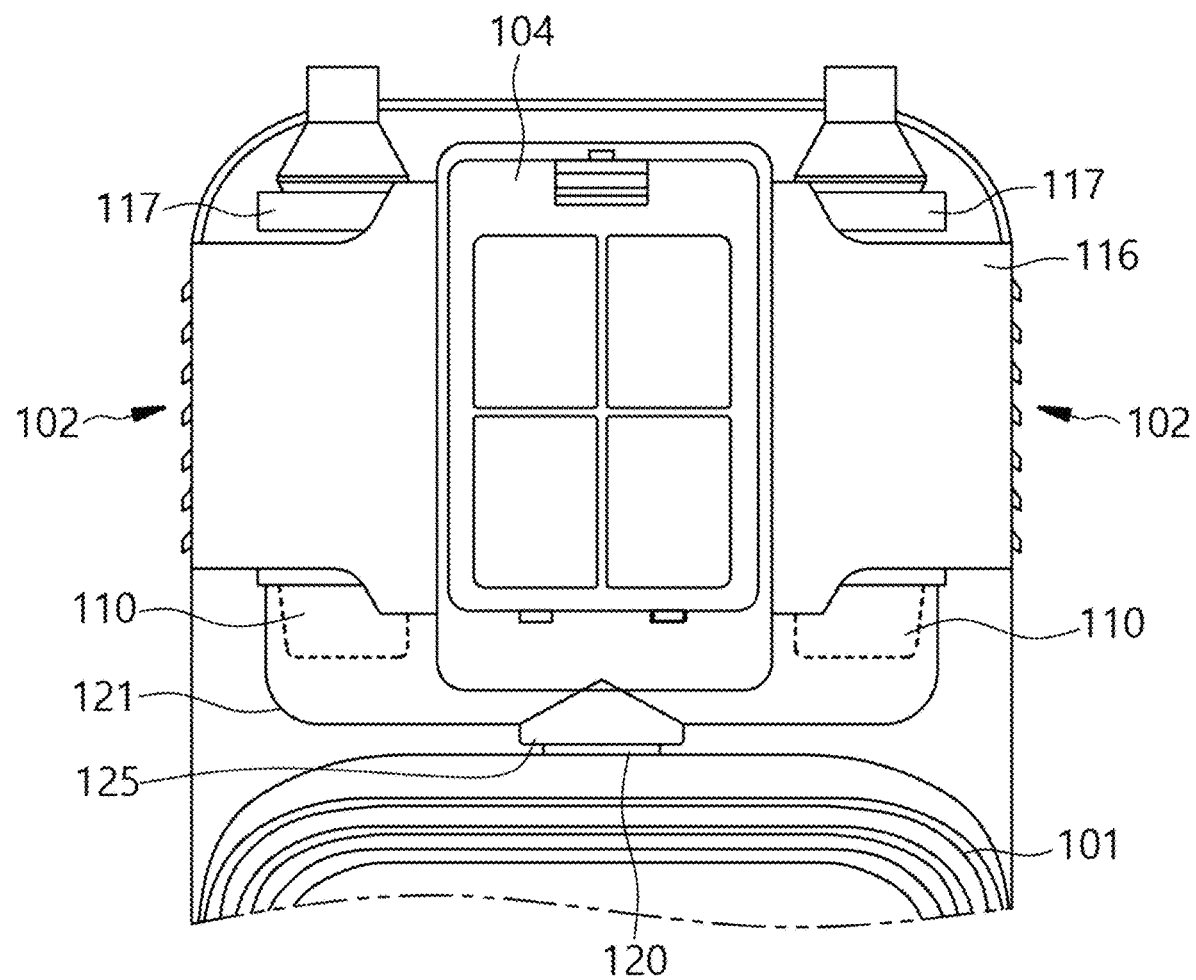
FIG. 8 is a view showing a connection between flow generators and a first air outlet according to an embodiment of the present invention.

FIG. 8 is a view illustrating a connection between the flow generators 110 and the first air outlet 101 of the body 100, according to an embodiment of the present invention.

As shown, the flow generators 110 force the airflow into a duct 121. At the duct 121, the forced airflows from the two flow generators 110 are combined into a single forced airflow. The duct 121 then guides the combined forced airflow through a common opening 125 into the first air outlet 101 of the body 100. In the present embodiment, a resistance heater 120 is disposed at the common opening 125 to further heat the forced airflow. This configuration may be used where it is desirable that a heated forced airflow from the flow generators 110 is further heated prior to being expelled into the first air outlet 101. This configuration may be used, for example, where a quick heating of a bathroom is desired or a more heated forced airflow is desired during a drying of the user.

While in FIG. 8, a resistance heater has been illustrated, any other suitable thermal elements may be used. In other configurations the thermal element may be a thermoelectric device that may be used to selectively heat or cool the forced airflow flowing out of the common opening 125.

Figure 9A:
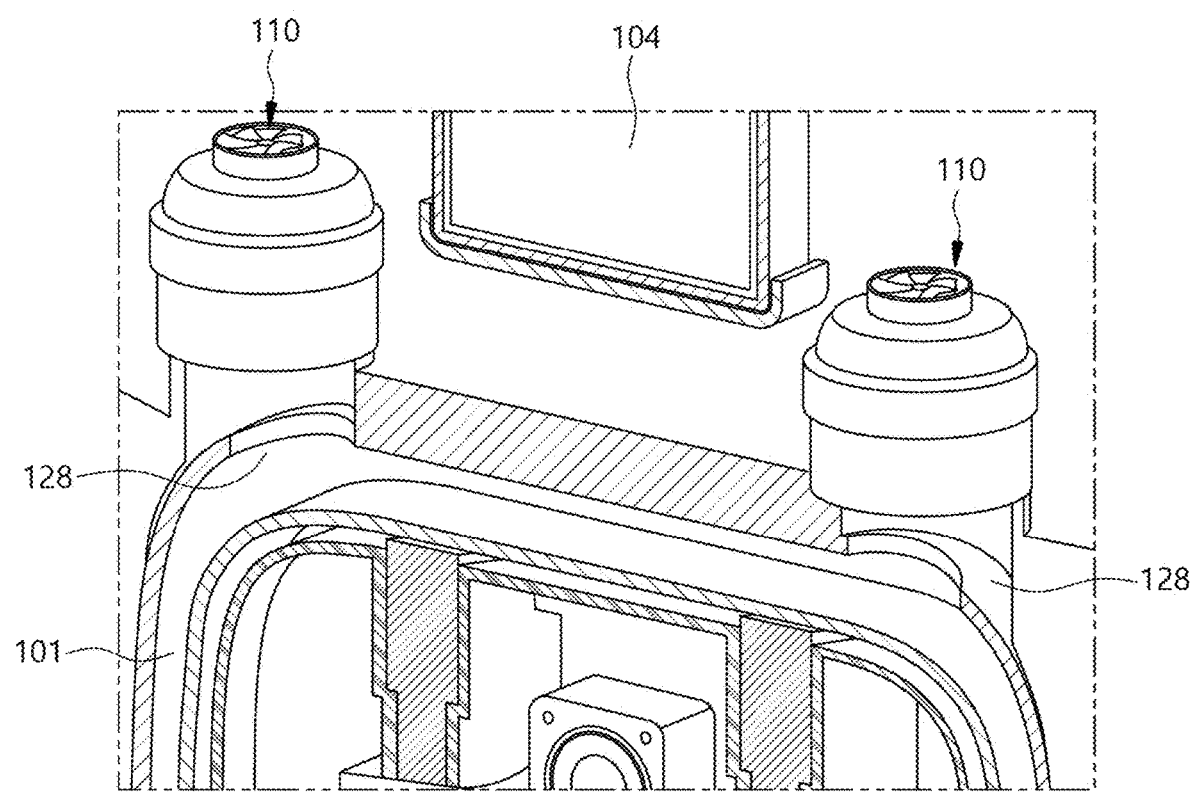
FIG. 9A is a view showing a connection between the flow generators and the first air outlet according to another embodiment of the present invention.

FIG. 9A illustrates a connection between the flow generators 110 and the first air outlet 101 of the body 100 according to an alternative embodiment of the present invention. Unlike the embodiment illustrated in FIG. 8, the outlet of each of the flow generators 110 directly connects to the first air outlet 101 of the body 100 according to the alternative embodiment of FIG. 9A. The first air outlet 101 thus includes air openings 128 at the upper side of the first air outlet 101. Each air opening 128 communicates directly with the outlet of respective one of the flow generators 110. By having the outlet of each flow generator 110 directly connect to the first air outlet 101 of the body 100, the connection structure may be simplified and the forced airflow may be directly expelled into the first air outlet 101.

The forced airflow in the present embodiment may be stronger than the forced airflow of the embodiment of FIG. 8. The reason is that, in the forced airflow of FIG. 8, the vertical direction of the forced airflows of the respective flow generators are forced into a horizontal direction by the duct 121, then made to collide with each other to form a single forced airflow. The duct 121 then forces the single combined forced airflow to flow vertically downward into the first air outlet 101. In contrast, in the embodiment of FIG. 9A, the forced airflows of the respective flow generators flow vertically downward directly into the first air outlet 101.

Figure 9B:
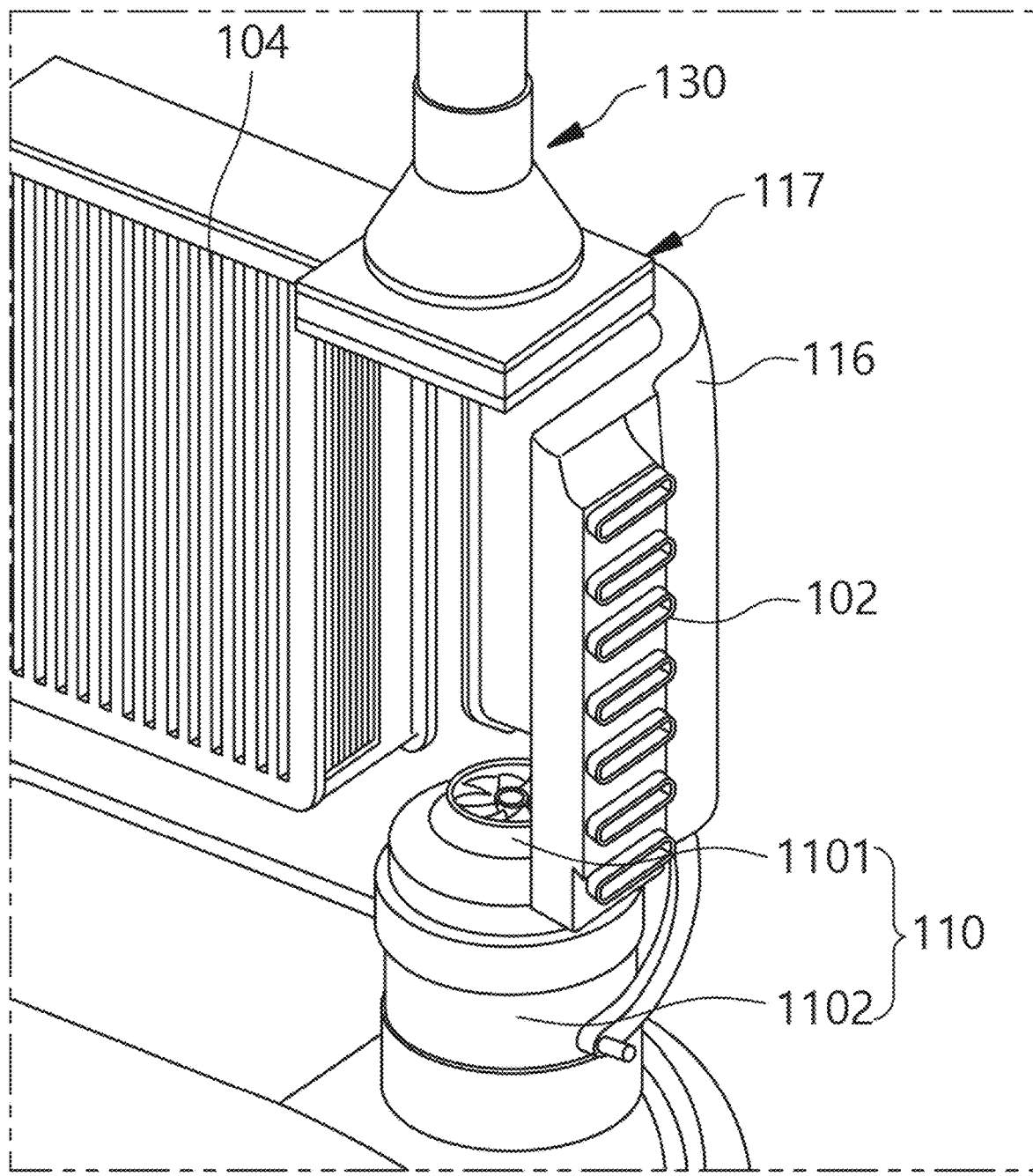
FIG. 9B is a rear perspective view showing a connection between one of the flow generators and the first air outlet of FIG. 9A.

FIG. 9B is a rear perspective view showing a connection between one of the flow generators and the first air outlet of FIG. 9A. As shown in FIG. 9B, in this configuration, the flow generator 110 includes a fan assembly 1101 and a conduit 1102. The fan assembly may be an axial fan and the like. Preferably, the fan assembly includes a high speed motor that sucks in air and expels air at high speed. For example, the fan assembly may be Smart Inverter Motor™ available from LG Electronics, Inc., Republic of Korea, that operates at speeds up to 115,000 revolutions per minute (RPM). Similar fan assembly may be used.

The fan assembly 1101 is connected to the conduit 1102 which may be a cylindrical tube that connects to the first air outlet 101. However, it should be appreciated that the conduit 1102 is not limited to a cylindrical tube and other configurations may be used such as an oval tube, a square tube, a rectangular tube, etc. The conduit 1102 contains the air sucked in by the fan assembly 1101 within the confines of the conduit 1102 thereby increasing the speed of the forced airflow if not maintaining the speed of the forced airflow expelled by the fan assembly 1101. Thus, a forced airflow of relatively high speed is introduced into the first air outlet 101.

Figure 10:
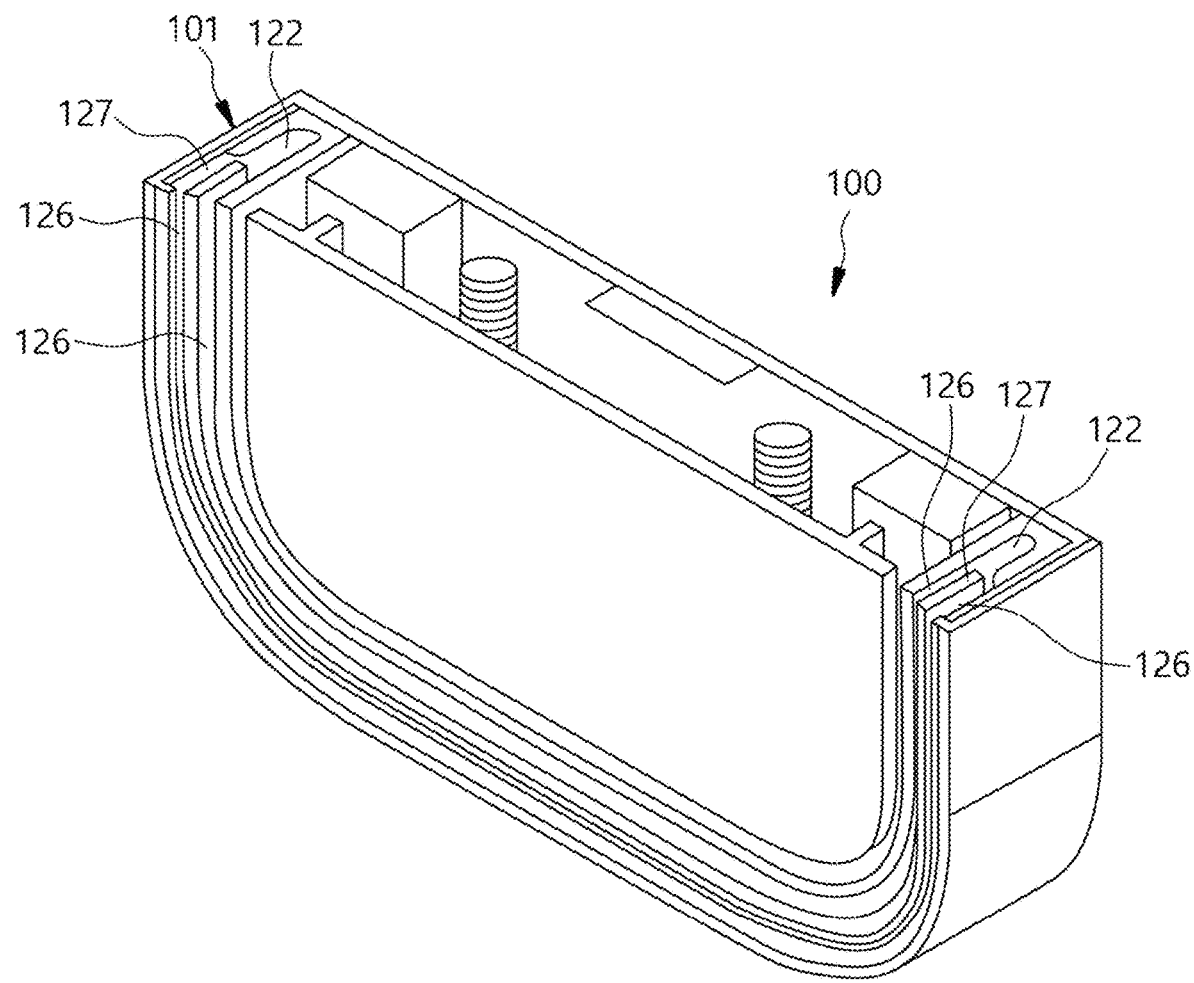
FIG. 10 is a cross-sectional view of the first air outlet along line A-A' of FIG. 3.

FIG. 10 is a cross-sectional view along line A-A' of FIG. 3 further illustrating the first air outlet 101 of the body according to an embodiment of the present invention. As shown in part, the first air outlet 101 is distributed around at least a partial periphery of the body 100. In the present embodiment, the first air outlet 101 actually follows the contour of the periphery of the drying face 14 of the body 100 (see FIG. 3). However, one skilled in the art will readily appreciate that the air outlet 101 could take on any one of a number of other configurations. For example, in an alternative embodiment, the first air outlet 101 may be configured as a plurality of slits placed vertically and/or horizontally across the drying face 14 (see, for example, FIG. 26).

Again, referring to FIG. 10, the first air outlet 101 according to the present embodiment, includes a duct 122, a vent 126, and a fin 127. The duct 122 receives the forced airflow from the upper region of the body 100, and ducts the forced airflow along the periphery of the body 100.

The duct 122 is connected to the vent 126 which also runs along the periphery of the body 100 and is visible from the drying face 14 of the body 100 (see FIGS. 1 and 3). The forced airflow exits the body 100 through the vent 126. The fin 127 may be disposed in the vent 126 which also runs along the periphery of the body 100 and divides the space formed by the vent 126 into two. The fin 127 may aid in directing the forced airflow flowing out from the vent 126. In the present embodiment, the fin 127 is fixed in the vent 126 and directs the forced airflow in one direction which is straight outwardly.

In an alternative configuration, the fin may be adjustable to be moved to the left or to the right to direct the forced airflow exiting the body 100 in the left direction or the right direction, as desired. For example, the fin of the left side of the body 100 may be moved in the right direction and the fin on the right side of the body 100 may be moved in the left direction so that at least a portion of the forced airflow may converge inwardly towards a center with respect to the body 100. Conversely, the fin of the left side of the body 100 may be moved in the left direction and the fin on the right side of the body 100 may be moved in the right direction so that at least a portion of the forced airflow may diverge outwardly away from the center with respect to the body 100.

Thus far, the body 100 of the drying apparatus 10 according to embodiments of the present invention has been described. The drying apparatus 10 may include a bar 200 that may expel forced airflow. The bar 200 may be movable relative to the body 100, as previously mentioned.

Figure 11A:
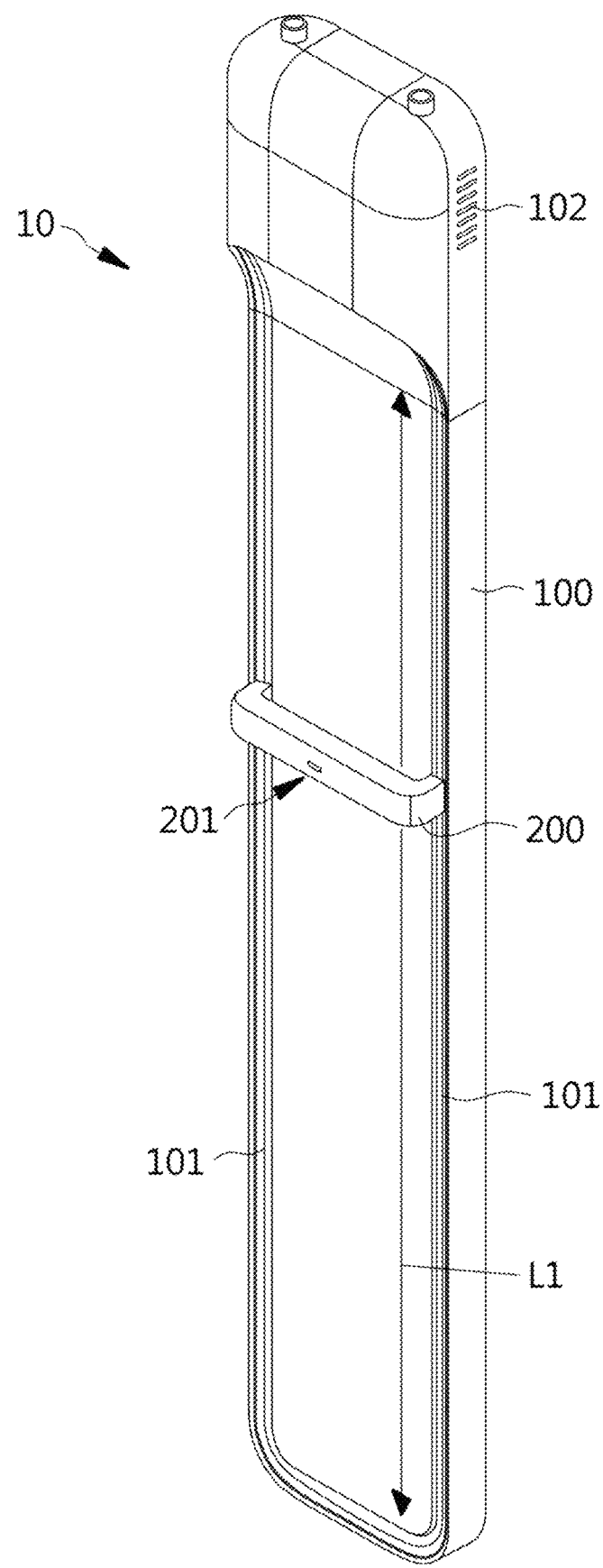
FIG. 11A is a perspective view of the drying apparatus of FIG. 1 with a bar thereof in a first position.
Figure 11B:
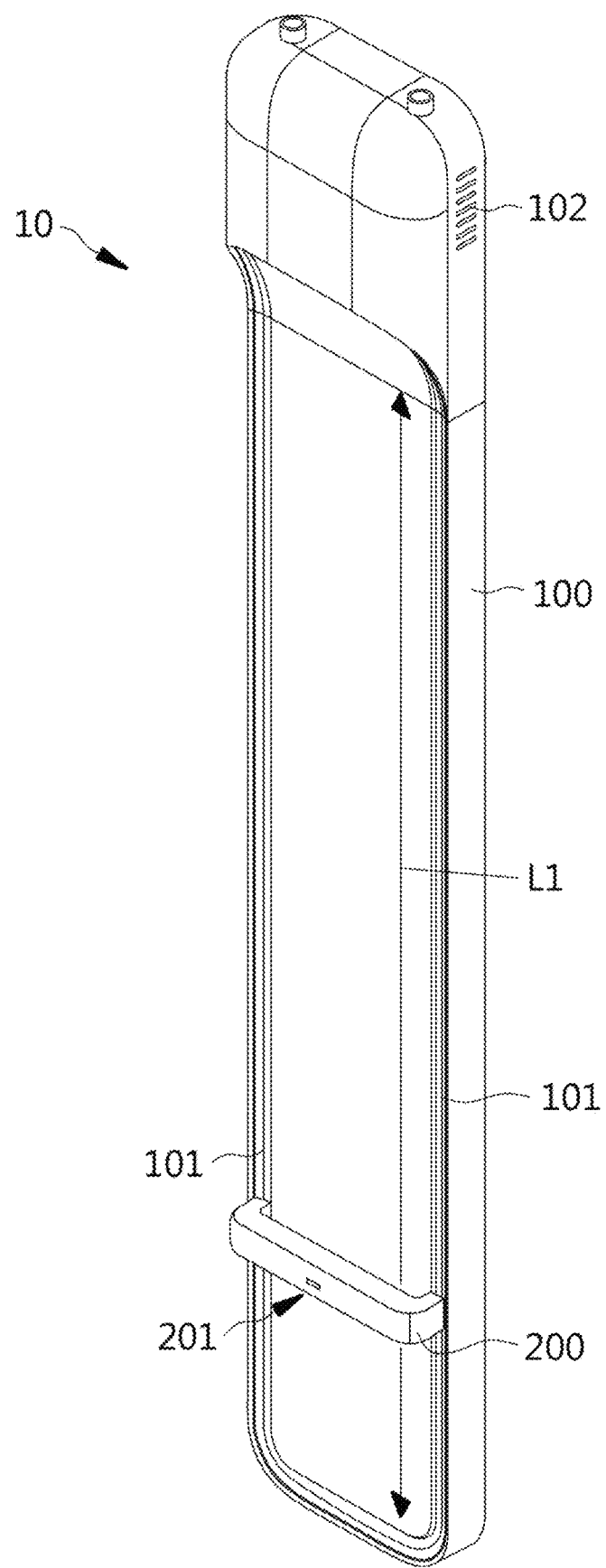
FIG. 11B is a perspective view of the drying apparatus of FIG. 1 with the bar thereof in a second position.

FIGS. 11A and 11B are views illustrating a bar 200 at two respective driven positions along the longitudinal length L1 of the body 100 according to the embodiment of the present invention.

The bar 200 may be moveable along the longitudinal length L1 of the body 100 driven by a drive apparatus to be described later. The travel bounds of the bar 200 may be fixed to coincide with longitudinal length L1, of the body 100 or, alternatively, it could be adjustable to more closely coincide with the height by a particular user. Accordingly, the drying apparatus 10 may be configured such that when the user is positioned adjacent to the drying face 14, the desired length (e.g., the height) of the user may be covered by the drying airflow of the second air outlet 201 by the movement of the bar 200. For example, the bar 200 may move from the top position as shown in FIG. 11A to the bottom position as shown in FIG. 11B (and back in repetition if desired) while expelling forced airflow from the second air outlet 201, where the distance traveled between the position of the bar 200 in FIG. 11A and in FIG. 11B may correspond with the height of the user.

Figure 12A:
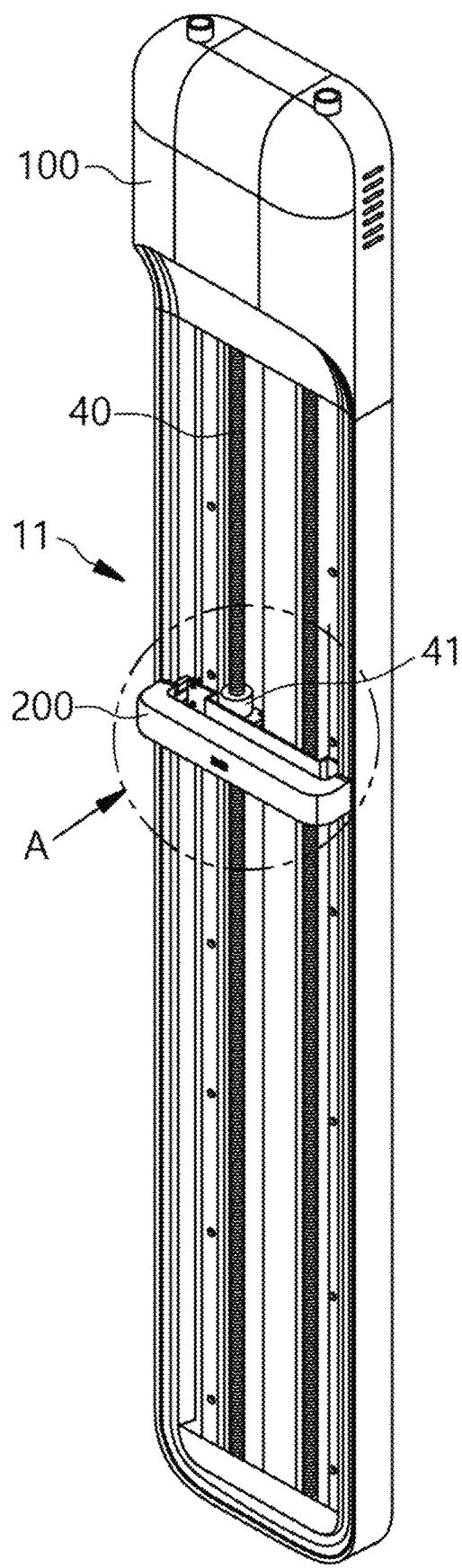
FIG. 12A is a perspective view showing a driving apparatus for a drying apparatus according to an embodiment of the present invention.
Figure 12B:
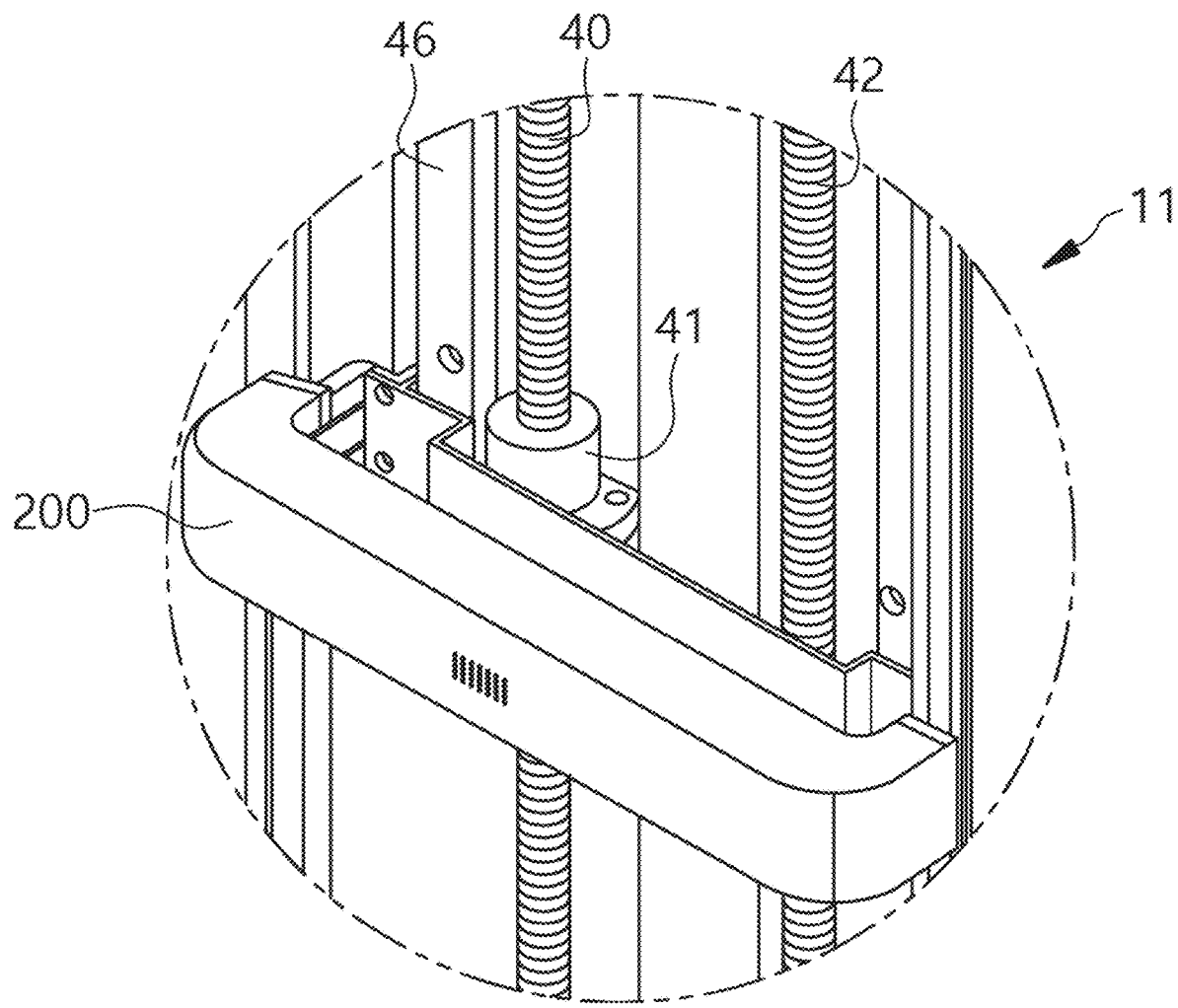
FIG. 12B is a close up view of the portion A of FIG. 12A.
Figure 12C:
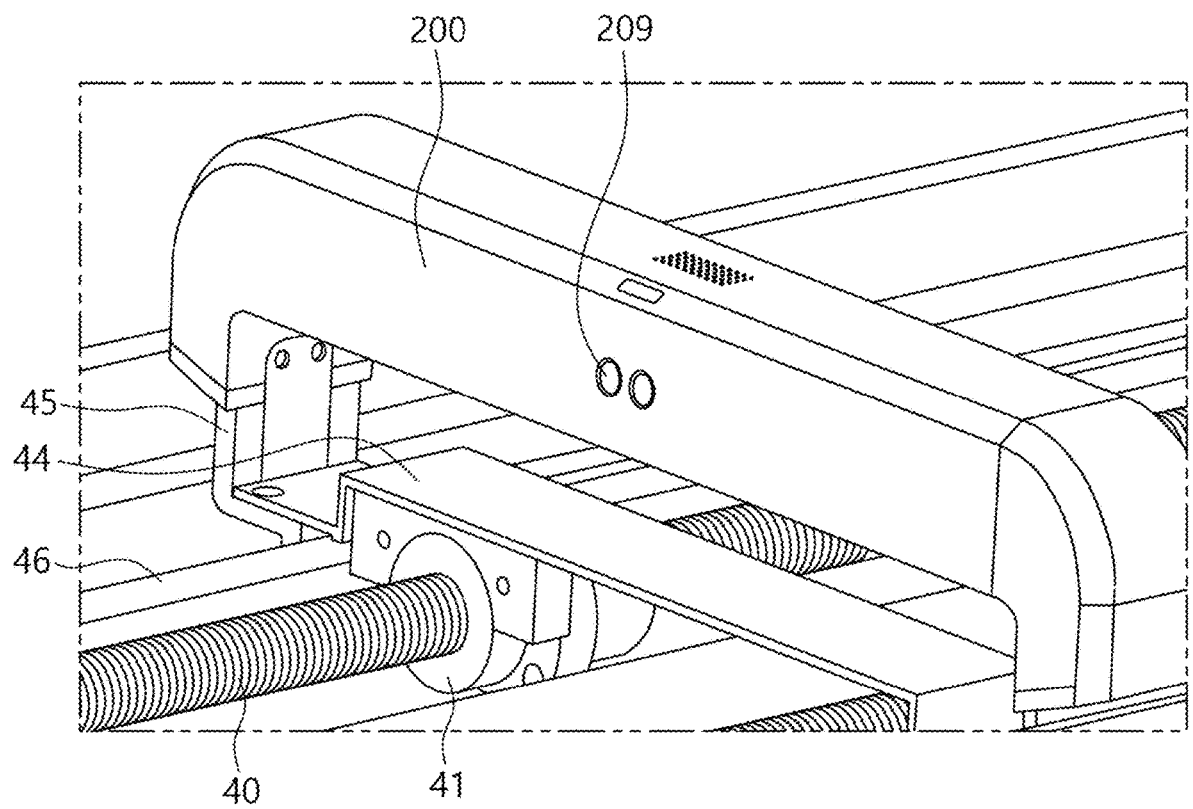
FIG. 12C is bottom view of FIG. 12B.
Figure 12D:
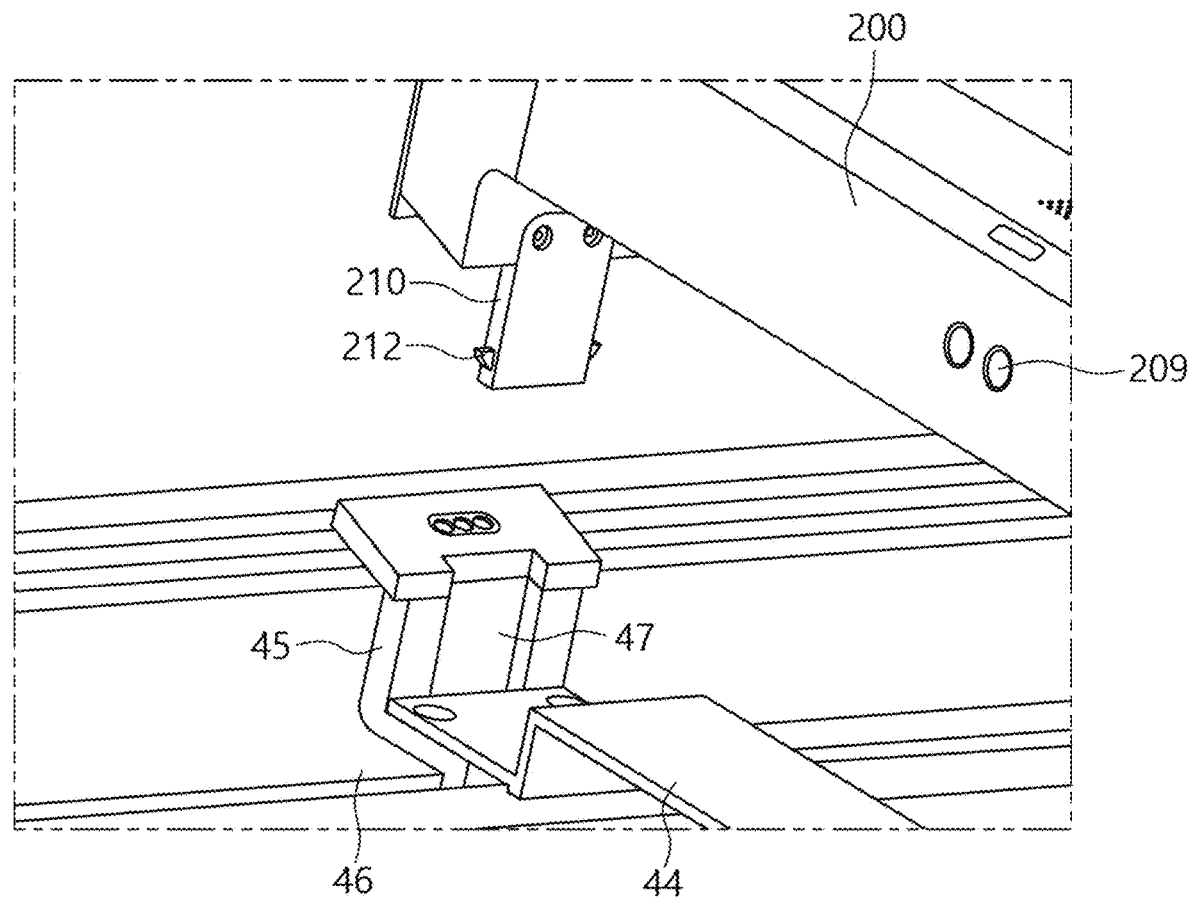
FIG. 12D is a view showing a fastening mechanism of a bar of a drying apparatus according to an embodiment of the present invention.

FIG. 12A is a view illustrating a driving apparatus of the bar 200 according to the embodiment of the present invention. FIG. 12B is a close up view of the drive apparatus illustrated in portion A of FIG. 12A. FIG. 12C is bottom view of the drive apparatus illustrated in FIG. 12B, and FIG. 12D is a view illustrating an exemplary fastening mechanism 210 of the bar 200 according to an embodiment of the present invention.

Referring to FIGS. 12A and 12B, the drive apparatus 11 drives the bar 200 relative to the body 100. The drive apparatus 11 may be provided at the body 100. In accordance with this exemplary embodiment, the drive apparatus 11 includes a lead screw 40, a nut 41, and a motor 50 (see FIG. 13). The lead screw 40 is threaded and may have a length corresponding to the longitudinal length L1 of the drying face 14 of the body 100. The motor 50 may be located at the upper region of the body 100. However, the motor 50 may be located anywhere as long as the motor 50 is able to rotate the lead screw 40 thus causing the nut 41 to move up or down the lead screw 40, depending on the direction of rotation of the lead screw 40, along the longitudinal length L1 of the drying face 14 of the body 100. A shaft of the motor 50 may be coupled to one end of the lead screw 40 (e.g., the upper end of the lead screw 40). Therefore, when the motor 50 rotates the shaft clockwise, the lead screw 40 rotates clockwise. When the motor 50 rotates the shaft counterclockwise the lead screw 40 rotates counterclockwise.

Referring to FIGS. 12B and 12C, the nut 41 is threaded corresponding to the thread of the lead screw 40 and is thus mated with the lead screw 40. The nut 41 is fixed to the bar 200. In the present embodiment, the nut 41 is fixed to a bracket assembly 44 to which the bar 200 is attached. However, one skilled in the art will appreciate that other configurations for fixing the nut 41 to the bar 200, direct or indirect, are possible. When the lead screw 40 is rotated by the motor 50, the nut 41 rides up or down on the lead screw 40 which, in turn, moves the bar 200 up or down.

For example, when the motor 50 rotates the lead screw 40 clockwise, the nut 41 moves up the lead screw 40, which in turn moves the bar 200 up with respect to and along the longitudinal length of the body 100. On the other hand, when the motor 50 rotates the lead screw 40 counterclockwise, the nut 41 moves down the lead screw 40, which in turn moves the bar 200 down with respect to and along the longitudinal length of the bar 200.

In another example, when the motor 50 rotates the lead screw 40 clockwise, the nut 41 moves down the lead screw 40, which in turn moves the bar 200 down with respect to and along the longitudinal length of the body 100. When the motor rotates the lead screw 40 counterclockwise, the nut 41 moves up the lead screw 40, which in turn moves the bar 200 up with respect to and along the longitudinal length of the bar 200.

Figure 13:
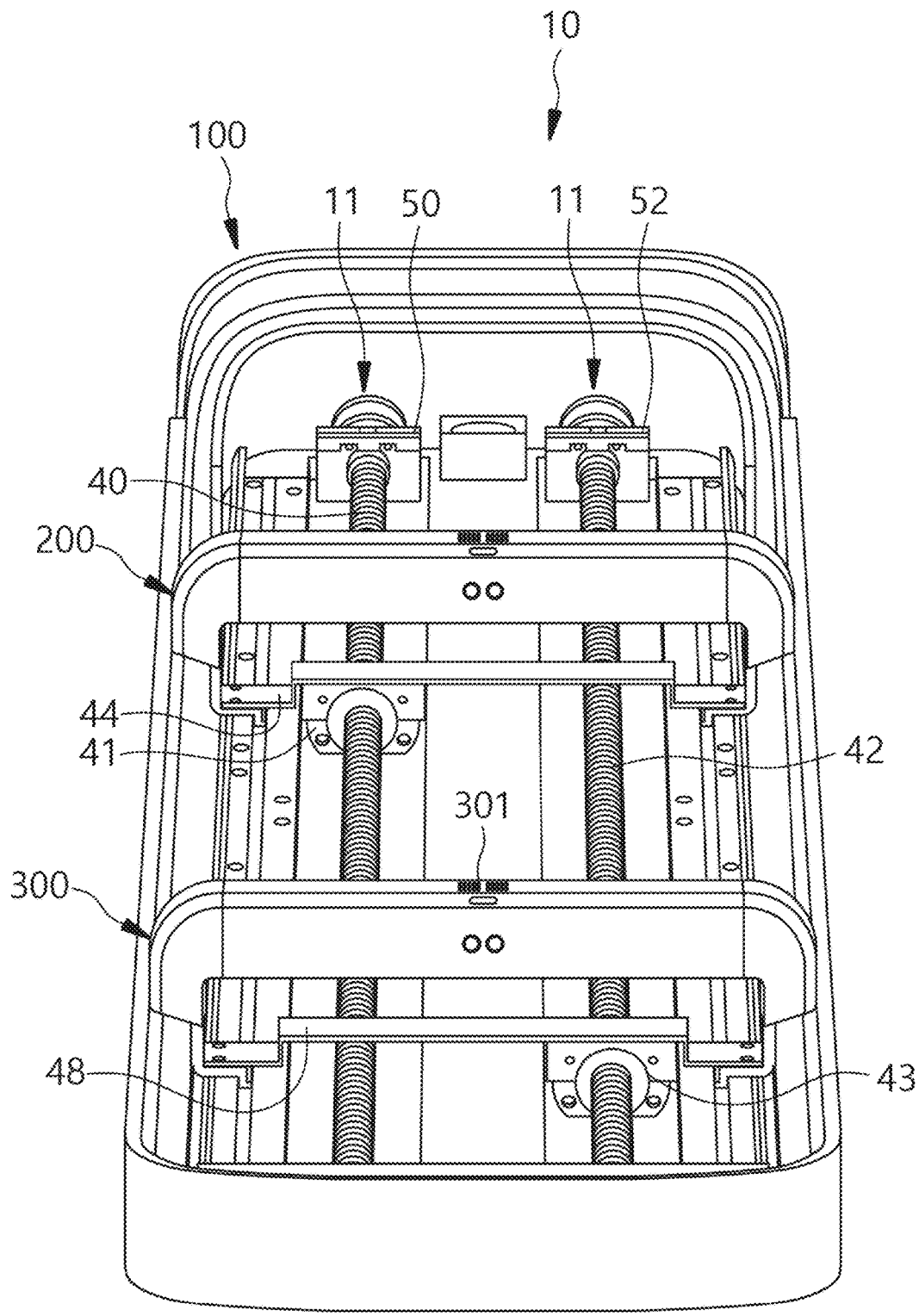
FIG. 13 is a perspective view showing a drying apparatus including additional bars according to an embodiment of the present invention.

Referring to FIGS. 12C and 12D, the bracket assembly 44 may have one or more guide members 45 for running in one or more corresponding guide tracks 46 of the body 100. In the present embodiment, as illustrated in FIG. 13, a dual guide track is used, including a guide track 46 which runs vertically on both sides of the body 100. Together, the guide members 45 and guide tracks 46 guide the bar 200 along a predetermined vertical path.

For example, the guide members 45 and guide tracks 46 may operate to retain the bar 200 against rotational movement about the longitudinal axis which may be caused due to the rotation of the lead screw 40. The dual guide tracks 46 may also provide stability to the bar 200 as it moves up and down along the body 100.

In the present embodiment, the bar 200 may include a fastening mechanism 210 to fasten to the guide member 45 of the bracket assembly 44. A fastening mechanism 210 is provided at both ends of the bar 200 in the present embodiment. The guide member 45 may include a recess 47 having a shape corresponding to the shape of the fastening mechanism 210. When the bar 200 is attached to the bracket assembly 44, the fastening mechanism 210 slides into the recess 47 of the guide member 45, thus attaching the fastening mechanism 210 to the guide member 45.

The fastening mechanism 210 may include one or more protrusions 212 that protrude from the sides of the fastening mechanism 210. The one or more protrusions 212 may be elastically deformable or may be spring loaded. When the fastening mechanism 210 has been fully inserted into the recess 47 of the guide member 45, the one or more protrusions 212 may hook into one or more corresponding slots in the recess 47 to attach the bar 200 to the bracket assembly 44.

The fastening mechanism 210 may provide for easy detachment of the bar 200 from the bracket assembly 44. Because the protrusions 212 are elastically deformable or spring loaded, the bar 200 may be detachable from the body 100 by exerting sufficient force. The bar 200 may be replaced with another bar 200 or may be serviced without the need for taking the entire drying apparatus 10 for servicing.

An embodiment of a drive apparatus using a lead screw and nut has been described. In other exemplary configurations, the bar 200 may be driven upon the body 100 by components other than a lead screw and nut. In fact, any suitable drive apparatus capable of providing the desired relative motion may be used. For example, the lead screw and nut may be replaced by a rack and pinion system, a pulley and belt drive, or, where the desired motion is a linear motion, a linear actuator.

FIG. 13 is a front view showing a drying apparatus including a bar 200 and a second bar 300 according to another embodiment of the present invention.

Referring to FIG. 13, a drying apparatus 10 may comprise a bar 200 and a second bar 300. The second bar 300 may include a third air outlet 301 and may be moveably driven relative the body 100. The second bar 300 may be associated with its own nut 43, and the nut 43 with its own lead screw 42. The nut 43 is fixed to its own bracket assembly 48 such that the second bar 300 may be driven relative the body 100. The lead screw 42 may be driven by its own motor 52. The components associated with the driving of the second bar 300, and the functionality thereof, are similar to that described above with respect to the bar 200, and thus further description will be omitted in order to avoid duplicate description.

Based on the configuration of the exemplary embodiment described above, those skilled in the art will readily appreciate that even more bars may be employed in the drying apparatus 10. The drive apparatus 11 may be modular to accommodate multiple bars at the body 100.

As an example, as shown in FIG. 13, the bar 200 is associated with its own motor 50, lead screw 40, nut 41, and bracket assembly 44. By operation of the motor 50, the lead screw 40, and the nut 41, the bar 200 moves up and down relative to the body 100. Similarly, the second bar 300 is associated with its own motor 52, lead screw 42, nut 43, and bracket assembly 48. By operation of the motor 52, the lead screw 42, and the nut 43, the second bar 300 moves up and down relative to the body 100. The motor, the lead screw, the nut, and the bracket assembly associated with one bar do not act on the other bar. That is, the motor, the lead screw, the nut, and the bracket assembly of one bar only operate on that bar.

Accordingly, with each additional bar, a corresponding motor, a lead screw, a nut, and a bracket assembly may be added to the drive apparatus 11 to accommodate that bar. In this manner the drying apparatus 10 may be configured with a number of bars on the body 100 according to the preference of the user. Alternatively, each drive apparatus may accommodate more than one bar spaced apart from each other, which move in unison along the longitudinal length of the body 100.

FIG. 13 shows the bar 200 and the second bar 300 using the same guide track(s). In alternative exemplary configurations, the bar 200 and the second bar 300 may use separate guide tracks. By this configuration the bar 200 or the second bar 300 may be operated to any desired location along the extent of its drive path, irrespective of the position of the bar 200 or the second bar 300.

Figure 14:
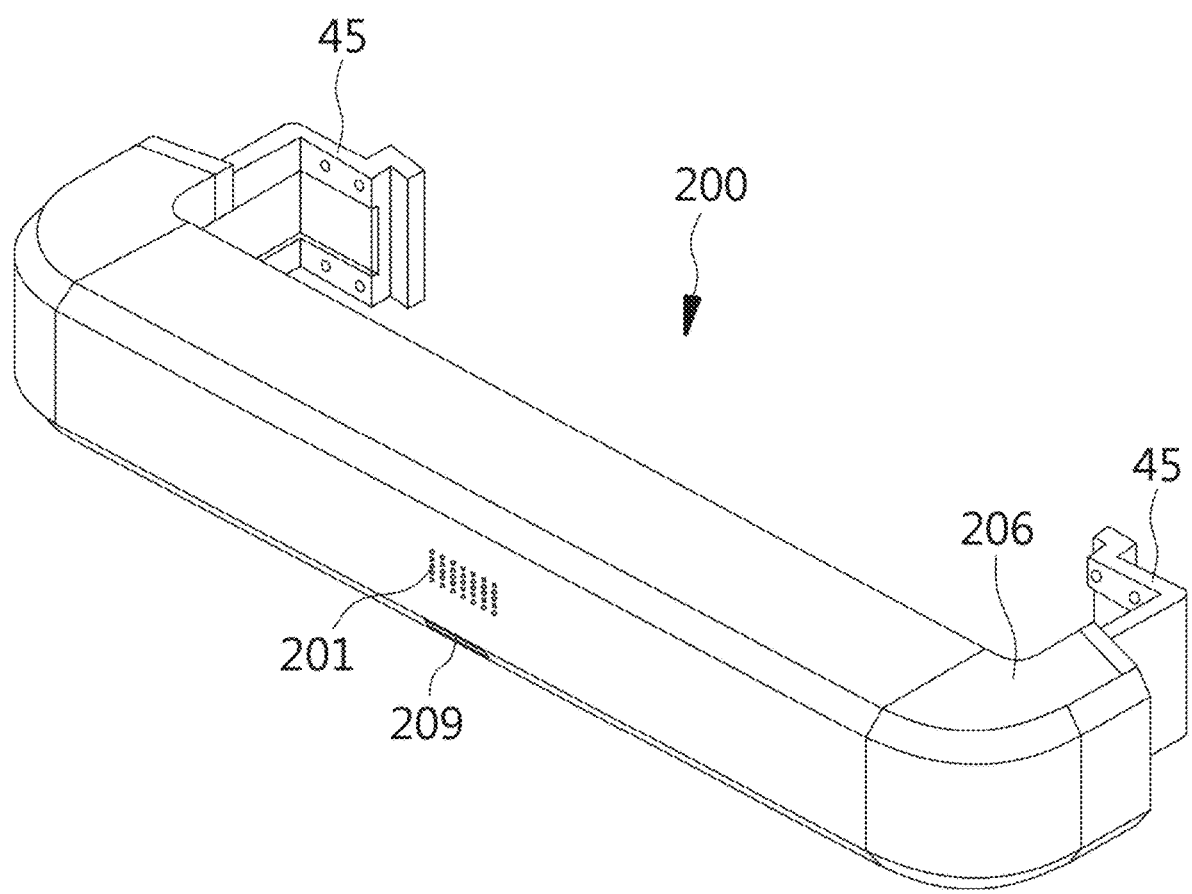
FIG. 14 is a top perspective view of a bar of a drying apparatus according to an embodiment of the present invention.
Figure 15:
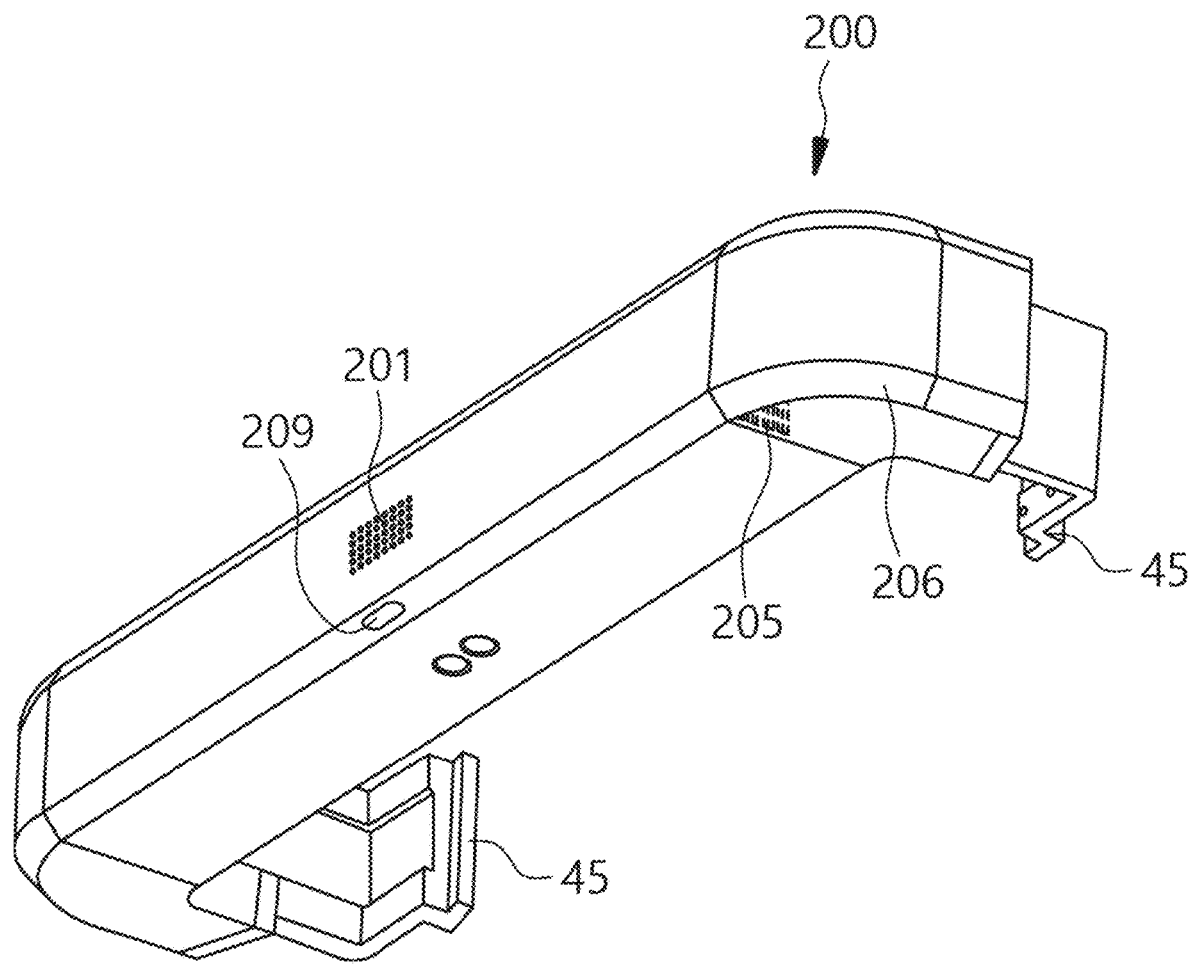
FIG. 15 is a bottom perspective view of the bar of FIG. 14.

FIG. 14 is a top perspective view of the bar 200 according to the embodiment of the invention; FIG. 15 is a bottom perspective view of the bar 200 according to the embodiment of the invention; and FIG. 16 is a rear view of the bar 200 according to an alternative configuration to that illustrated in FIG. 15.

Referring to FIGS. 14 and 15, the bar 200 may include a second air outlet 201 in which forced airflow is expelled at different locations relative to the body 100 depending on the location of the bar 200 relative to the body 100. As described previously in relation to the drive apparatus 11 between the bar 200 and body 100, two guide members 45 may guide the bar 200 in its movement relative the body 100.

One or more air inlets 205 may be located at the ends of the bar 200. The air inlet 205 may be protected in a cavity formed between the end of the bar 200 and a shield 206. The shield 206 may extend from the end of the bar 200 to form a shield at the top and side surfaces thereof except for the bottom surface. The open bottom surface of the shield 206 allows for the air inlet 205 to access inlet air. This configuration may act to prevent drips or splashes of water from entering the air inlet 205. The air inlet 205 provides for inlet air to enter into the bar 200 which houses one or more flow generators 204 (see FIG. 17).

Figure 16:
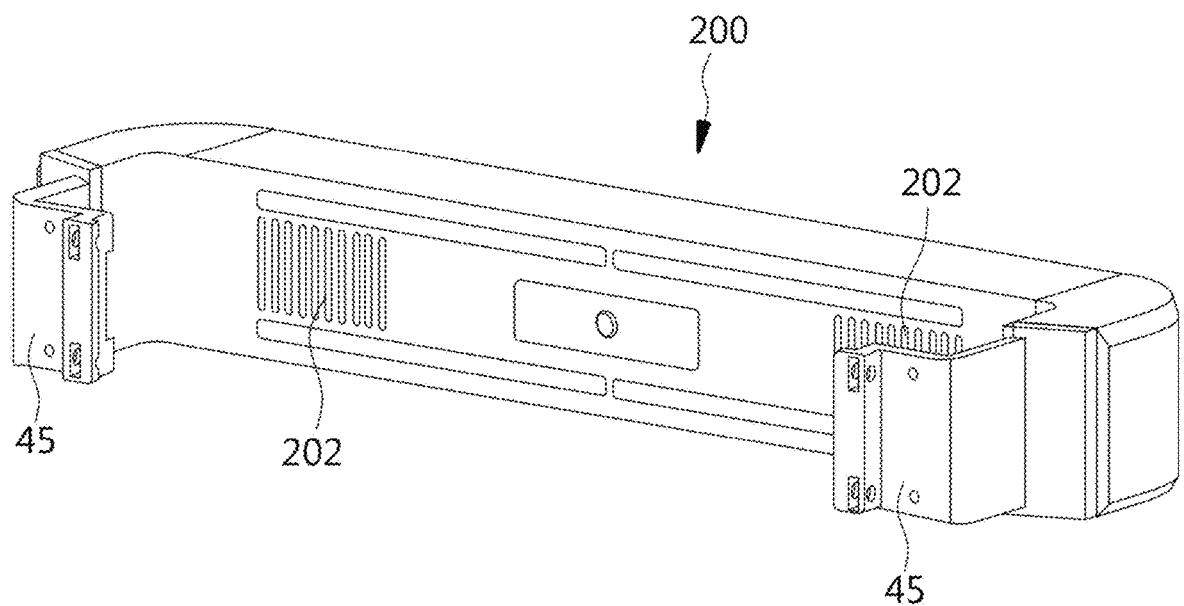
FIG. 16 is a rear view of a bar according to another embodiment of the present invention.

FIG. 16 illustrates two air inlets 202 located at a back side of the bar 200 for supplying air to be vented from the second air outlet 201. In contrast, the air inlets 205 in the configuration of FIG. 15 are located at each end of the bar 200, as explained above. As the bar 200 extends laterally towards a user, more so than the body 100, the bar 200 may be more likely to become wet due to its closer proximity to the user. It may thus be desirable that the one or more air inlets 202 are disposed away from the user. As such, in the configuration of FIG. 16, the air inlets 202 are provided on the back side of the bar 200, as previously explained.

Figure 17:
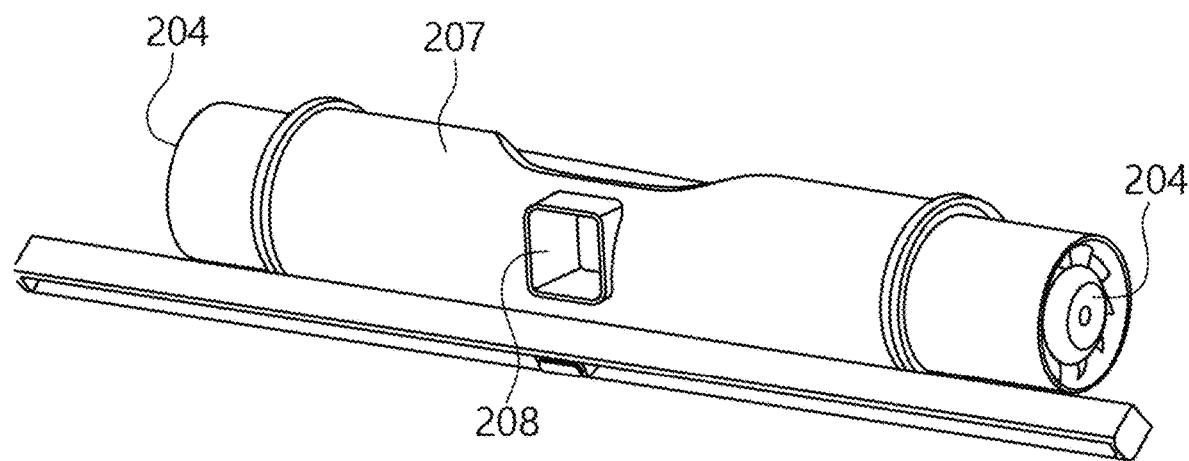
FIG. 17 is a partial view of various internal parts of the bar of FIGS. 14-16 according to an embodiment of the present invention.

FIG. 17 is a partial view of various internal parts of the bar 200 according to an embodiment of the present invention. In particular, FIG. 17 shows the bar 200 with its cover removed to reveal a pair of flow generators 204 and an air conduit 207. The bar 200 may include a pair of flow generators 204 that receives inlet air from the air inlets 202 and generates forced airflow through the air conduit 207. The air conduit 207 may include an intermediate outlet 208 through which the forced airflow may pass and be vented out by the second air outlet 201.

Figure 18:
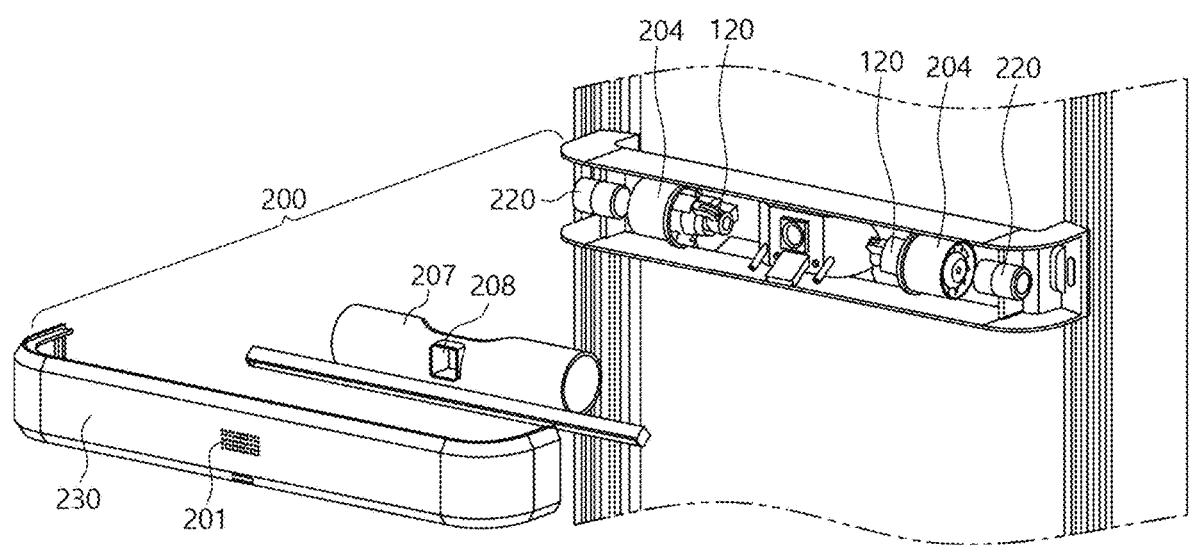
FIG. 18 is an exploded view of various parts of the bar of FIGS. 14-17 according to an embodiment of the present invention.

FIG. 18 is an exploded view showing various parts of the bar 200 according to the embodiment of the present invention described above with respect to FIG. 17.

Referring to FIG. 18, the bar 200 has its cover 230 removed to show various internal parts including a pair of flow generators 204, a pair of motors 220, a pair of thermal devices (for example, resistance heaters, thermoelectric devices, and other suitable devices could be used), and an air conduit 207. The bar 200 has a pair of flow generators 204 which receive inlet air from one or more air inlets (see FIGS. 15 and 16). The pair of flow generators 204 generate forced airflow from the received air which has a relatively high speed. For example, the flow generator may be Smart Inverter Motor™ that sucks in air and expels air at high speed by operating up to 115,000 RPM. However, other types of axial fan assembly may be used.

The forced airflow from the pair of flow generators 204 pass through the air conduit 207 to be expelled from the intermediate outlet 208. The air conduit 207 is shown to be cylindrical but is not limited to this shape and other configurations may be used such as an oval tube, a square tube, a rectangular tube, etc. The air conduit 207 contains the air sucked in by the pair of flow generators 204 within the confines of the air conduit 207 thereby increasing the speed of the forced airflow if not maintaining the speed of the forced airflow expelled by the pair of flow generators 204. Thus, a forced airflow of relatively high speed is introduced into the intermediate outlet 208. The expelled air is ultimately forced out of the second air outlet 201. While the present embodiment illustrates using a pair of flow generators, in other configurations a single flow generator or more than two flow generators may be used.

In the present embodiment, a pair of resistance heaters 120 are shown as part of the bar 200. A resistance heater 120 is located downstream of each of the flow generators 204. In alternative configurations, the resistance heater may be located upstream of the flow generator or may be integrated with the flow generator. In the present embodiment, the flow generators 204 and resistance heaters 120 are at least partially enclosed within the air conduit 207 (see FIG. 17). The air conduit 207 may guide the air heated by the resistance heaters 120 towards the intermediate outlet 208 and out through the second air outlet 201.

While this embodiment uses resistance heaters to heat the inlet air flow, in another exemplary embodiment, a thermoelectric device, for example, using the Peltier effect may be used to heat or cool the inlet air flow. In this configuration, the bar 200 is not limited to expelling heated air but may also expel cold air.

The bar 200 may further comprise one or more motors 220. As shown in FIG. 18, one or more motors 220 may be provided along a longitudinal axis of the bar 200 which may be parallel to the drying face 14 of body 100. The one or more motors 220 may cause the bar 200 to tilt up or down by rotating about its longitudinal axis. By tilting the bar 200 up or down, the bar 200 may expand the coverage area to which the forced airflow may be applied. Also, by tilting the bar 200 up and down continuously while blowing forced air, the bar may enhance drying performance.

Figure 19:
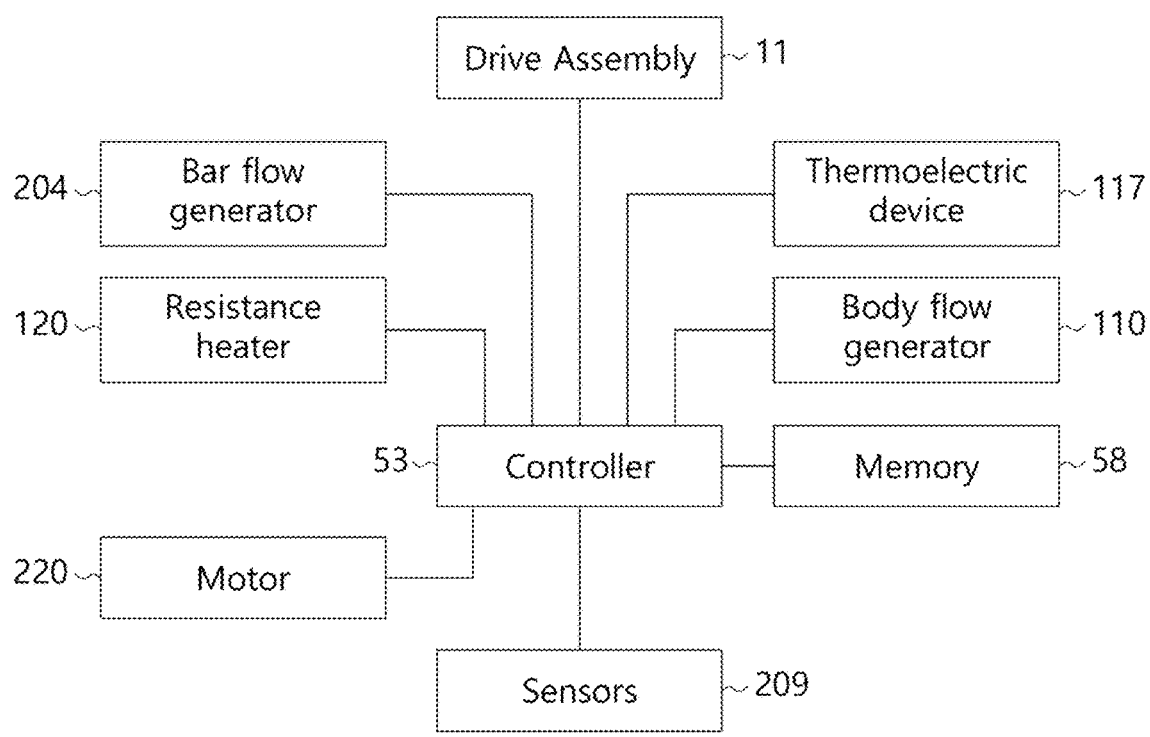
FIG. 19 is an electrical schematic diagram of the drying apparatus according to an embodiment of the present invention.

FIG. 19 is an electrical schematic diagram of a drying apparatus 10 according to an embodiment of the present invention. A controller 53 controls the overall operation of the drying apparatus 10. The controller 53 may be a microprocessor, an integrated circuit, an electrical circuit, a logical electrical circuit, and the like.

The controller 53 may control the operation of the body flow generator 110 and the thermoelectric device 117 of the body 100; the controller 53 may control the operation of the flow generator 204 and the resistance heater 120 associated with the bar, and may control the motor 220, among others. The various operations which are performed by the components have been described above and further description will be omitted. The controller 53 may access or store information in a memory 58 for controlling the operation of the drying apparatus 10.

The drying apparatus 10 may include one or more sensors 209 which are also controlled by the controller 53. These sensors 209 may variously be associated with the body 100 and the bar 200 (e.g., FIGS. 12C and 15). In some embodiments, one or more sensors 209 may be located remotely from the drying apparatus 10.

According to various embodiments, such as the embodiments shown in FIGS. 12C and 15, for example, the one or more sensors 209 may be associated with the bar 200. The controller 53 may receive sensor information from the one or more sensors 209 of the bar 200 and the controller 53 may operate the drying apparatus 10 utilizing the sensor information as an operation parameter.

As an example, sensing information of the one or more sensors may be utilized by the controller 53 to determine various characteristics of the environment surrounding the apparatus and/or various characteristics and/or conditions of a user. For example, the sensing information may be utilized to determine the presence of a user; physical characteristics of the user including their overall and/or particular dimensions; wetness of a user's body and/or different parts of their body; temperature or heat of the ambient air and/or humidity of the ambient air, among others. To achieve this, the drying apparatus 10 may include one or more sensors 209 described below.

The one or more sensors 209 may include a thermal sensor such as an infrared sensor. The infrared sensor may be used to obtain information on the heat of the surroundings. For example an infrared sensor may be used as a temperature sensor to sense the temperature of the ambient air. Information on the temperature of the ambient air may be obtained to determine whether to condition the ambient air.

The infrared sensor may be used on a user's body located adjacent to the drying apparatus 10. Information from the infrared sensor may be utilized to infer or determine moisture levels of the user's body, and/or specific parts of the user's body. Information from the infrared sensor may be utilized to obtain an indication of the overall dimensions of a user's body, where body temperature differs from the temperature of the surrounding air.

The one or more sensors 209 may include a proximity sensor. The proximity sensor may be utilized to determine the proximity of the user to the drying apparatus 10. For example, information from the proximity sensor may be utilized to determine the distance of the user from the drying face 14 of the drying apparatus 10. When the user is within a predetermined distance of the drying face 14, the drying apparatus may be activated to dry the user. Information from the proximity sensor may utilized to control a forced airflow speed from the air outlet 101 and/or the air outlet 201 dependent on the distance of the user, in order to obtain a desired forced airflow speed directed at the user.

The proximity sensor may be utilized to determine if a user is undesirably close to the drying apparatus or a part thereof. For example, for safety reasons, it may be desirable to limit or prevent the movement of the bar 200 when a person is within a particular distance or position relative to it. This may include where part of a person's body is located above or below the bar 200, within its path of movement.

The one or more sensors 209 may include an image sensor. The image sensor may be utilized to obtain image information of the surroundings, determine the presence of a user, and determine overall dimensions of a user's body and/or specific parts of the user's body. The image sensor may be used in conjunction with or in lieu of the thermal sensor for information such as those mentioned above in order to obtain a more accurate information.

The one or more sensors 209 may include a humidity sensor. The humidity sensor may also be utilized to obtain information on the humidity of surrounding ambient air, for example, a humidity level of the bathroom in which the drying apparatus is installed. The drying apparatus 10 may be activated or used to remove moisture in the air until the humidity level is below a predetermined level. The humidity sensor may also be utilized to obtain information regarding the level of wetness/dryness of the user's skin. The information may be used to control heat applied to the forced airflow so that the user's skin does not become too dry.

Besides the exemplary sensors described above, other sensors known in the art may be used to achieve a desired result.

Figure 20A:
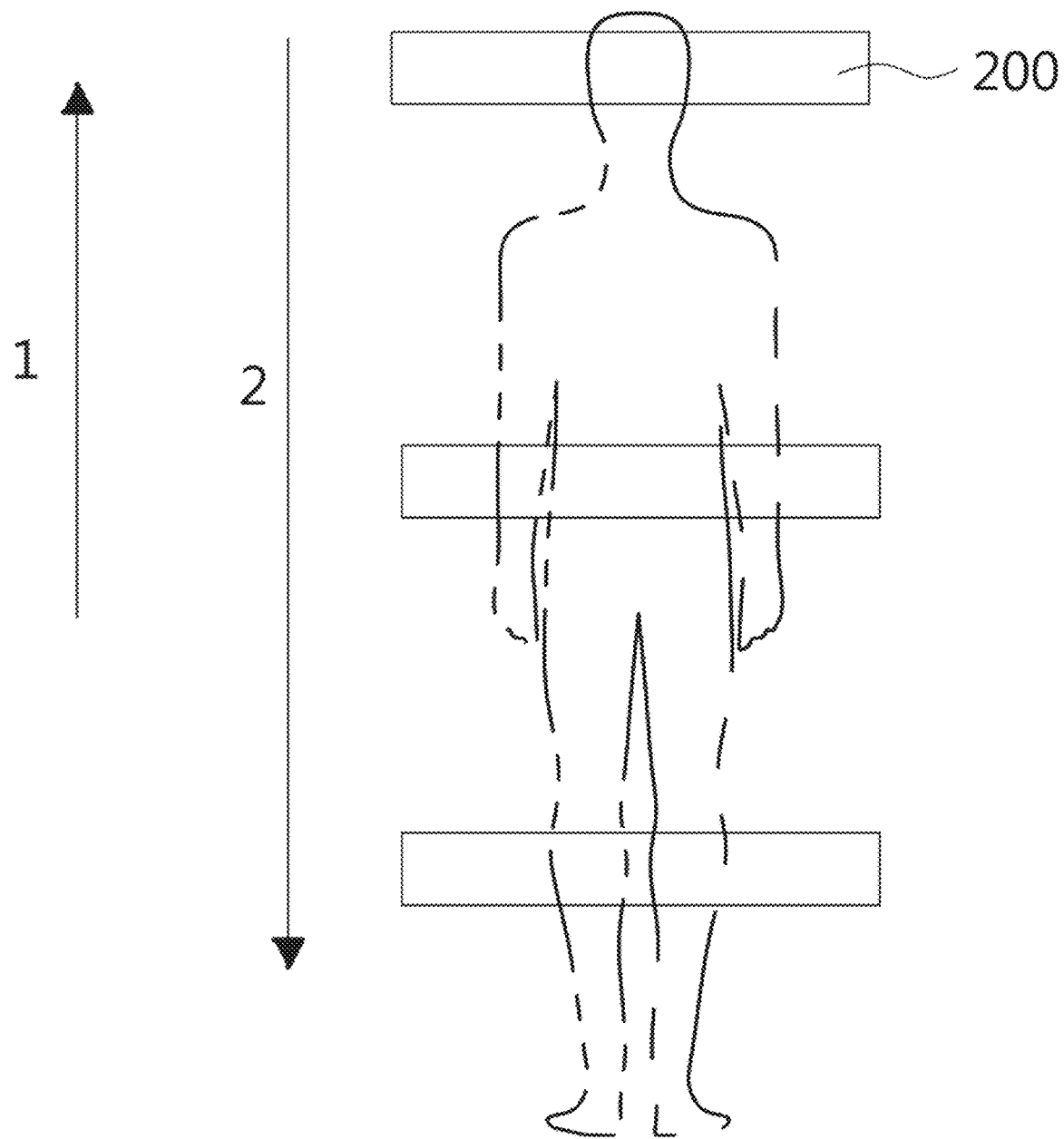
FIGS. 20A and 20B are views showing a user being dried with the bar of the drying apparatus according to an embodiment of the present invention.
Figure 20B:
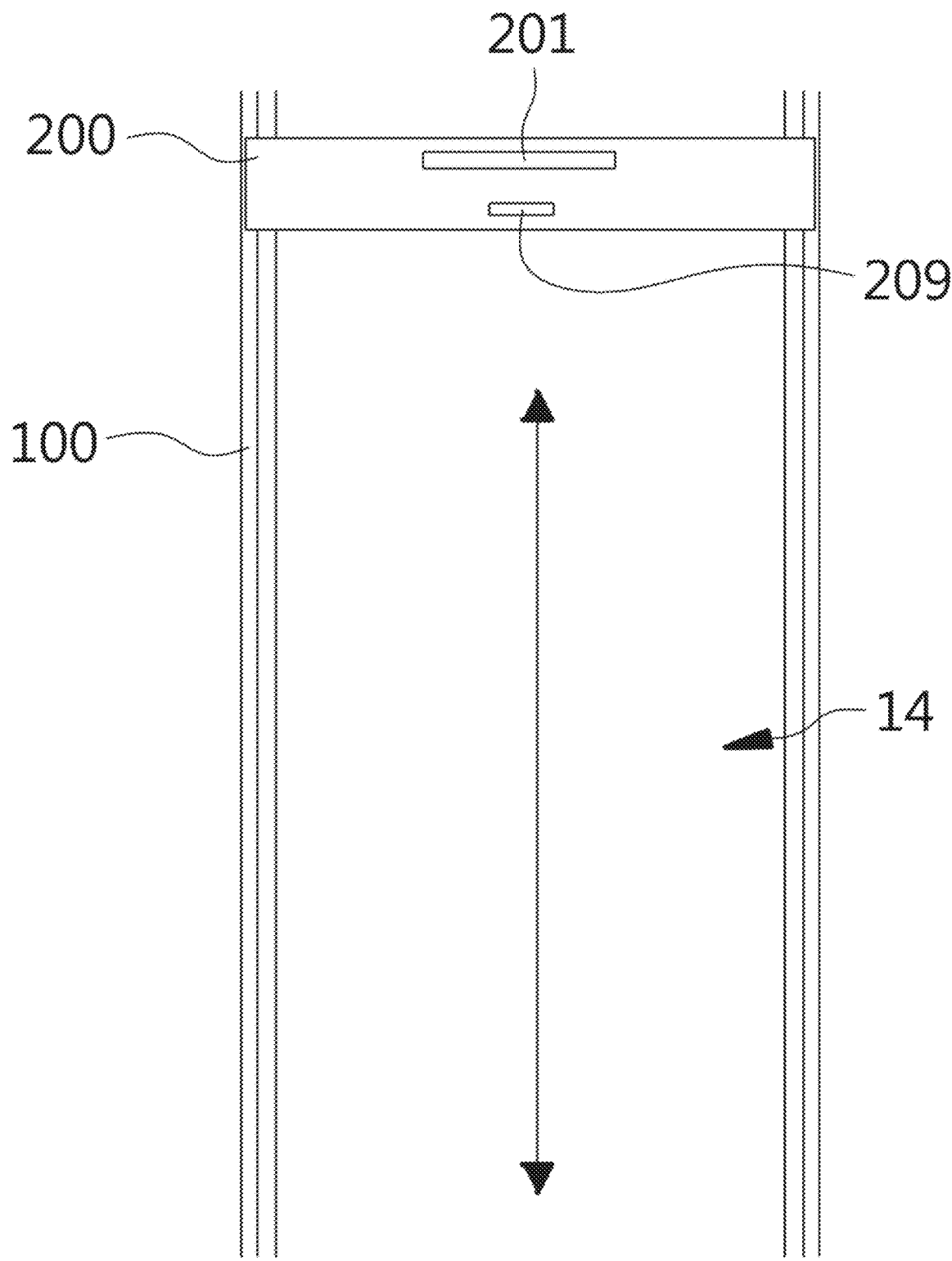

FIGS. 20A and 20B are views illustrating a user being dried by the bar 200 of the drying apparatus 10 according to an embodiment of the present invention.

Referring to FIGS. 20A and 20B, the bar 200 includes sensor 209 which may be a thermal sensor positioned such that it faces the user when the user is present at the drying face 14 of the body 100. While the bar 200 may be located at any position along the longitudinal length L1 of the drying face 14 of the body 100, in the present embodiment the starting position of the bar 200 may be somewhere approximating a middle portion of the drying face 14. When the drying apparatus 10 is activated, the bar 200 may be driven upward by the drive apparatus 11 in the direction of arrow 1. Coincidently, the thermal sensor may be activated.

As the bar 200 is driven upward, the thermal sensor scans the user. When the thermal sensor no longer detects thermal heat from the user, then the height of the user is determined to have been reached and the drive apparatus 11 may stop the movement of the bar 200. The drive apparatus 11 now may move the bar 200 downwards in the direction of arrow 2. At the same time the thermal sensor scans the user. The thermal sensor may operate to detect wetness at the part of the user being scanned. The thermal sensor may detect wetness on the user as being a cooler temperature and dryness as being a warmer temperature. The flow generator 204 and perhaps the resistive heater 120 may be activated to dry the user.

In another configuration, the flow generator 110 and perhaps the thermoelectric device 117 may be activated to dry the user. The flow generator 110 and the thermoelectric device 117 may be operated in combination with the operation of the flow generator 204 and the resistive heater 120 of the bar 200. The flow generator 110 and the thermoelectric device 117 may be continuously operated until the bar 200 has reached the bottom of the drying face 14 and then the flow generator 110 and the thermoelectric device 117 may be deactivated.

As shown in FIG. 20B, the bar 200 may be positioned by the head of the user. Because hair usually retains a lot of water, the thermal sensor may detect significant wetness when the bar 200 is in this position. Accordingly, the bar 200 may not move while the second air outlet 201 expels heated forced airflow to dry the user's head. When the thermal sensor detects that the user's head is sufficiently dry the drive apparatus 11 may move the bar 200 downwards in the direction of the arrow 2.

As the bar 200 moves downward in the direction of the arrow 2, the heated forced airflow expelled from the second air outlet 201 may dry the head, the body, and eventually the legs. While the bar 200 is transitioning from the head to the legs, the bar may stop, dry parts of the user which are more wet than other parts, before moving further down in the direction of arrow 2, until the bar 200 has reached to the bottom of the drying face 14.

In another embodiment, the bar 200, after initially reaching the head of the user, may move up and down repeatedly from head to toe until the thermal sensor senses that the user is dry. The movements of the bar described are exemplary and other forms of movement of the bar to dry the user may be conceived.

Figure 21:
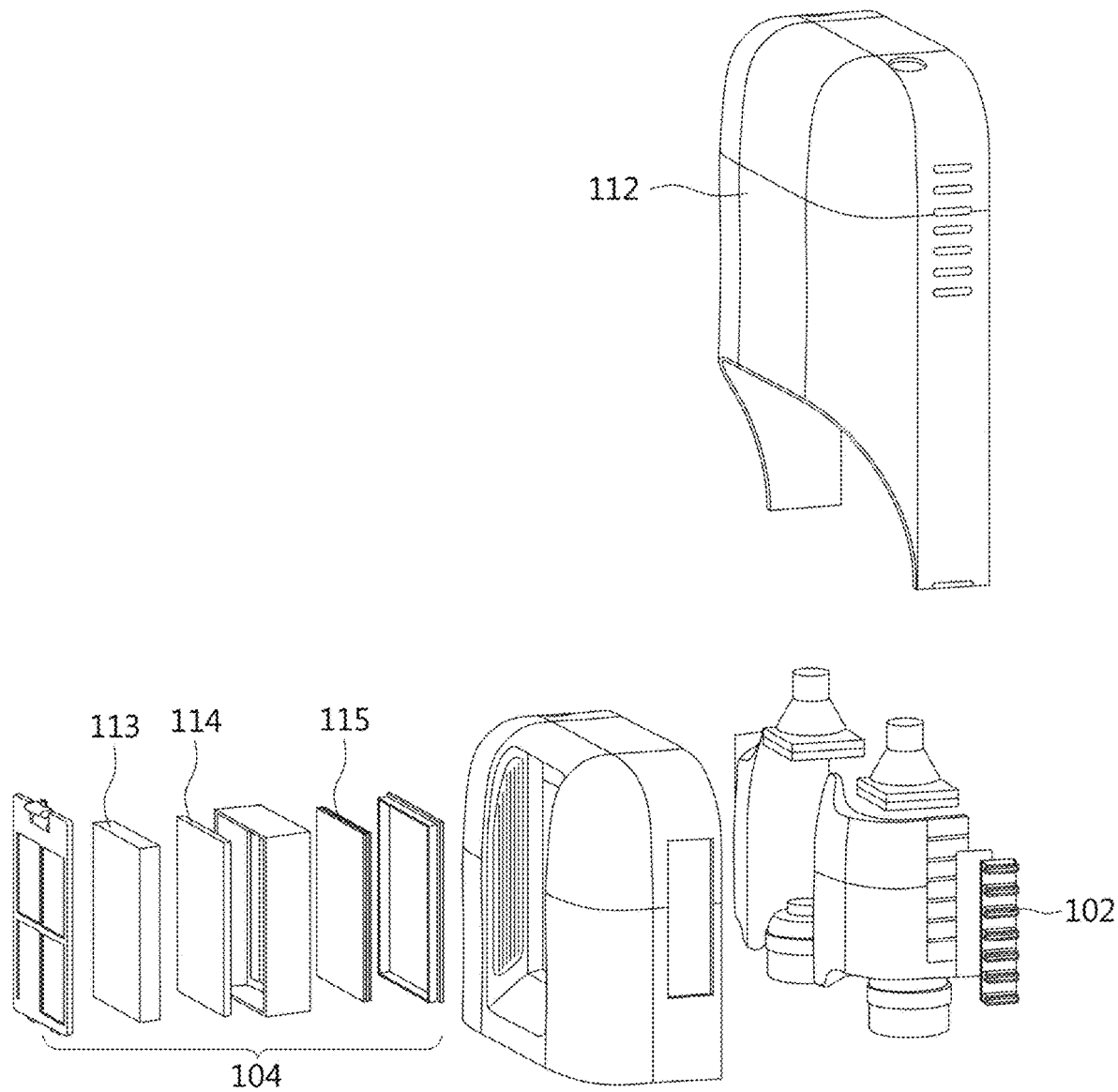
FIG. 21 is an exploded view of an upper region of the drying apparatus showing an exploded view of a filter unit according to an embodiment of the present invention.
Figure 22:
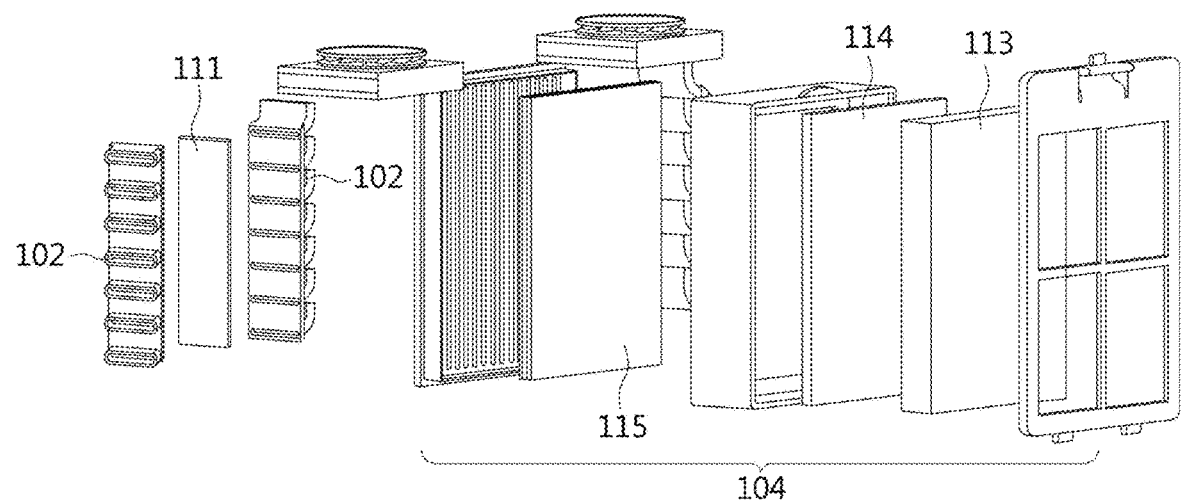
FIG. 22 is another exploded view of the filter unit of FIG. 26 according to an embodiment of the present invention.

FIG. 21 is an exploded view of an upper region of the drying apparatus 10 illustrating an exploded view of a filter unit according to an embodiment of the present invention; and FIG. 22 is another exploded view of the filter unit according to an embodiment of the present invention.

The filter unit 104 may provide one or more filtrations or treatments to inlet air flow. Ambient air, particularly in cities or other urban settings, may contain undesirable levels of particulate matter. Such particulate matter may be harmful to a person's health, and may also have undesired effects on a person's skin if blown onto the person when using the drying apparatus to dry their body.

For example, particulate matter may be either basic or acidic, and thus cause damage to a user's body. The filter unit 104 may comprise one or more particulate filters 113, such as is seen in FIG. 22, to capture particulate matter. The one or more particulate filters 113 may be in the form of any commonly available filter, for example, a fiberglass filter, a polyester filter, or a High Efficiency Particulate Air (HEPA) filter.

Ambient air is also likely to contain bacteria and viruses, which may pose a risk of infection to a user of the drying apparatus. If not entrained by a particulate filter 113, a filter unit 104 may include a bacterial and/or viral filter 114. Such a filter may include antimicrobial or antibacterial elements.

It may be desirable to reduce or remove moisture in inlet air before it is vented for drying. The filter unit 104 may include one or more dehumidifying filters 115, having for example a desiccant material.

In the present embodiment, a pair of air inlets 102 each pass the inlet air to the filter unit 104. The use of a single filter unit 104 may be desirable particularly where there are multiple flow generators to provide for a single point of servicing of any filters within the filter unit.

Figure 23:
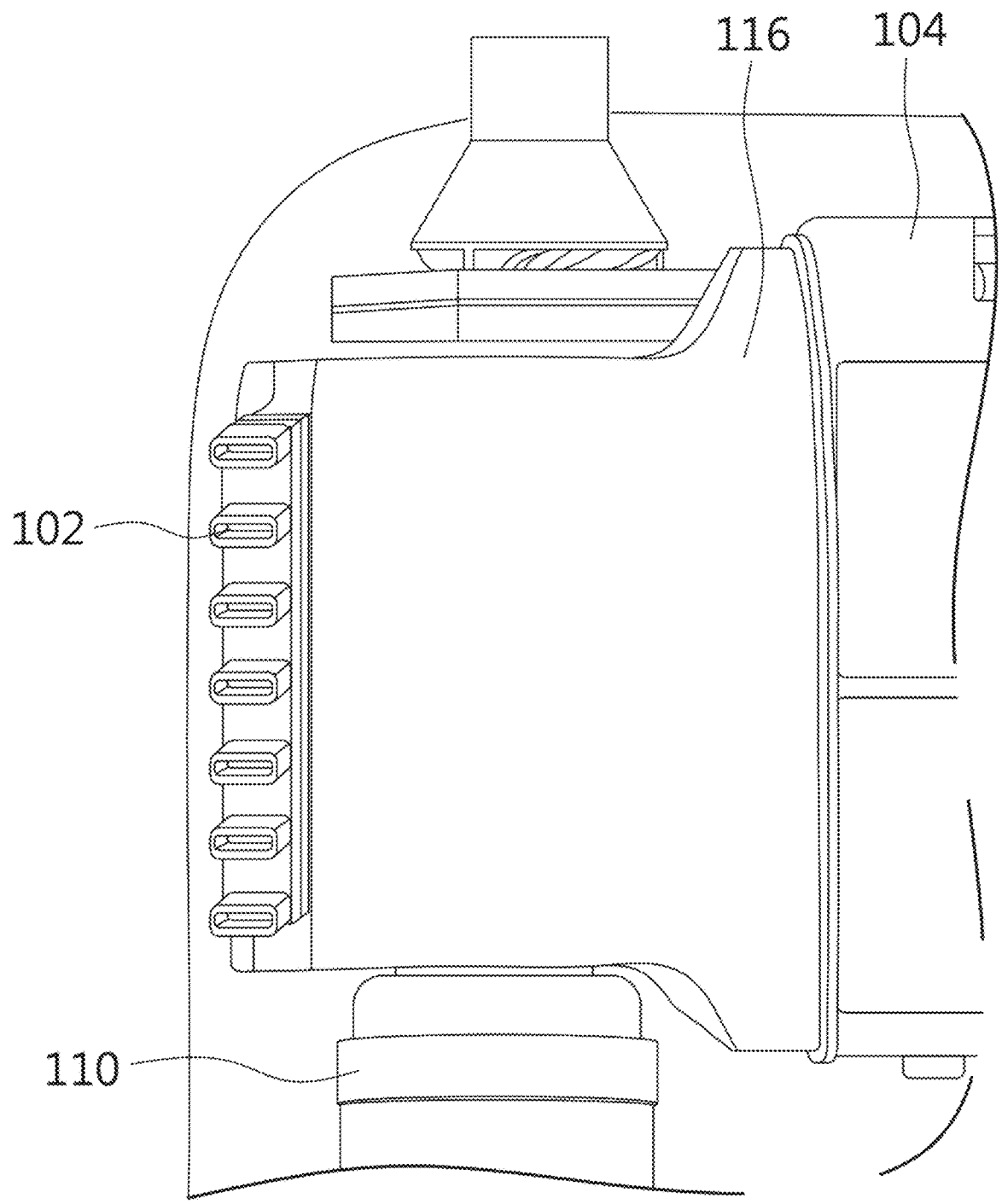
FIG. 23 is a front view of an air inlet and an inlet pathway at a flow generator housing according to an embodiment of the present invention.
Figure 24:
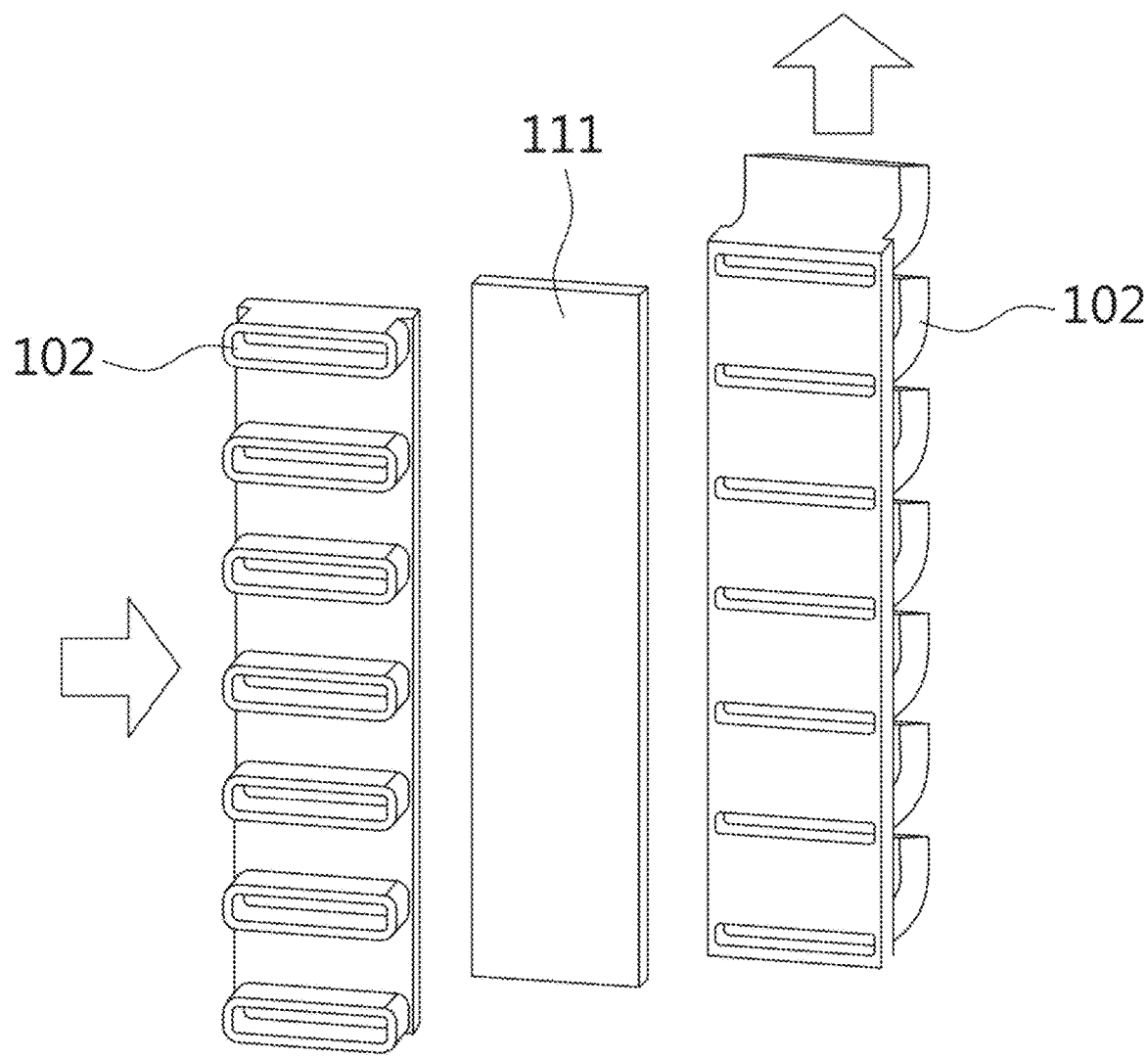
FIG. 24 is a partial exploded view of the air inlet of FIG. 28.
Figure 28:
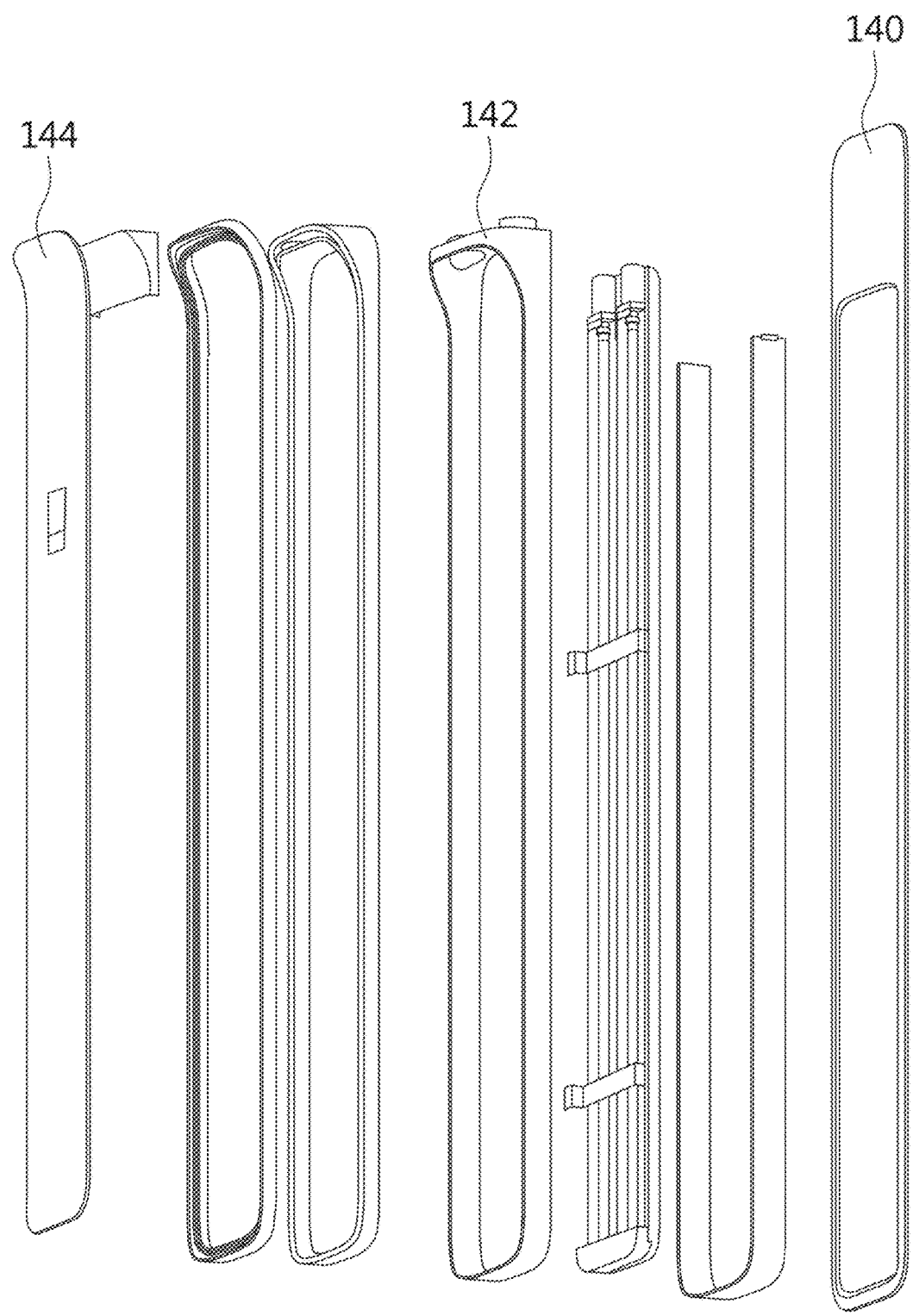
FIG. 28 is an exploded view of components of a drying apparatus according to an embodiment of the present invention.

FIG. 23 is a front view of an air inlet and an inlet pathway at a flow generator housing according to an embodiment of the present invention; and FIG. 24 is an exploded view of the air inlet of FIG. 28.

Referring to FIG. 23, an inlet pathway, which involves the air inlet 102 and the flow guide 116, directs inlet air from the air inlet 102 to the filter unit 104. However, because the drying apparatus 10 may be used in a wet environment, such a bathroom or shower, water may be splashed onto the drying apparatus 10 or into the air surrounding the drying apparatus 10, including the air inlets 102. Additionally, in use, there may be suction at the air inlets 102 due to operation of the flow generators 110 which could pull nearby water into the air inlets 102. It is undesirable that such water enters the drying apparatus 10. In addition to water making its way into the air inlets 102, the flow path may intake other matter passing through the air inlets 102 and into the flow guide 116.

As shown in FIGS. 23 and 24, the air inlets 102 provide for an upwardly deflected flow path into the flow guide 116. This upward deflection may act as a gravitational barrier to the ingress of water or other solid objects into the drying apparatus 10. To further prevent unwanted water or other matter passing into the flow path, an obstruction in the inlet flow path may additionally or alternatively be provided in the form of an inlet filter 111, for example as seen in FIG. 24. This inlet filter 111 may, more specifically, be in the form of a particulate filter, for filtering particles from the inlet air.

Alternatively the inlet filter 111 may be in the form of a macroscopic filter, such as a macroscopic mesh filter for guarding against the inletting of larger matter. Where it is desired to guard against water being drawn in with the inlet air or to dehumidify the inlet air the inlet filter 111 it may include a desiccant material for absorbing water.

As a further measure to dehumidify the inlet air, a resistance heater (not shown) may be placed adjacent to the inlet filter 111. When operated, the resistance heater may heat the inlet air to remove moisture in the air. Further, the resistance heater may remove moisture in the inlet filter 111 to increase the life of the inlet filter 111.

Figure 25:
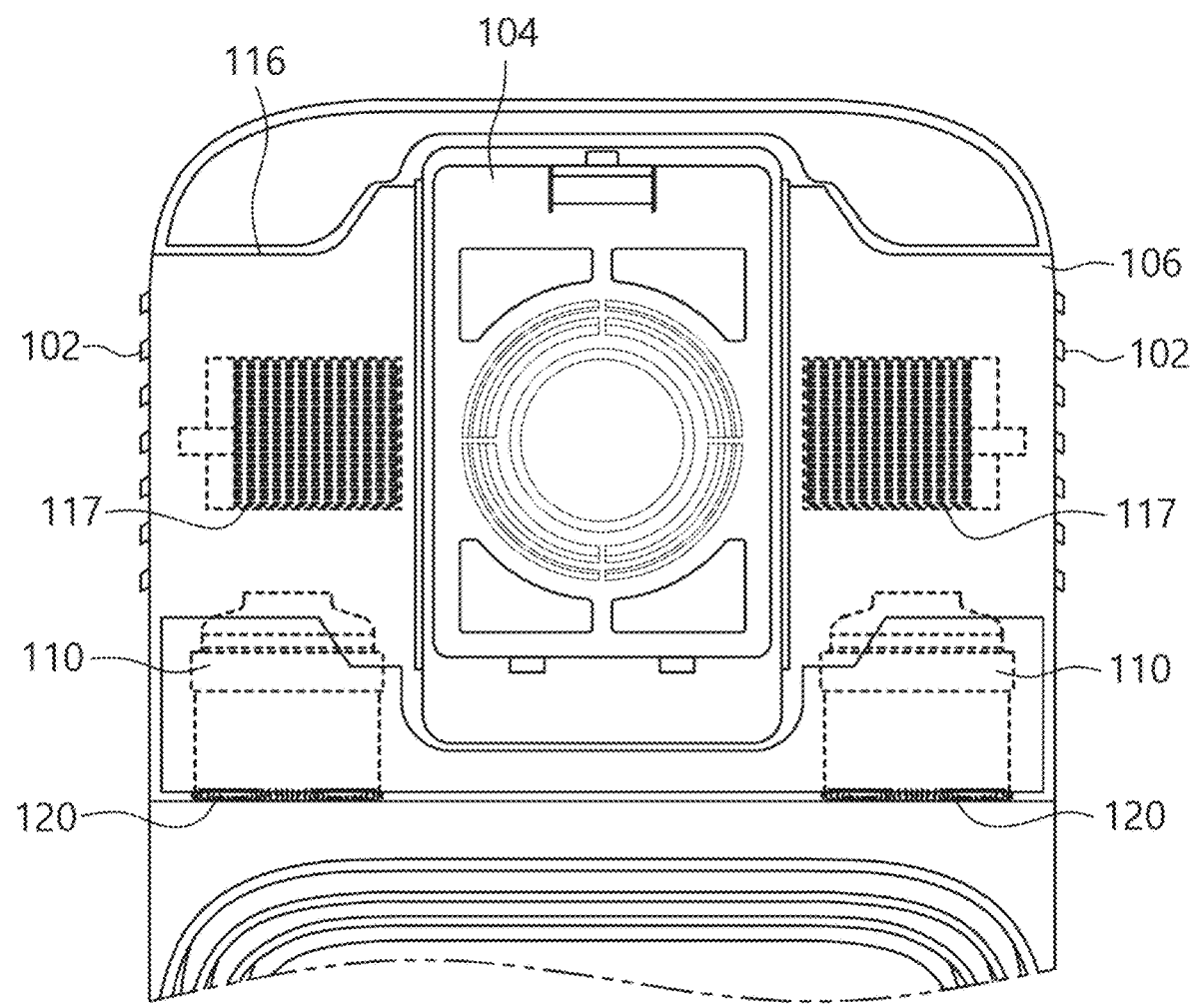
FIG. 25 is a front transparent view of an upper region of a drying apparatus according to another embodiment of the invention.

FIG. 25 is a front transparent view of an upper region of a drying apparatus according to another embodiment of the invention. For example, similar to the configuration shown in FIG. 9A, a connection between the flow generators 110 and the first air outlet 101 of the body 100 is such that the outlet of each of the flow generators 110 directly connects to the first air outlet 101 of the body 100. To provide added comfort for a user and/or increased drying efficiency, it may be desirable to further heat the air heated by the thermoelectric device 117. As seen in FIG. 25, air flowing from the filter unit 104 may pass by one side of the thermoelectric device 117 to be selectively heated or cooled.

While FIG. 25 shows a square shaped thermoelectric device 117 covering a portion of the outlet air flow pathway 105, it should be appreciated that the thermoelectric device 117 may be rectangular covering all of the outlet air flow pathway 105. That is, the thermoelectric device 117 may have a rectangular shape that covers all of the filtered air airflow pathway starting from the outlet of the filter unit 104 and ending at the inlet of the flow generator 110. Where the air is to be further heated, it may be desirable to heat the heated air downstream of the flow generator 110.

Thermal elements such as resistance heaters 120 may be provided at the downstream side of respective flow generators 110. The resistance heaters 120 may further heat the air forced by the flow generators 110 towards the first air outlet 101. The resistance heater 120 may be used as a booster to further heat or super heat the air heated by the thermoelectric device 117.

While in FIG. 25, the thermal elements are shown as resistance heaters, any other suitable thermal elements may be used. In other configurations the thermal element may be a thermoelectric device that may be used to selectively heat or cool the air at the downstream side of the flow generator.

Figure 26:
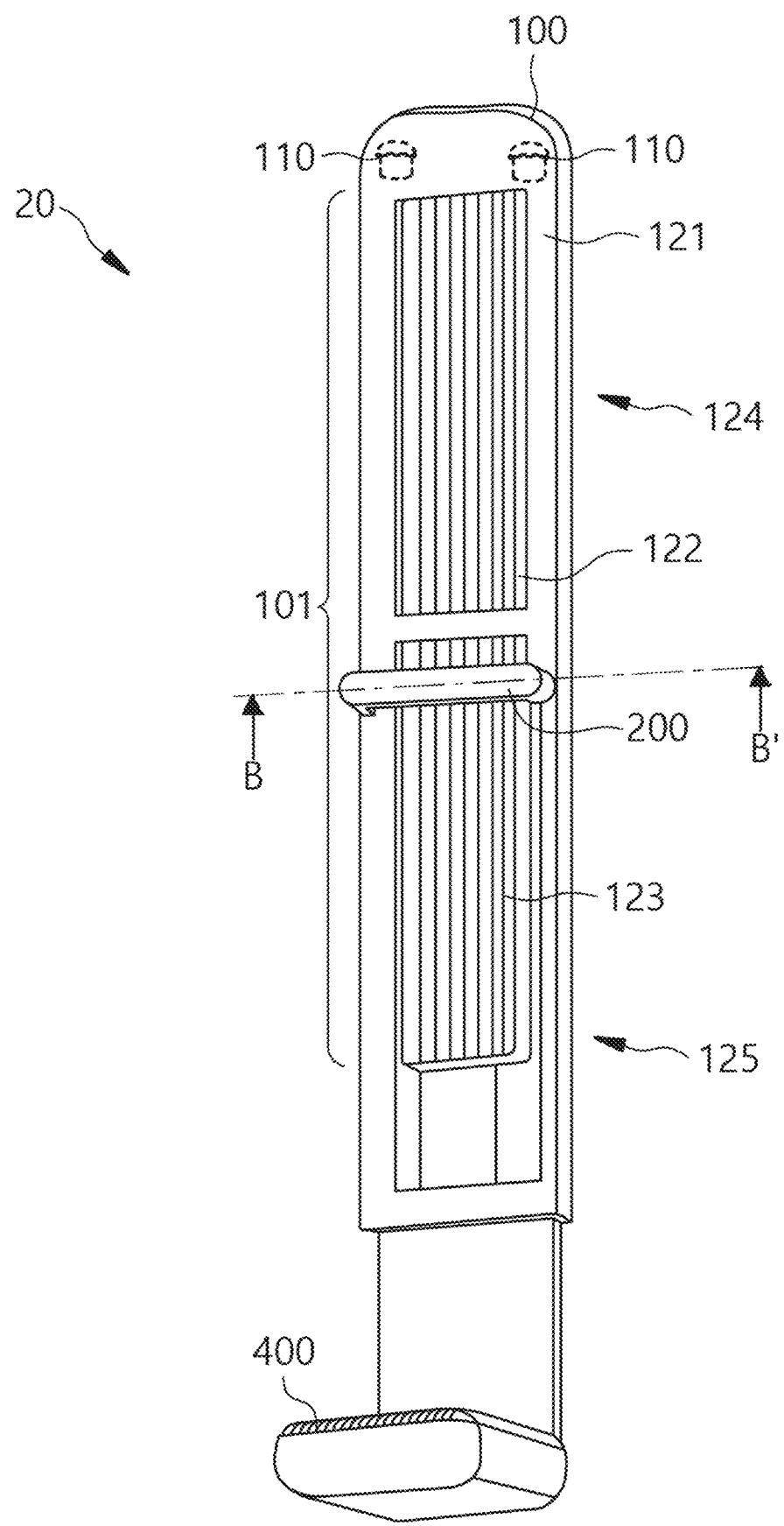
FIG. 26 is a perspective view of a drying apparatus according to an alternative embodiment of the present invention.
Figure 27:
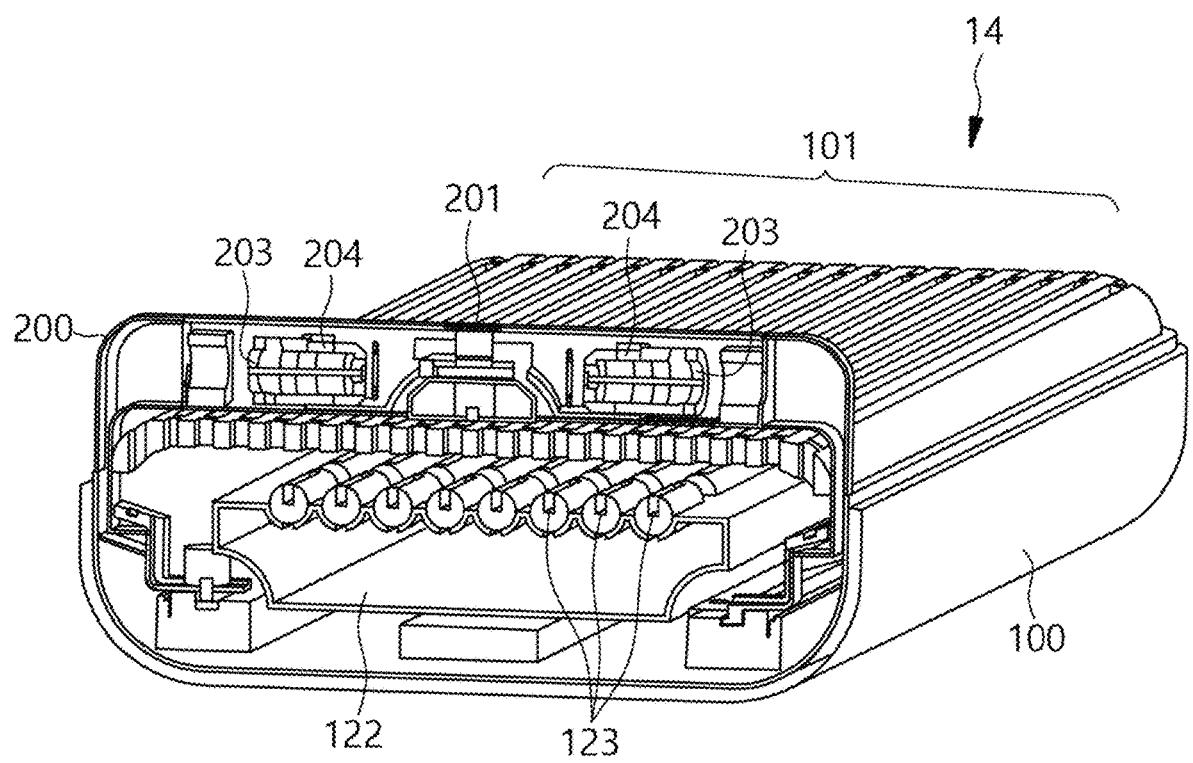
FIG. 27 shows a cross-sectional view along line B-B' of FIG. 31.

FIG. 26 illustrates a view of a drying apparatus 20 according to another exemplary embodiment of the present invention. FIG. 27 shows a cross-sectional view of a body 100 and a bar 200 of the drying apparatus of FIG. 26.

As shown in FIG. 26, in a drying apparatus 20, the first air outlet 101 may be distributed across at least a portion of the drying face of the body 100. Unlike the drying apparatus 10 described above, where the first air outlet 101 runs along a periphery of the body 100, the first air outlet 101 of the drying apparatus 20 includes outlet ducts 123 that are distributed across the face of the drying face 14. In the present embodiment, the outlet ducts 123 are a plurality of vertical slits running along a longitudinal length of the body 100 and disposed across the drying face 14. The outlet ducts 123 are provided in two zones, an upper zone 124 and a lower zone 129. This configuration may allow for differences in venting between different regions of the first air outlet 101.

FIG. 27 shows a cross-sectional view along line B-B' of FIG. 26 through the body 100 and the bar 200 where the first air outlet 101 is a distributed outlet across the drying face 14 of the body 100. In the drying apparatus 20, a pair of flow generators 110 may expel forced airflow to a duct 121 (similar to that shown in FIG. 8), to a duct 122, and finally on to a plurality of outlet ducts 123 from which the forced airflow is vented from the drying apparatus 20. Shown in cross-section is the duct 122 which may receive the forced airflow from the duct 121. The duct 122 may include a plurality of vertical slits running along a longitudinal length of the body 100 corresponding to the vertical slits of the outlet ducts 123. The duct 122 may vent the forced airflow to the plurality of outlet ducts 123 through the plurality of slits which, in turn is vented to the outside of the body 100 by the outlet ducts 123. The duct 122 and the plurality of outlet ducts 123 may comprise the first air outlet 101.

In this embodiment, the bar 200 may receive air from the flow generator or generators 110 of the body 100. For example, the bar 200 may have one or more air inlets, such as air inlets 203 as shown in FIG. 27. One example of a bar 200 having this configuration is shown in FIG. 16. Referring to FIG. 16, the bar 200 having a pair of air inlets 202 at the back side of the bar 200 may receive forced airflow from portions of the plurality of outlet ducts 123 which the pair of air outlets 202 covers. Referring to FIG. 32, the one or more air inlets 203 may receive air from the flow generators 110 in the body 100 and vent the air from the second air outlet 201.

In the present embodiment, the bar 200 is provided with a pair of flow generators 204 that further speeds the forced airflow received from the flow generators 110 of the body 100. However, in other embodiments, the bar 200 is not provided with flow generators 204 and vents the forced airflow received from the flow generators 110 of the body 100 as is. Although not shown, the bar 200 may include resistance heaters 120 as shown in FIG. 18. Although not shown, the bar 200 may include thermoelectric devices instead of resistance heaters. The bar 200 may further air condition the received forced airflow from the body 100. Otherwise, the bar 200 may not include an air conditioning device and may vent forced airflow air conditioned by the thermoelectric devices 117 of the body 100 without further air conditioning the received forced airflow from the body 100.

Referring back to FIG. 26, the drying apparatus 20 may further include a feet resting portion 400 on which a person may place their feet. The duct 122 may continue on to connect to the feet resting portion 400. The duct 122 may supply air flow to one or more air outlets of the feet resting portion 400 through which air vented from the one or more air outlets may dry the feet of the person. In the configuration shown in FIG. 26, the feet resting portion 400 may be configured to retract into the body 100 of the drying apparatus 20, for example, when not in use. However, in other embodiments, the feet resting portion 400 does not retract and may be stationary supported by the floor.

FIG. 28 is an exploded view of the body according to an embodiment of the present.

The body 100 may be covered with molded plastic covering. As shown in FIG. 28, the molded plastic covering may comprise a back panel 140, a side panel 142 and a front panel 144 covering the body 100. In another embodiment, the plastic covering may have a thin metallic plate adhered to its surface. Parts of the plastic covering may be snap fitted together. For example, one part may have a protrusion portion and another part to be fitted to may have a corresponding recess portion. When the two parts are snap fitted together, the protrusion portion fits into the recess portion and the two parts are fixed to each other. The plastic covering form an outer appearance of the body 100 and provide an aesthetically pleasing look. Being snap fitted together, the plastic covering of the body 100 may be removed by pulling the plastic covering off the body 100 and replacing with another plastic covering having a design or pattern meeting the preference of the user, and thereby being customized to the user according to their taste. It should be noted that the plastic covering 230 (see FIG. 18) of the bar 200 may also be removed and replaced with another plastic covering having a design or pattern meeting the preference of the user, and thereby being customized to the user according to their taste.

The drying apparatus described herein being operated in a wet environment, such as a bathroom or a shower booth, may be subject to becoming wet. Also, while a user is drying themselves water may be splashed unto the drying apparatus. The bathroom or the shower booth themselves may also become wet after use. Stagnant dirty water may cause an unpleasant odor and may cause germs to propagate resulting in a health risk. To address these problems, various embodiments and configurations of a drying apparatus for drying the bathroom, the shower booth, and the drying apparatus itself, among others, will now be described.

In the following description, the bar 200 and the second air outlet 201 may be operated independently or in conjunction with each other, as needed, to achieve the desired drying characteristics of the drying apparatus.

Figure 29A:
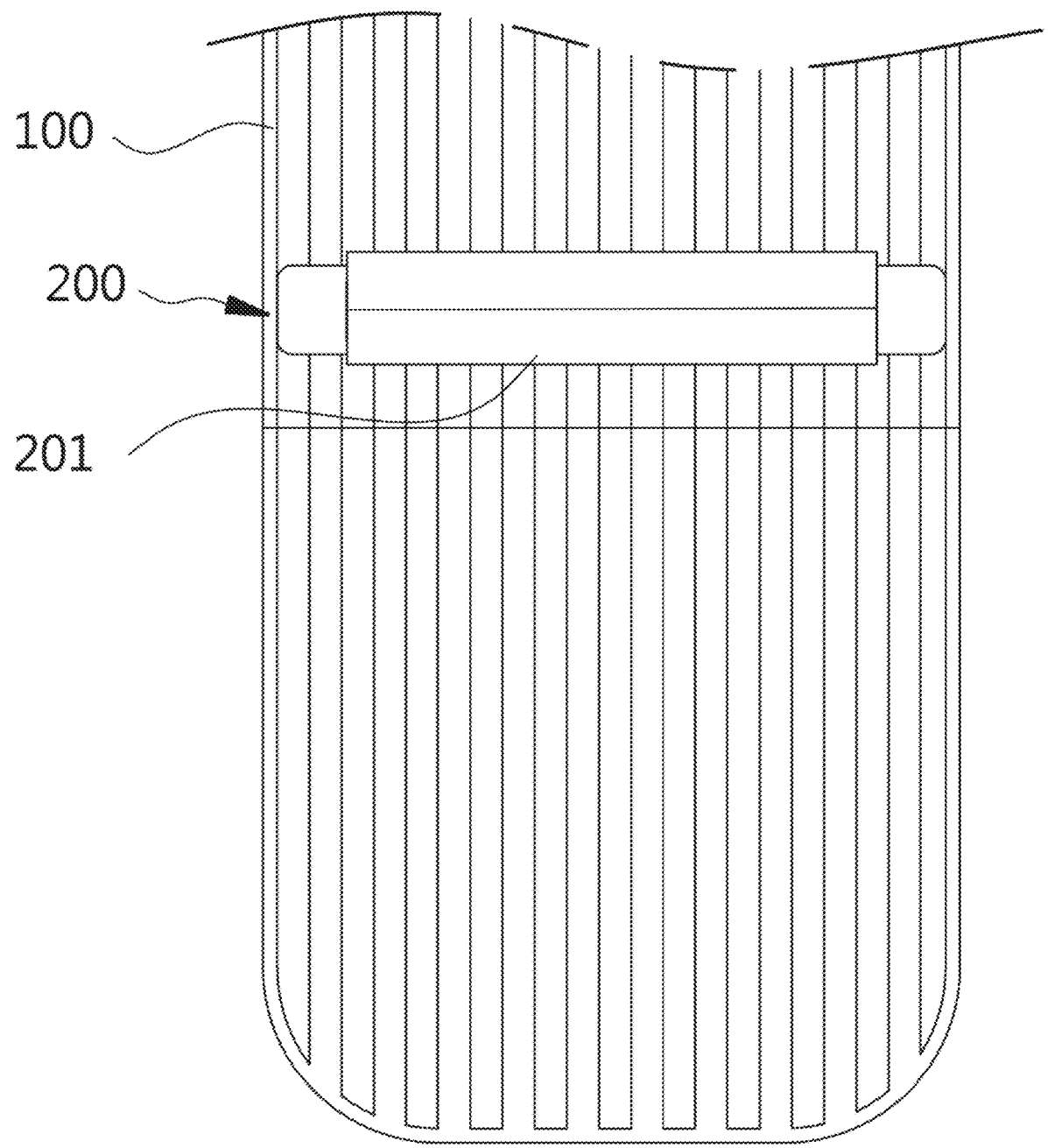
FIGS. 29A and 29B are views of a portion of a body showing a bar rotated according to an embodiment of the present invention.
Figure 29B:
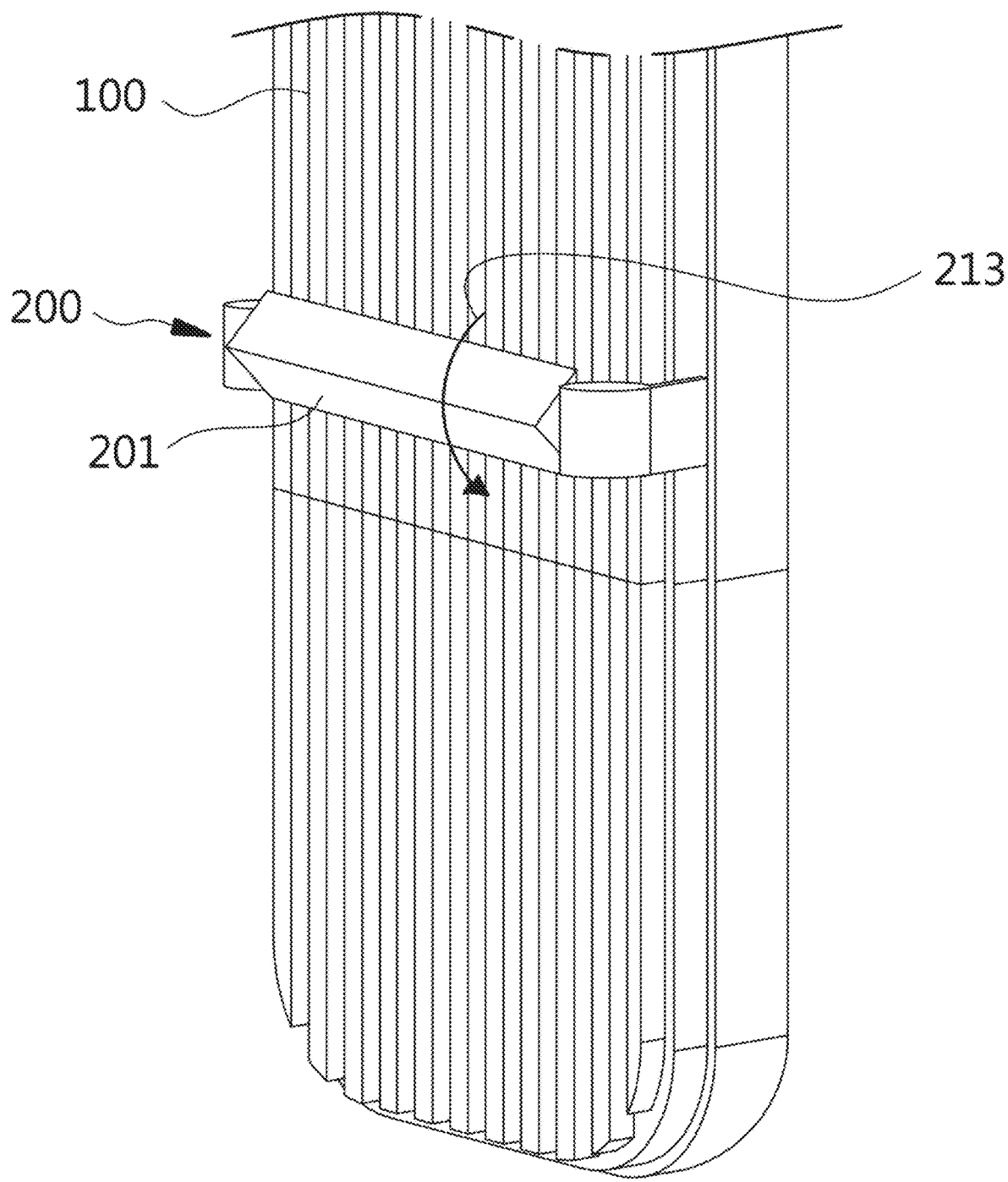

FIGS. 29A and 29B are two views of a portion of a drying apparatus showing a portion of the body 100 and the bar 200 with the second air outlet 201. The orientation of the second air outlet 201 of the bar 200 may be changed based on the drying need. For example, the second air outlet 201 may be selectively reoriented about a substantially horizontal axis by rotating at least a part of the bar 200 in the direction of arrow 213, as shown in FIG. 29B, thereby angling the opening of the second air outlet 201 in a relatively downward direction. The bar 200 may be rotated by a pair of motors 220 located on either end of the bar 200 (see FIG. 18). However, the present embodiment is not limited thereto and other devices may be used to rotate the bar 200. The selective control may be provided by a controller, such as the controller 53, which has been previously described herein (see FIG. 19).

Figure 30A:
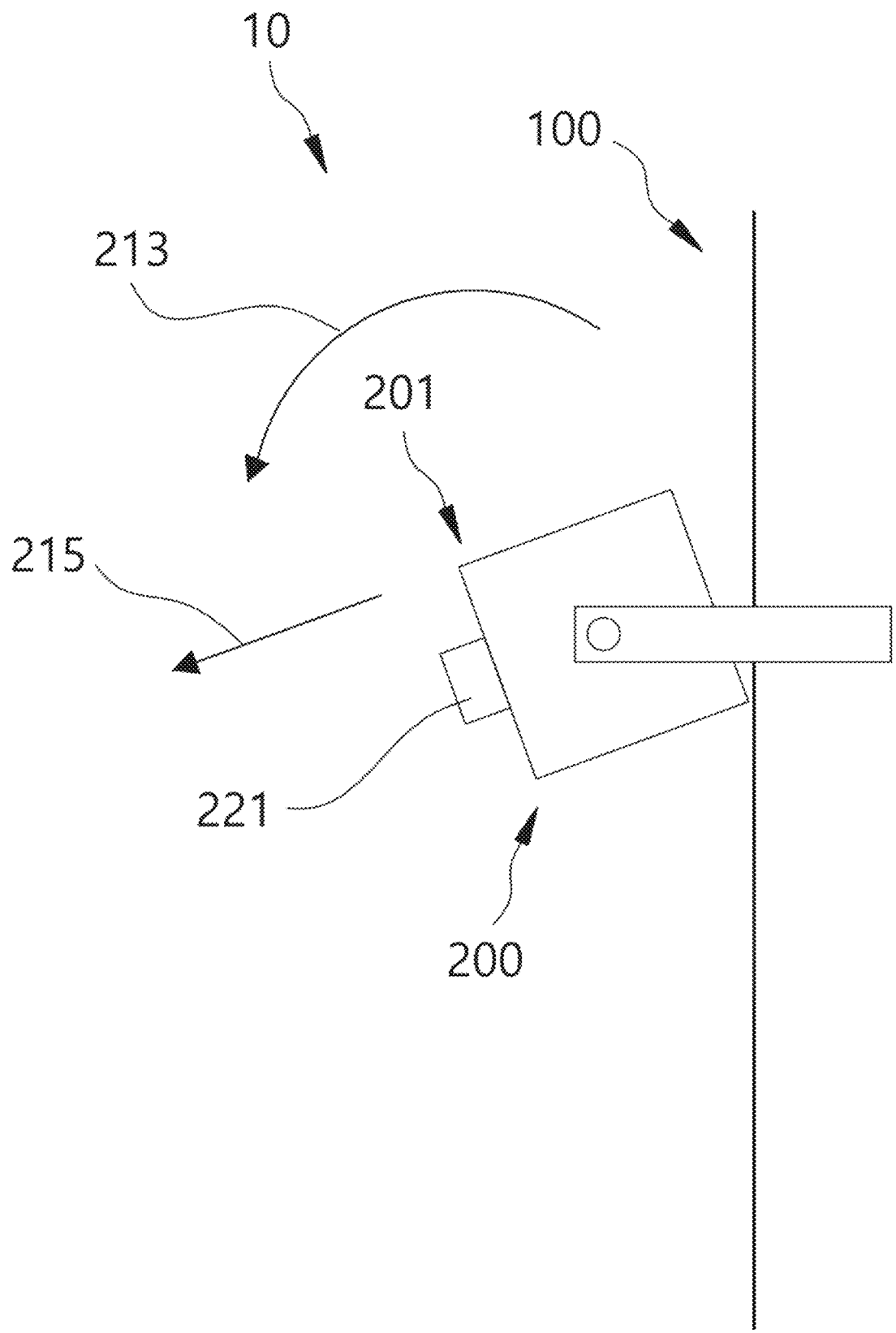
FIGS. 30A and 30B are schematic drawings showing different rotation orientations of the bar according to an embodiment of the present invention.
Figure 30B:
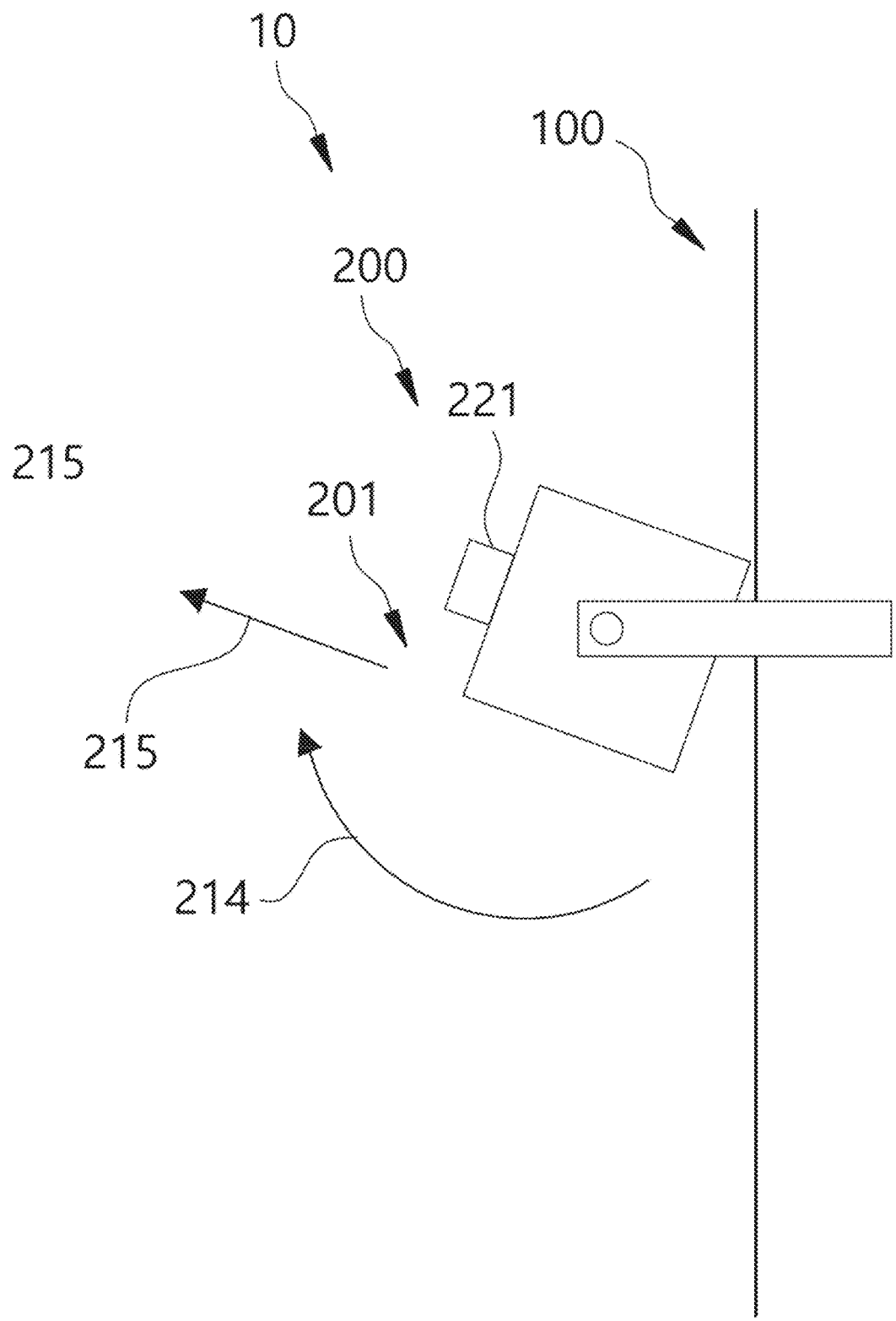

FIGS. 30A and 30B are side views of the rotational movement of the bar 200. FIG. 30A shows the rotation of the bar 200 and the second air outlet 201 in a downward direction, as indicated by the arrow 213, and the downward direction of the forced airflow from the air outlet 201 is shown by the arrow 215. FIG. 30B has the same configuration as FIG. 30A, but shows the rotation of the bar 200 and the second air outlet 201 in an upward direction, as indicated by the arrow 214, and the upward direction of forced airflow from the air outlet 201 is shown by the arrow 215.

As shown in FIGS. 29A, 29B, 30A and 30B, the direction of the outlet forced airflow 215 can be directed to different locations in a vertical direction relative to the body 100 by rotating the bar 200 and the second air outlet 201 around a substantially horizontal axis. For example, by controlling the rotation of the bar 200 and the second air outlet 201 around a substantially horizontal axis, the forced airflow 215 may be expelled to most or all of the areas facing the drying apparatus and/or the top and bottom areas relative to the drying apparatus 10. For example, when the drying apparatus 10 is installed in a shower booth, the forced airflow 215 may reach the wall opposite to the drying apparatus 10, as well as the ceiling and the floor of the shower booth.

A sensor 221 located at the bar 200 may be used to sense a wetness of an area. For example, the sensor 221 may be a thermal sensor, and may sense a wet area based on a temperature difference between the wet area and a dry area, and the forced airflow 215 may be directed to the wet area based on the reading of the sensor 221. The sensor 221 may be aligned with the direction of the forced airflow 215, and may detect the dryness of the area being dried by the forced airflow 215. Once the sensor 221 senses that the area is dry, the forced airflow 215 may be directed to a different area to be dried. For example, when sensor 221 is a thermal sensor, an increase in the temperature of an area may indicate that the area is being dried. Based on the readings of the sensor 221, the forced airflow 215 may be systematically or randomly directed to different areas until the area is partly or wholly dried to a desired degree.

In another exemplary embodiment, the forced airflow 215 may be stationary relative to the area to be dried or the forced airflow 215 may be rotated in one or more oscillating patterns of movement. For example, the forced airflow 215 may be rotated repeatedly between the positions shown in FIGS. 30A and 30B. The orientation of the forced airflow 215 to cover the entire area to be dried, for example, an entire shower booth, may be achieved using stationary airflow from the bar 200, a repeated rotation of the bar 200 between multiple positions while remaining stationary in a vertical direction, and/or a combination of the rotation of the bar 200 and the vertical movement of the body 200 with respect to the first body 100.

Although rotation of the bar 200 and second air outlet 201 about a substantially horizontal axis is shown in FIGS. 29A, 29B, 30A and 30B, the bar 200 and the second air outlet 201 may be additionally, or alternatively, be rotated around one or more other axes to control the direction of the forced airflow 215 to achieve a desired level of drying of an area to be dried. For example, the bar 200 and the second air outlet 201 may be rotated about two or three axes selected from multiple horizontal and vertical axes.

Figure 31A:
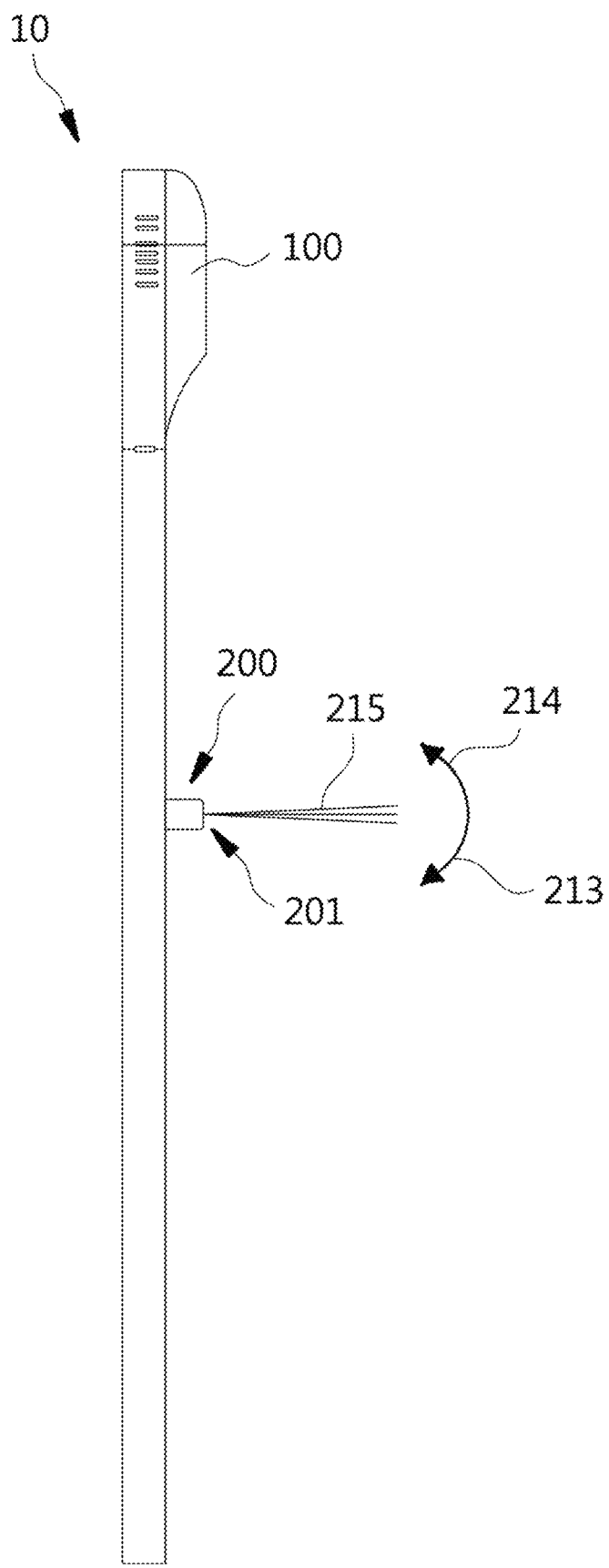
FIG. 31A-31D are side views of a drying apparatus with varying configurations of an airflow from an outlet of a bar according to embodiments of the present invention.
Figure 31B:
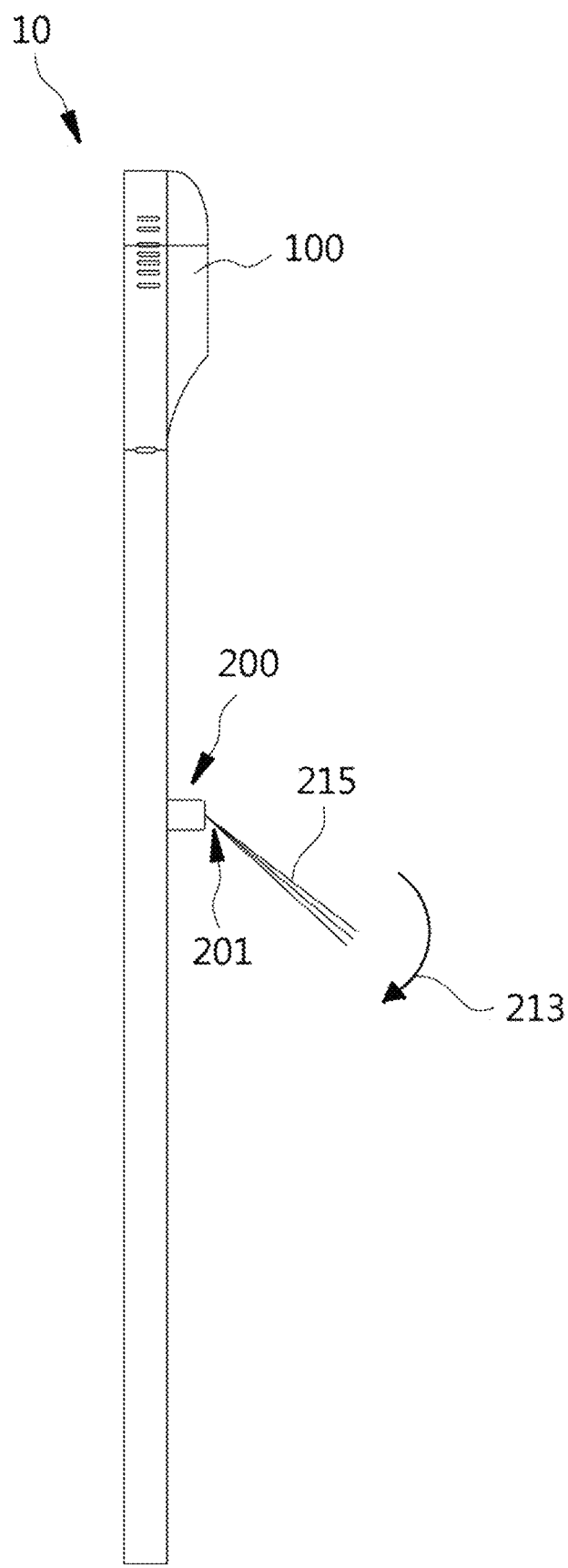

FIGS. 31A and 31B are side views of a drying apparatus 10 with the second air outlet 201 orientated in two different directions. As illustrated in FIG. 31A, the second air outlet 201 is orientated such that the forced airflow 215 is directed horizontally outwards from the drying apparatus. According to various embodiments, the second air outlet 201 may be controlled, for example, to reorient the forced airflow 215 either upwards in the direction of arrow 214 and/or downwards in the direction of arrow 213. This movement of the second air outlet 201 may be used to blow forced airflow over a wide area. The apparatus of FIG. 31B has the same configuration as illustrated in FIG. 31A, but the orientation of the second air outlet 201 has been changed so that the forced airflow 215 is directed downwards in the direction of arrow 213. Or when the second air outlet 201 has been directed downward, the forced airflow 215 is expelled. The second air outlet 201 is then reorientated to its original position. These movements of the second air outlet 201 may be used to perform a sweeping action towards or away from the drying apparatus 10.

Figure 31C:
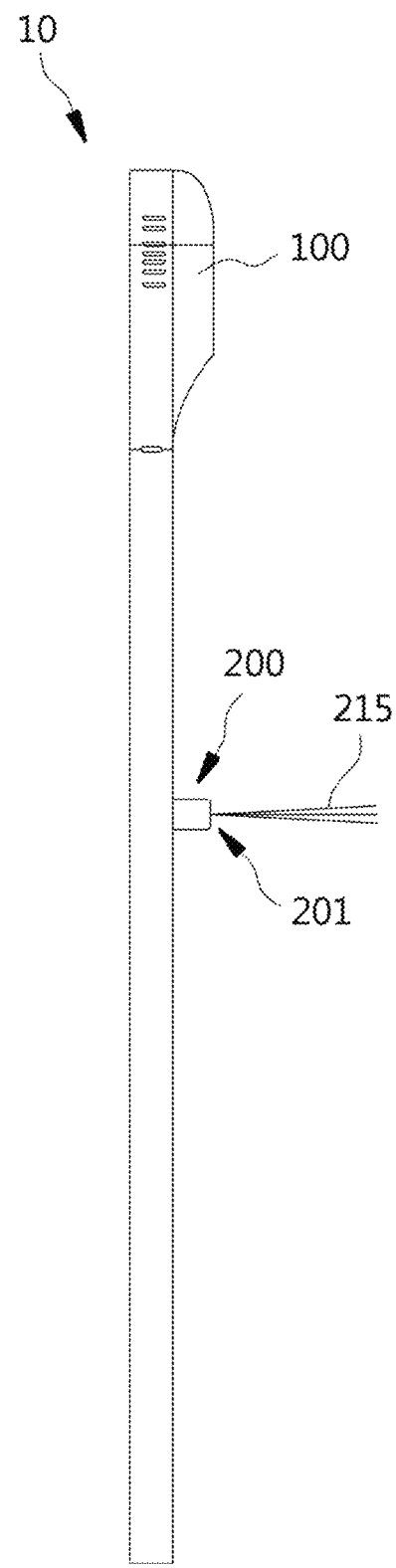
Figure 31D:
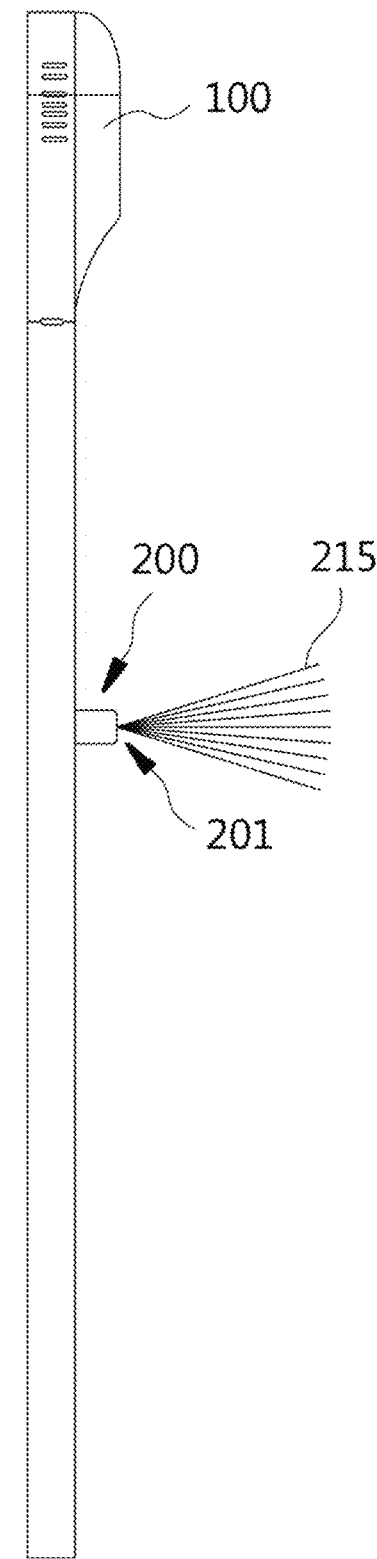

In addition to being redirected upwards and downwards, or around one or more other axes, in some exemplary embodiments the forced airflow 215 may be selectively expanded, as illustrated in FIGS. 31C and 31D.

The second air outlet 201 illustrated in FIG. 31C is substantially similar to the second air outlet 201 illustrated in FIG. 31A. However, the second air outlet 201 of FIG. 31C is configured such that the forced airflow 215 is jet-like with little or no degree of expansion in the vertical or horizontal direction. Alternatively, the second air outlet 201 may be configured to provide a greater degree of expansion of the forced airflow 215. For example, as illustrated in FIG. 31D, the forced airflow 215 may expand in a fan-like configuration. In the configuration of FIG. 31C and FIG. 31D, the degree to which the forced airflow fans out may be determined by the angle of the arc at the intermediate air outlet 208 (see FIGS. 17 and 18). As an example, a narrow arc may form a narrow but strong airflow covering a small part of the area. A wider arc may form a wider but weaker airflow covering a wider area. The shape of the intermediate outlet 208 and the angle of the arc may be selected depending on a desired effect of the forced airflow over the user's body. In one configuration, the intermediate outlet 208 may be formed with an adjustable nozzle so that the angle of the arc at the intermediate outlet 208 is adjustable, thereby depending on the angle of the arc, a jet-like forced airflow or a fan-like airflow may be expelled. A motor under the control of the controller 53 can be used to adjust the adjustable nozzle.

Figure 32A:
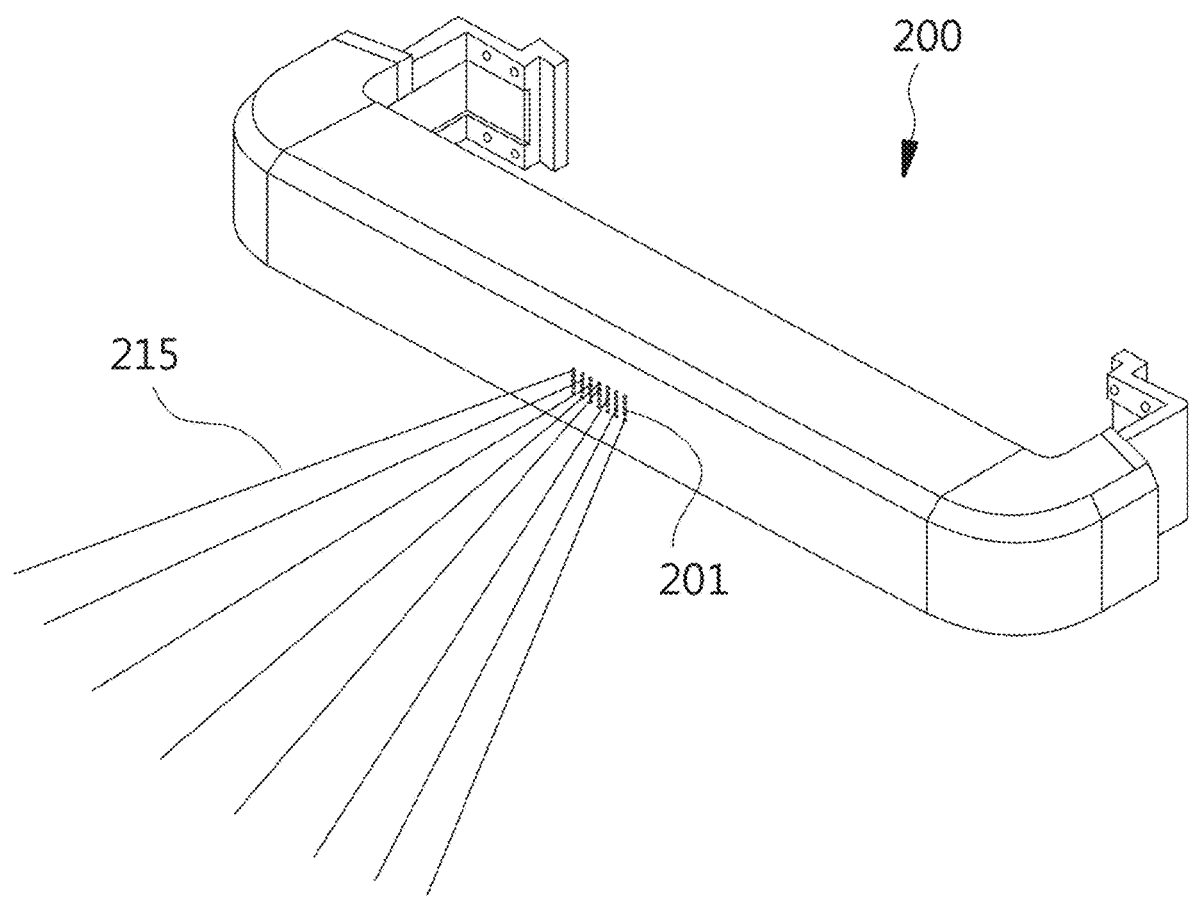
FIG. 32A-32F are varying airflow configurations of an air outlet of the bar according to embodiments of the present invention.
Figure 32B:
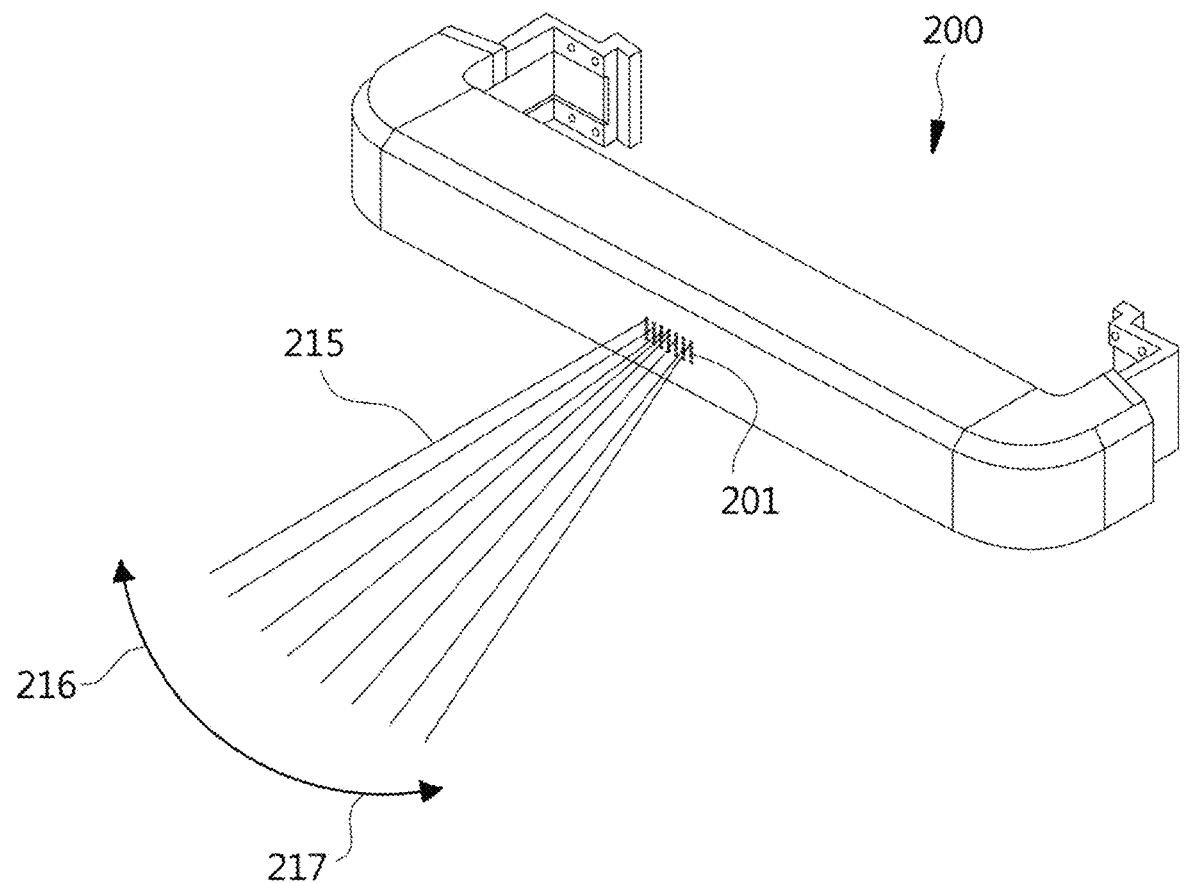

The forced airflow 215 may be additionally, or alternatively, expanded in a lateral direction, and may have different characteristics, as illustrated in FIGS. 32A and 32B.

As illustrated in FIG. 32A, the second air outlet 201 may be localized on the bar 200, and the forced airflow 215 may expand at least laterally from the second air outlet 201. This provides for an forced airflow 215 which increases in width with increasing distance from the bar 200, and the width of the forced airflow 215 is greater than the width of the second air outlet 201.

As illustrated in FIG. 32B, the lateral expansion and contraction of the forced airflow 215 may be controlled. For example, the forced airflow 215 may be controlled to be re-directed in a left and/or right direction as shown by arrows 216 and 217 of FIG. 32B. The airflow direction may be controlled by moving a nozzle or by incorporating fins or flow guides in the nozzle. For example, a nozzle at the intermediate outlet 208 may be moved in a left and right direction. A motor under the control of the controller 53 can be used to move the adjustable nozzle left and right.

Figure 32C:
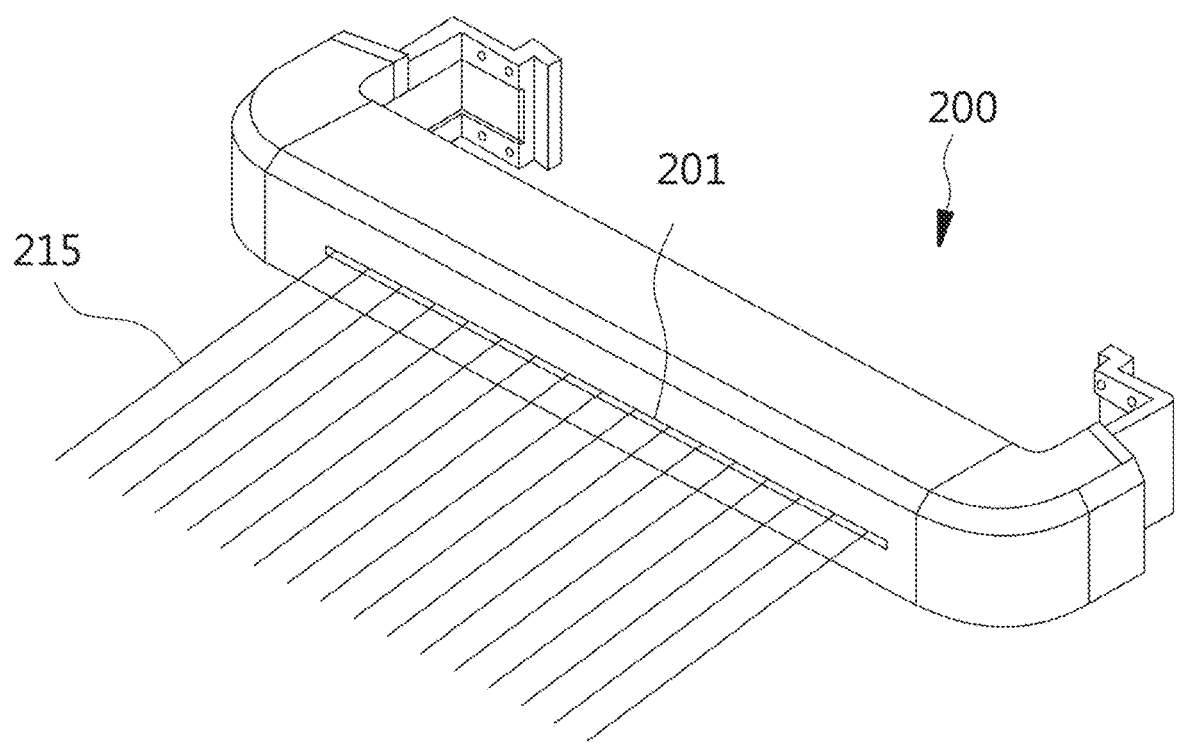
Figure 32D:
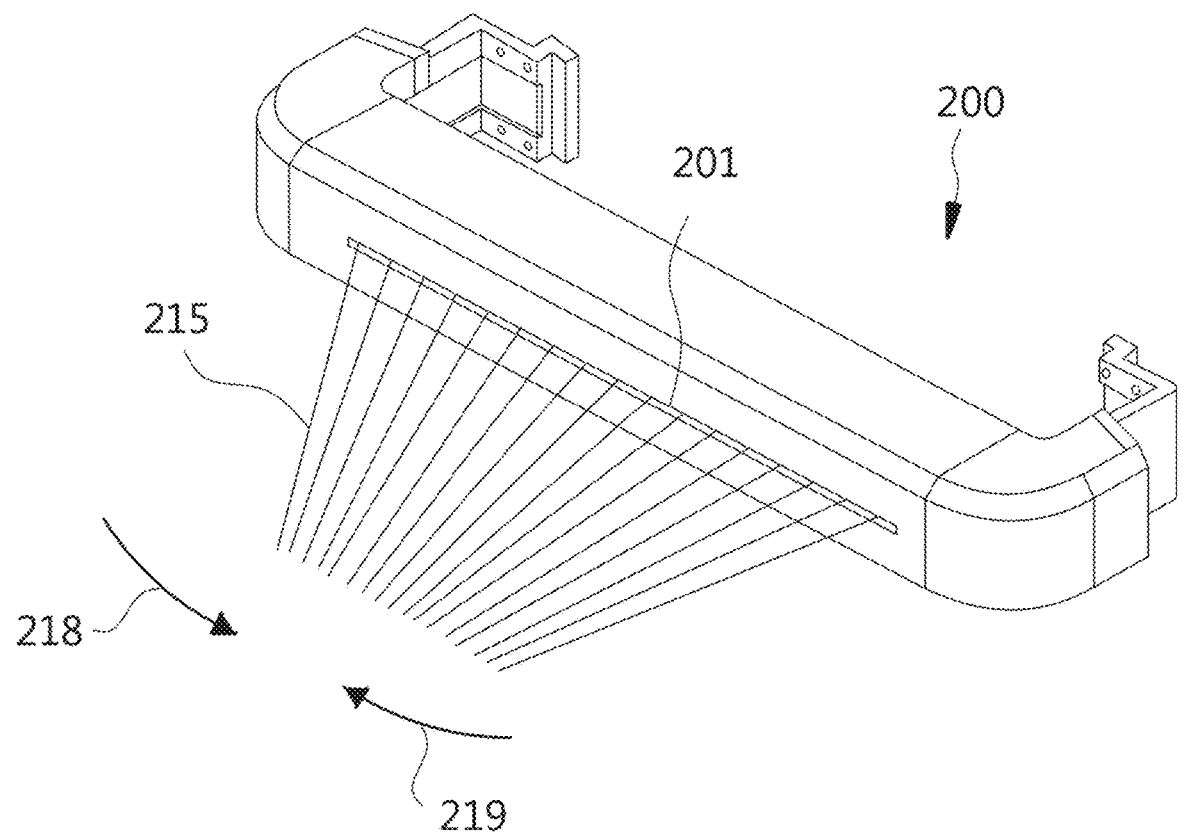

As illustrated in FIGS. 32C and 32D, the second air outlet 201 may be an elongated slit across the longitudinal length of the bar 200, such that the forced airflow 215 is substantially planar. In one configuration, the length of the slit may be sufficient to cover a width of the user's body. For this configuration, the intermediate outlet 208 may be formed as an elongated slit running across the longitudinal length of the air conduit 207. The second air outlet 201 being an elongated slit as shown in FIG. 32C corresponds to the slit of the intermediate outlet 208. In this configuration, as the bar 200 travels vertically up and/or down with respect to the body 100, the forced airflow 215 of the second air outlet 201 may cover a width of an area corresponding to the length of the slit The forced airflow 215 may be configured to extend from the second air outlet 201 with minimal or no lateral expansion, as illustrated FIG. 32C. Or the forced airflow 215 may be laterally expanded further, or may be constrained to be narrower than the air outlet 201. For example, as illustrated in FIG. 32D, the second air outlet 201 may be configured to change the degree of lateral expansion of the forced airflow 215 by contracting the forced airflow 215 in the direction of the arrows 218 and 219. For this configuration, a plurality of vertical shutters may be for formed at the outlet of the intermediate outlet 208. To contract the forced airflow, half of the shutters staring from the left side may be moved in the right direction and half of the shutters starting from the right side may be moved in the left direction. Conversely, to expand the forced airflow, half of the shutters staring from the left side may be moved in the left direction and half of the shutters starting from the right side may be moved in the right direction. The shutters may be moved by a motor under the control of the controller 53.

Figure 32E:
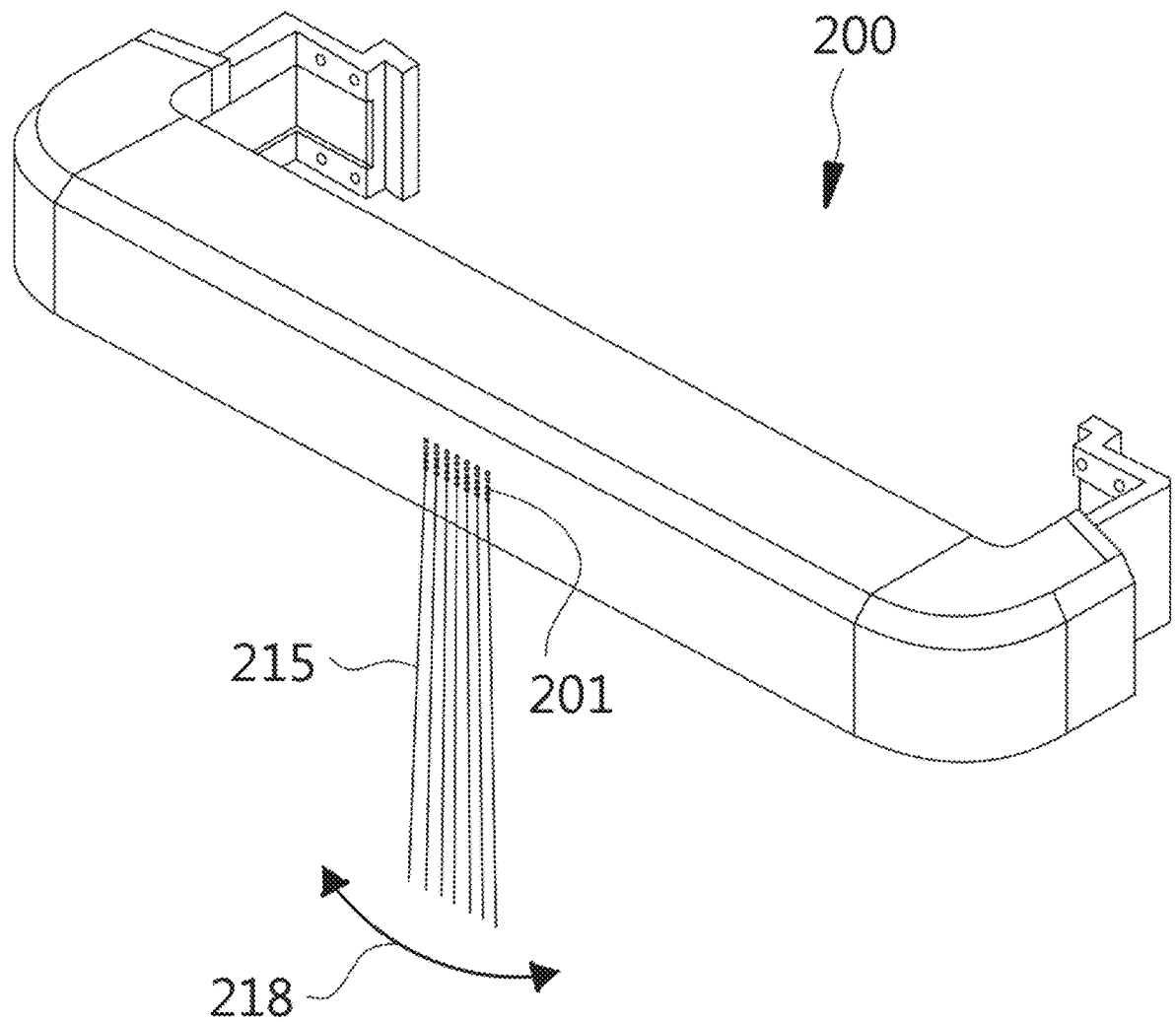
Figure 32F:
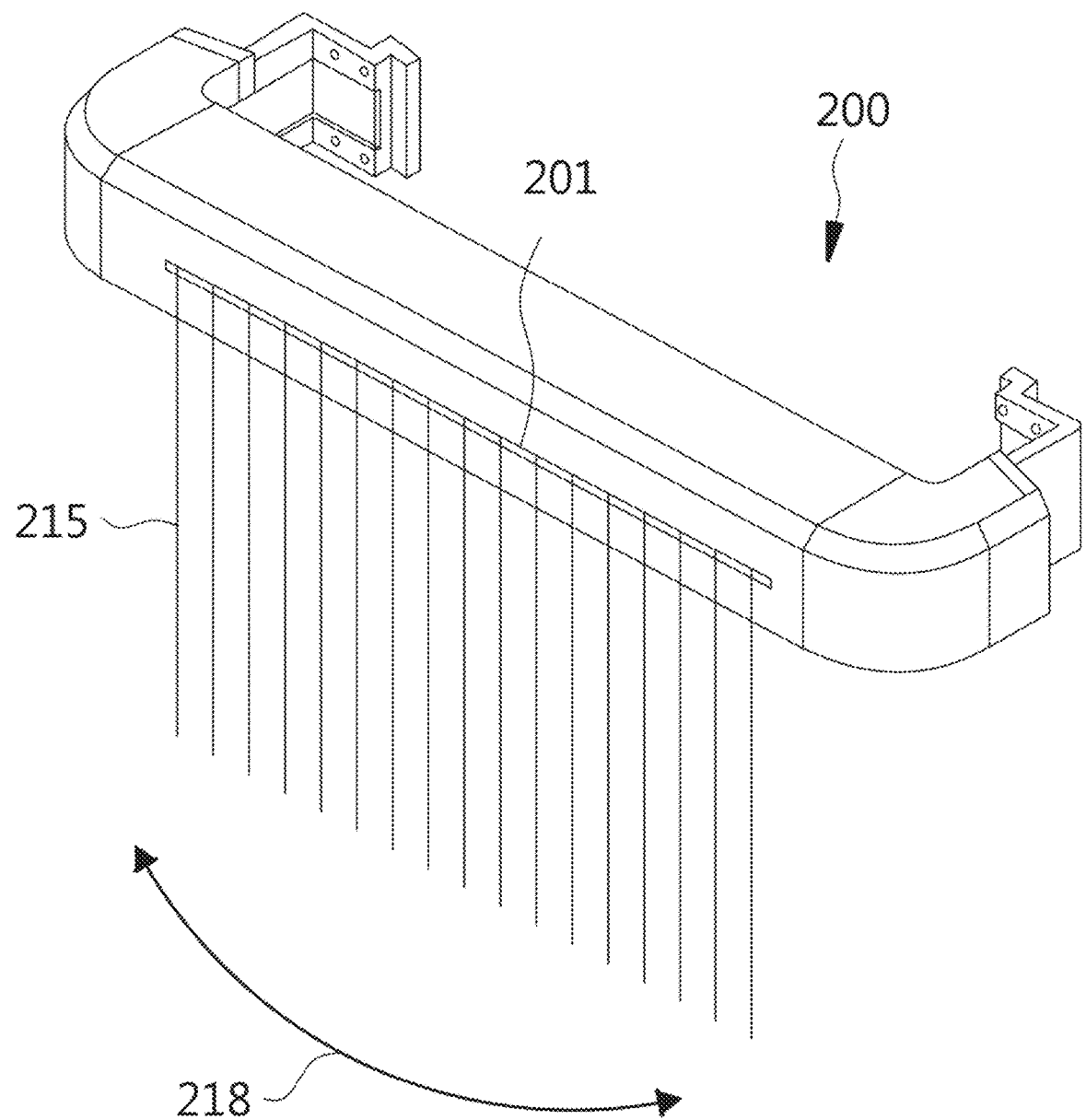

FIGS. 32E and 32F are alternate views of the bar 200 illustrating another orientation of the second air outlet 201 and the forced airflow 215. The configuration shown in FIGS. 32E and 32F may be useful for drying, for example, the side walls of a shower booth.

The configuration of the second air outlet 201 of FIG. 32E is substantially similar to the configuration of the airflow outlet illustrated in FIGS. 32A and 32B. In addition, or alternatively, to any lateral expansion or contraction of the forced airflow 215, the second air outlet 201 may be operated to laterally redirect the forced airflow 215. For example, as illustrated in FIG. 32E, the forced airflow 215 can be redirected side to side in the direction of the arrow 218. This may be done through a movable nozzle as described above.

The second air outlet 201 of FIG. 32F has an elongated or slit-like configuration, as also illustrated in FIGS. 32C and 32D. As also illustrated in FIG. 32F, the forced airflow 215 from the outlet 201 may also be redirected side to side, for example, in the direction of the arrow 218, as illustrated in FIG. 32F. This may be done through movable shutters as described above.

By redirecting the forced airflow 215 from side to side, the configuration illustrated in FIGS. 32E and 32F may be useful for drying, for example, the side walls of the shower booth.

The up and down movement of the second air outlet 201 may be provided by a corresponding movement of a part or the whole of the bar 200 with which the second air outlet 201 is associated. Examples of such movement of a part or all of the bar 200 are illustrated in FIGS. 29A and 29B, as described above.

One or more drive mechanisms may be provided between the body 100 and the bar 200 to enable the up and down movement of the bar 200. An example of such a drive mechanism is a motor 220, as illustrated in previously described FIG. 18. As illustrated in FIG. 18, each of a pair of motors 220 may be provided at each side of the bar 200. The motor 220 may be a rotational motor or a stepper motor.

In addition to, or alternatively, it may be possible to reorient or otherwise configure the second air outlet 201 itself to redirect the forced airflow 215. Examples of such configurations where the air outlet 201 is reoriented to redirect the forced airflow 215 are illustrated in FIGS. 32A-32F. The second air outlet 201 may include one or more nozzles, shutters, or the like to redirect the forced airflow from the second air outlet 201. Examples been previously described herein. The reorientation or reconfiguration of the air outlet 201 may include the reorientation or reconfiguration of one or more of the flow guide elements. For example, when the forced airflow 215 is redirected laterally, as illustrated in FIGS. 32E and 32F, the air outlet 201 may include one or more vertical fin flow guides. These vertical fin flow guides may be reoriented in the direction of the arrow 218 of FIGS. 32E and 32F, such that the forced airflow 215 is reoriented as shown.

Thus far, the various embodiments described herein includes one bar 200. However, the drying apparatus is not limited to having one bar 200. For example, for a faster drying process, two or more bars may be used. All of the exemplary embodiments described herein may include one or more bars.

Figure 33:
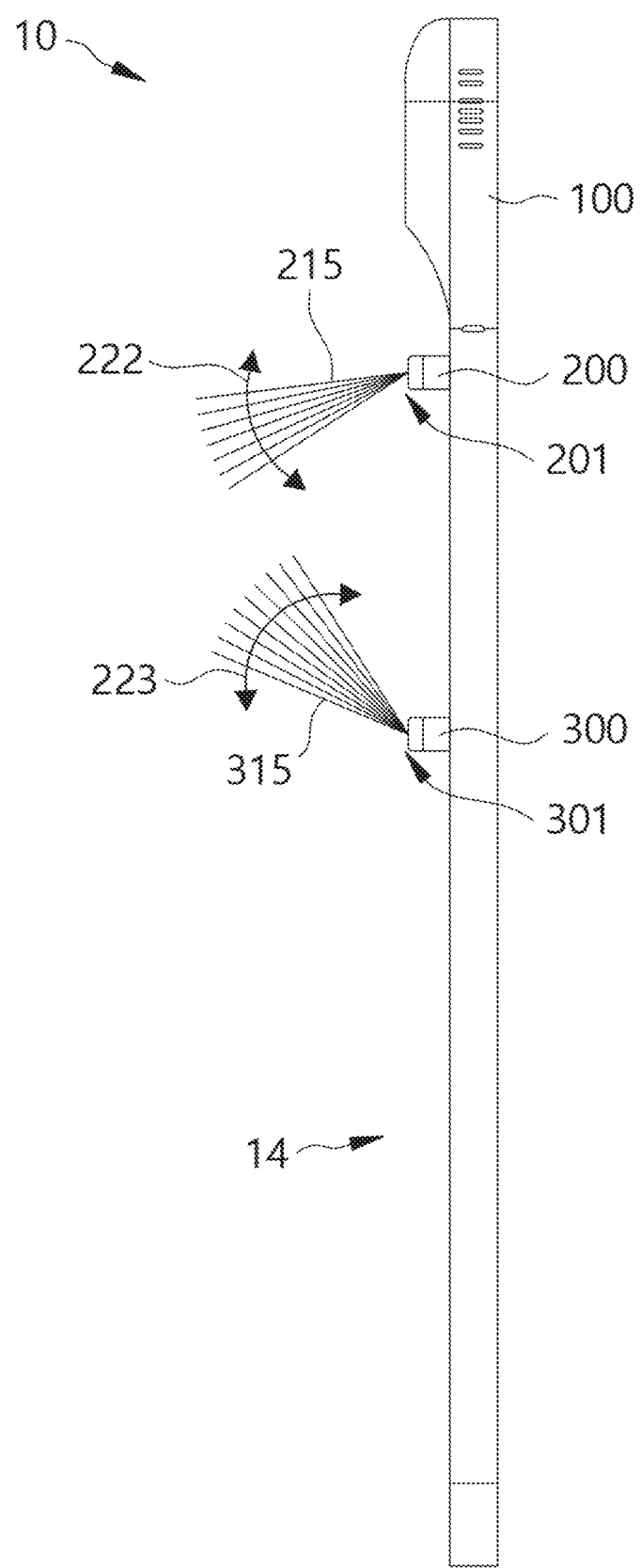
FIG. 33 is a side view of a drying apparatus having a first bar and a second bar according to an embodiment of the present invention.

FIG. 33 is a view of a drying apparatus having a first bar 200 and a second bar 300. As illustrated in FIG. 33, the second air outlet 201 of the first bar 200 may expel forced airflow 215 that may be reoriented in the direction of the arrow 222, and the third air outlet 301 of the second bar 300 may expel forced airflow 315 that may be reoriented in the direction of the arrow 223. The first bar 200 and the second bar 300 may work together to dry one specific area, as illustrated in FIG. 33.

Alternatively, each of the first bar 200 and the second bar 300 may be allocated individual areas to be dried. For example, when the area to be dried is a shower booth, the first bar 200 may be allocated to dry an upper portion of the shower booth and the second bar 300 may be allocated to dry a lower portion of the shower booth. The allocation described above is exemplary and the first bar 200 and second bar 300 may be allocated in various combinations to dry a given area.

Figure 34A:
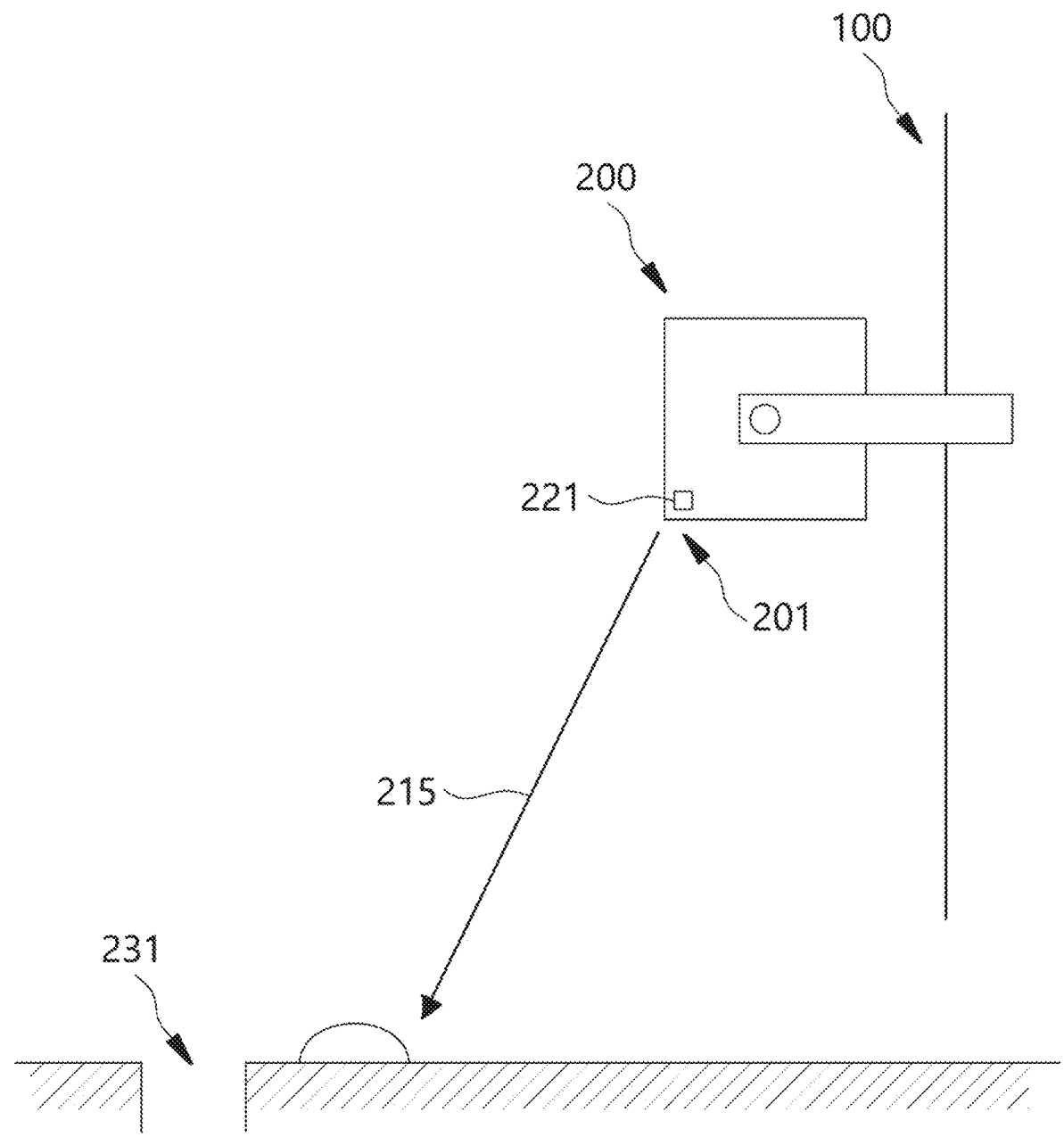
FIGS. 34A and 34B are side views showing a drying apparatus in use to sweep and/or evaporate residual water from a floor according to an embodiment of the present invention.
Figure 34B:
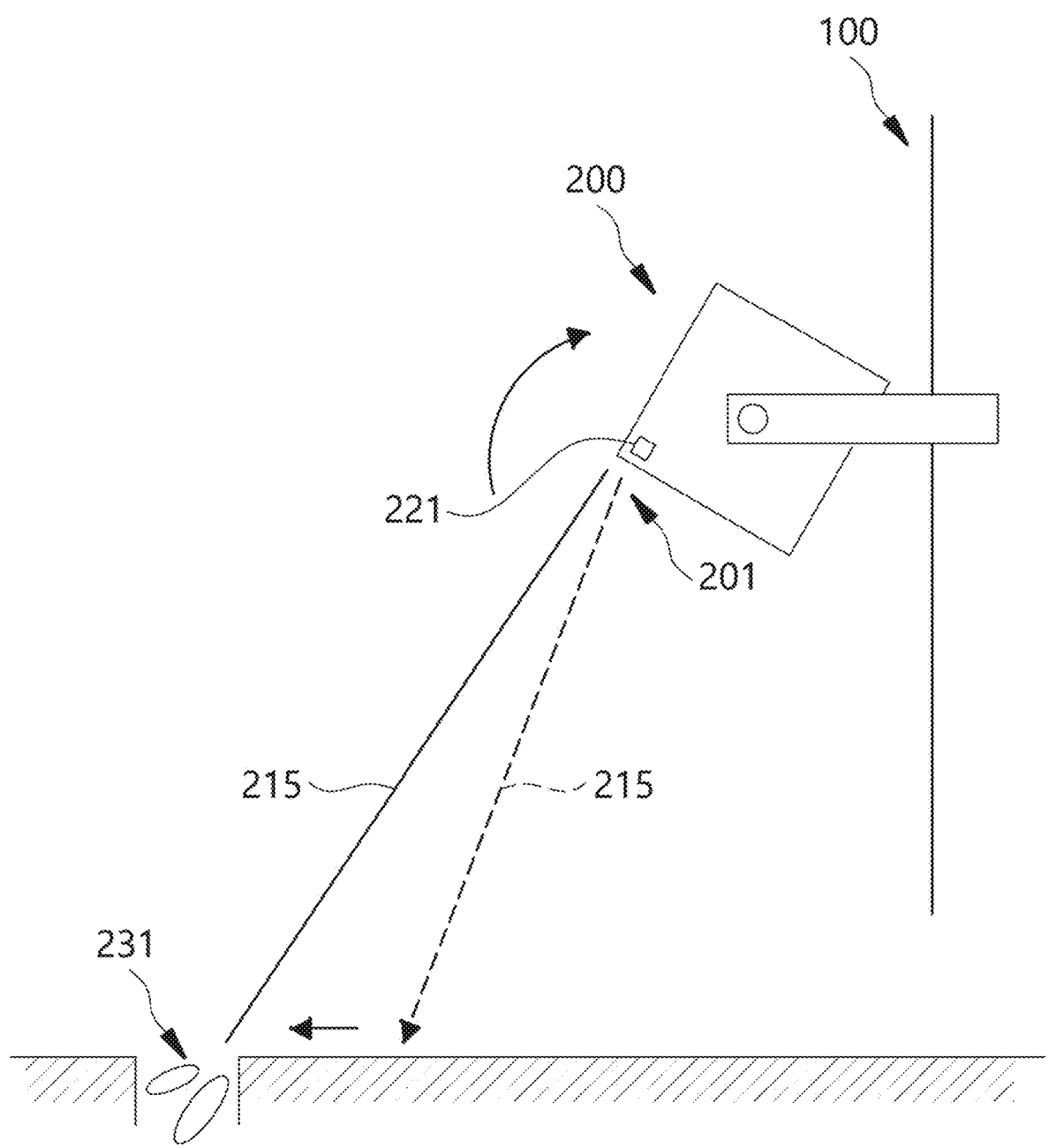

FIGS. 34A and 34B are side views showing a drying apparatus in use to sweep and/or evaporate residual water from a floor according to embodiment of the present invention.

In an exemplary embodiment, after a user has dried their body using the drying apparatus, the bar 200 may be moved vertically along the body 100 to be lowered to a lower portion of the first body 100, as illustrated in FIG. 34A. The sensor 221 located at the bar 200 may be used to sense a wetness of the floor. For example, the sensor 200 may be a thermal sensor, and may determine a wet area by sensing a cooler temperature of that area compared to the temperature of a dry area. In an exemplary embodiment, the bar 200 may be rotated so that the sensor 221 may swept across the floor thereby sensing a wider area if not the entirety of the floor. For purposes of illustration, the wet area will be described as water droplets.

When the sensor 221 has determined that a wet area exists on the floor, such as water droplets left by the user, the sensing information is signaled to the controller 53. The controller 53 then aligns the bar 200 so that the second air outlet 201 is facing the floor, and preferably, in the vicinity of the water droplets. At this position, the controller 53 may activate the bar flow generator 204 to generate forced airflow 215 through the second air outlet 201.

As illustrated in FIG. 34B, the controller 53 may rotate the bar 200 so that the forced airflow 215 is directed to blow the water droplets away from the drying apparatus. The forced airflow 215 may sweep the water droplets on the floor away from the drying apparatus, and if a drain is available, the forced airflow 215 may sweep the water droplets into a drain 231, as illustrated in FIG. 34B.

Once the water droplets have been swept, the controller 53 may use the sensor 221 to determine whether any residual water droplets exist. For example, the controller 53 may detect the presence of residual water droplets while returning the bar 200 to its position prior to the sweeping action. If the controller 53 detects any residual water droplets via the sensor 221, the controller 53 may perform the sweeping action repeatedly until the sensor 221 no longer detects any water droplets.

In another exemplary embodiment, the drying apparatus may expel hot air from the second air outlet 201 to evaporate the water droplets. When the sensor 221 senses that water droplets are present, the controller 53 may activate the resistive heater 120, described previously herein, while activating the bar flow generator 204. The controller 53 may direct the hot airflow to the area where water droplets are sensed until the sensor 221 senses that the area has dried.

Various configurations of the air outlet 201 may be used to sweep and/or evaporate the water droplets. An example may be an air outlet in the form of a nozzle, as illustrated in FIGS. 32A-32F. To be able to sweep and/or evaporate water droplets along a lateral direction, the nozzle may expand laterally or may be re-directed laterally, that is, the airflow may be moved toward the left and right based on the location of the water droplets.

The forms and configurations of the air outlet 201 are exemplary and other forms and configurations of the air outlet 201 may be used to achieve a desired result.

In another exemplary embodiment, the drying apparatus may automatically perform the sweeping action and/or evaporation of the wet areas based on a preset program after the user has dried themselves on the drying apparatus.

Figure 35:
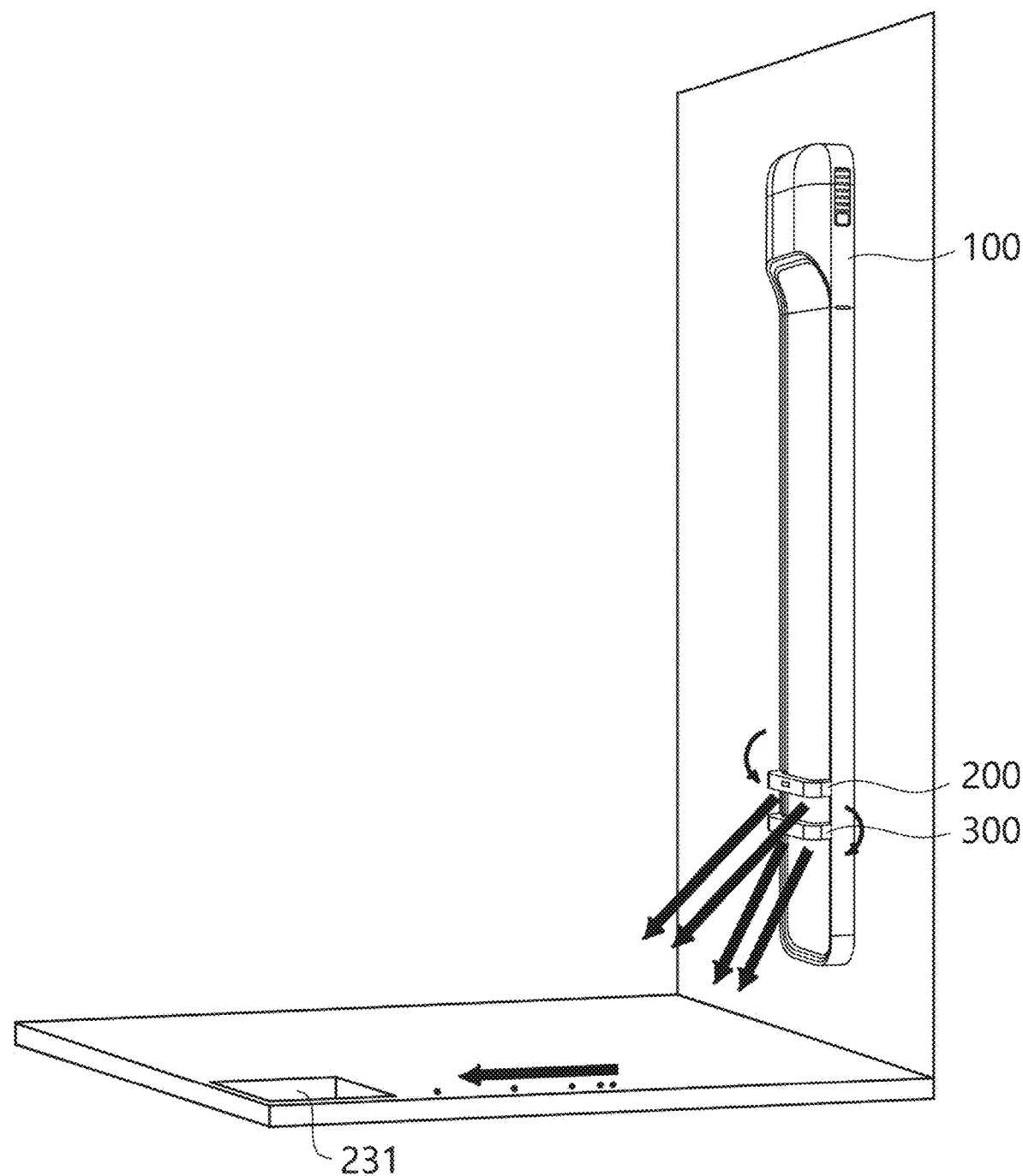
FIG. 35 is a side view of a drying apparatus including multiple bars according to an embodiment of the present invention.

FIG. 35 illustrates a drying apparatus having a first bar 200 and a second bar 300, which is used to sweep and/or evaporate residual water from a floor according to an exemplary embodiment of the present invention. For enhanced sweeping of water droplets, two bars, a first bar 200 and a second bar 300 may be used. The first bar 200 and the second bar 300 may operate individually or cooperatively. For example, the first bar 200 may perform a sweeping action to sweep the water droplets towards the drain 231, and the second bar 300 may perform a sweeping action that closely follows the first bar 200 to sweep residual water droplets left behind by the sweeping action of the first bar 200 into the drain 231.

In another exemplary embodiment, the first bar 200 and the second bar 300 may focus the forced airflow 215 and forced airflow 315, respectively, which may be hot air, to one wet area thereby increasing the evaporation of the focused wet area. In another exemplary embodiment, the first bar 200 may evaporate water droplets from a first wet area and the second bar 300 may evaporate water droplets from a second wet area different from the first wet area. By directing the first bar 200 and the second bar 300 to dry separate wet areas, faster drying of the floor may be achieved.

In another exemplary embodiment, the first bar 200 may perform a sweeping action that sweeps the water droplets on the floor into the drain 231. The second bar 300 may follow the first bar 200, but instead of performing a sweeping action of the residual water droplets left behind by the sweeping action of the first bar 200, the third body 300 may perform a drying action by evaporating the residual water droplets.

The forms and configurations, and mode of operation, of the first bar 200 and second bar 300 described above are exemplary and other forms and configurations may be used to achieve a desired result.

Figure 36:
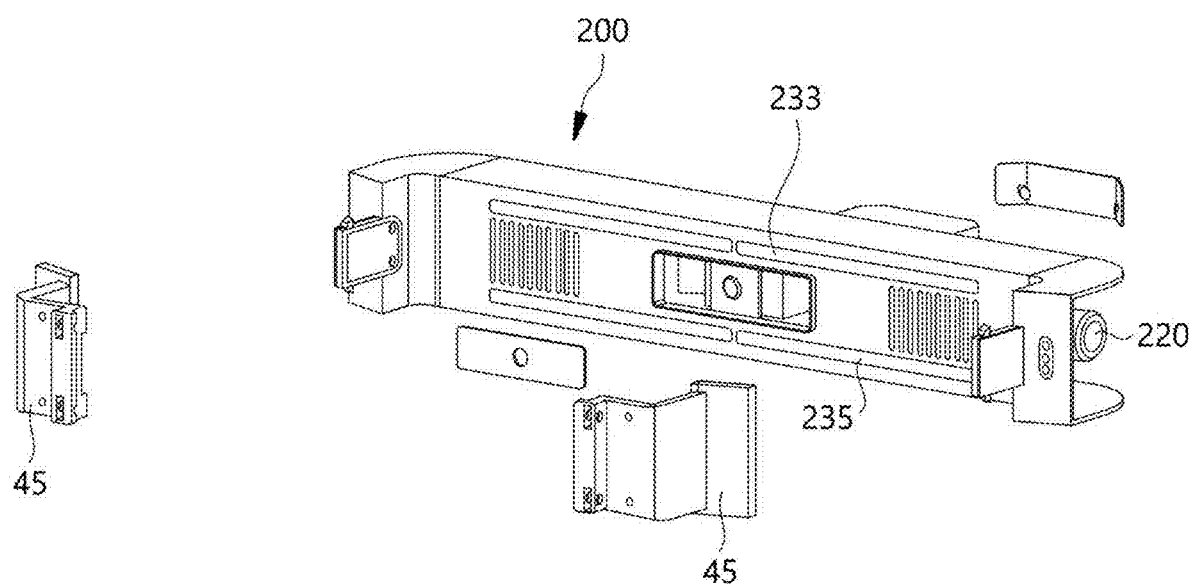
FIG. 36 is an illustration of a bar for disinfecting purposes according to an embodiment of the present invention.

FIG. 36 is an illustration of a bar 200 configured to be suitable for disinfecting purposes according to an exemplary embodiment of the present invention. Features of the bar 200, which have been previously described are not being repeated herewith and additional exemplary features are described below.

As illustrated in FIG. 36, one or more elongated slits 233 and one or more elongated ultraviolet (UV) light sources 235, such as UV light emitting diodes, may be positioned at a rear side of the bar 200. Forced airflow may be expelled from the one or more elongated slits 233.

The controller 53 may activate a resistive heater 120 and the second bar flow generator 204 of the bar 200, and dampers, fins or flow guides may be used to divert the hot air expelled by the second bar flow generator 204 from the air outlet 201 to the one or more elongated slits 233. The hot air expelled from the one or more elongated slits 233 may have a temperature sufficient to kill germs on contact and/or evaporate residual water remaining, for example on the body 100.

For illustration purposes, the one or more UV light sources are UV light emitting diodes (LED) 235, as illustrated in FIG. 36. However, other UV light sources such as UV lamps, may be used. Using UV light sources as a disinfectant, such as ultraviolet germicidal irradiation, is known. The UV light sources may be classified according to wavelength, such as UV-A (320-400 nm), UV-B (280-320 nm), and UV-C (100-280 nm). UV-A and UV-B are not particularly effective in killing germs, but UV-C is known to kill germs by destroying the nucleic acids and disrupting their DNA. In particular, UV radiation having a wavelength of approximately 265 nm have been shown to be highly effective in killing germs. However, prolonged exposure to UV-C may cause sunburn and even skin cancer. Prolonged exposure to UV-C may also lead to vision impairment including damage to the eye retina. Another undesirable effect of UV-C is that its exposure deteriorates plastic and rubber.

In another exemplary embodiment, the UV LED may be an LED operating at a wavelength of approximately 405 nm (violet), and approximately 460 nm (blue) which are known to kill germs. Blue light phototherapy results in absorption of blue light by the germs which subsequently causes membrane disruption. While not as effective as UV-C, 405 nm light is not as harmful to humans as UV-C or cause deterioration to plastics and rubber.

Figure 37A:
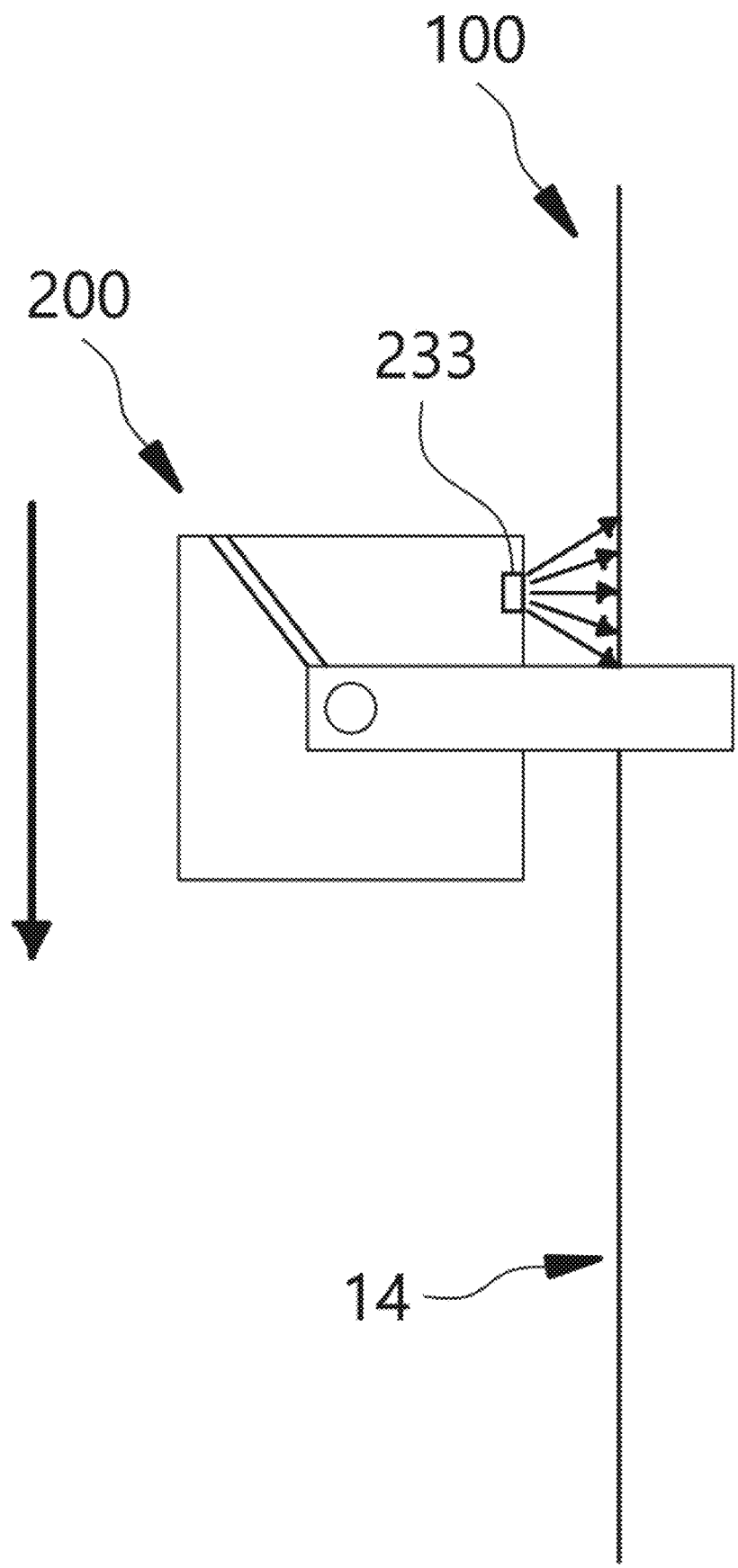
FIGS. 37A-37C and 38A-38C illustrate various orientations of the bar of the drying apparatus according to embodiments of the present invention.
Figure 37B:
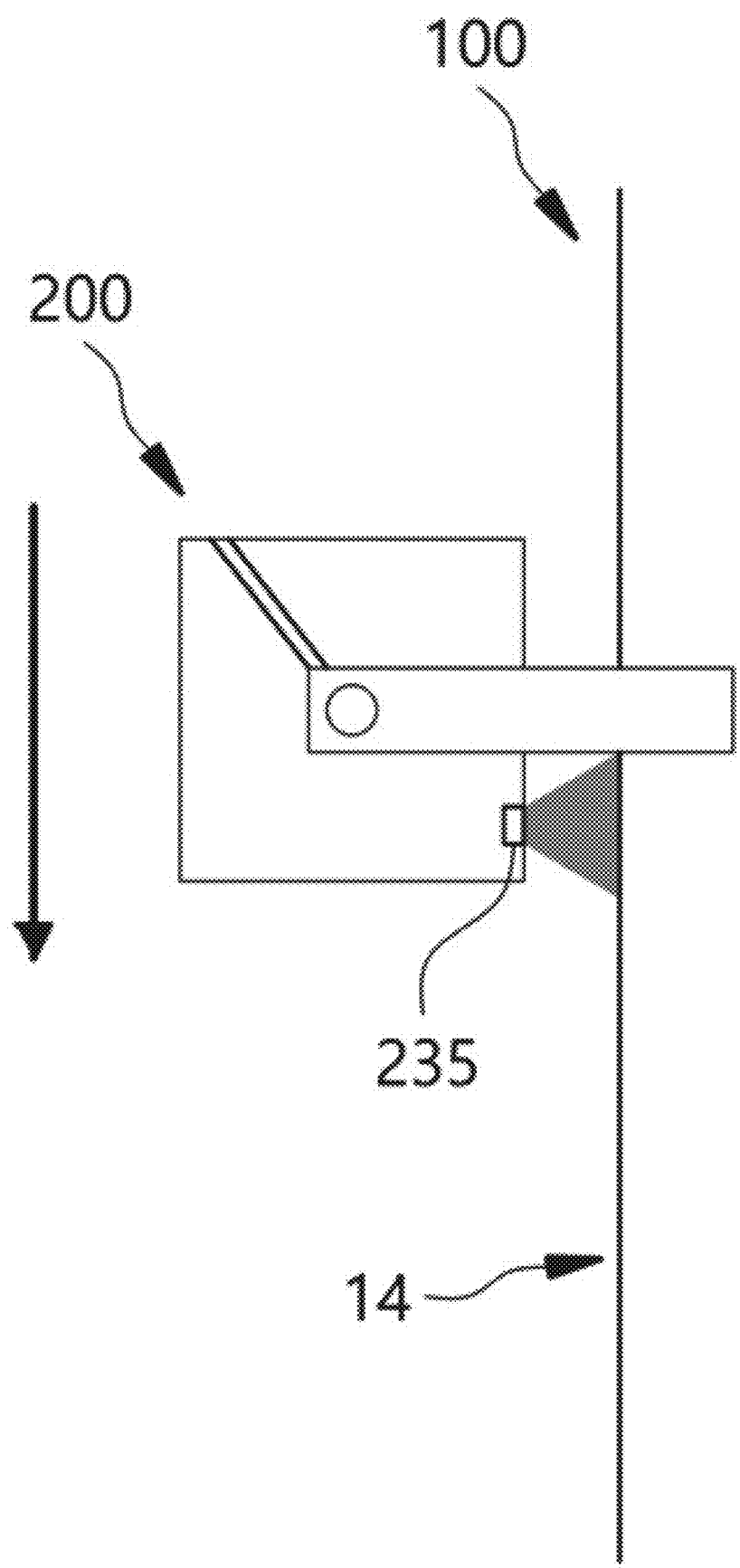
Figure 37C:
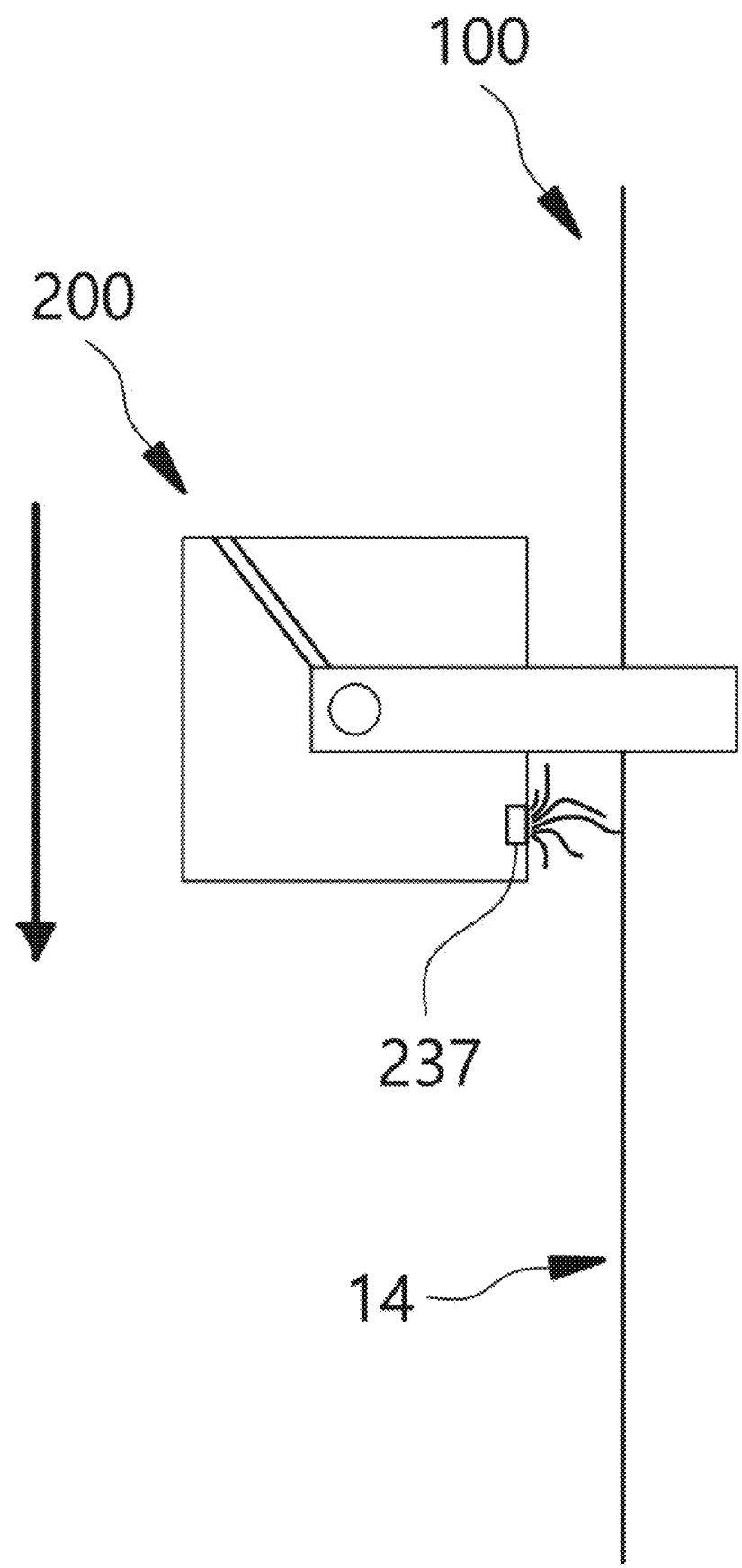

In another exemplary embodiment, the one or more elongated slits 233 or the UV light sources 235 may be replaced with an air ionizer 237, as illustrated in FIG. 37C. Alternatively, the air ionizer 237 may be added to the configuration illustrated in FIG. 36. The air ionizer 237 may be used to create positive and negative ions that may be used to purify the air by removing bacteria, dust, cigarette smoke, molds, soot, pollen, household odors, and the like. It has also been shown that ionized air may be effective against some viruses.

As illustrated in FIG. 36, the one or more elongated slits 233 and the UV light sources 235 are located at the rear side of the bar 200. However, the drying apparatus is not limited to this configuration, and the one or more elongated slits 233 and the UV light sources 235 may be located at the front side or one or more side surfaces of the bar 200. For example, one or more motors 220 may be used to rotate the bar 200 with respect to the body 100 to orient the one or more elongated slits 233 and/or the UV light sources 235 in a desired position.

FIGS. 37A-37C are side views illustrating the bar 200 when in use to disinfect or clean the body 100 according to exemplary embodiments of the present invention. As illustrated in FIGS. 37A-37C, one or more components, such as the elongated slits 233 and/or the UV light sources 235 located at the rear side of the bar 200 may be used to disinfect or clean the body 100. Alternatively, the one or more elongated slits 233 or the UV light sources 235 may be located at the front side or one of the sides of the bar 200 with the one or more motors 220 having rotated the bar 200 such that the one or more elongated slits 233 and/or the UV light sources 235 now face the body 100.

As illustrated in FIG. 37A, the one or more elongated slits 233 face the first body 100. The controller 53 may drive the second body 200 up and/or down with respect to the body 100. As the bar 200 travels along the first body 100, air or hot air may be expelled from the one or more elongated slits 233 to dry/disinfect the front surface or drying face 14 of the first body 100.

As illustrated in FIG. 37B, the one or more UV light sources 235 face the body 100. As the bar 200 travels along the first body 100, the front surface or the drying face 14 of the first body 100 may be exposed to the germ disinfecting UV radiation emitted from the UV light sources 235.

As illustrated in FIG. 37C, an air ionizer 237 faces the body 100. As the bar 200 travels along the body 100, the air ionizer 237 may generate positive and negative ions to purify the air, and disinfect the front surface or drying face 14 of the body 100.

The components shown in FIGS. 37A-37C may be used separately or in combination with each other to achieve a desired result. For example, while the bar 200 is traveling along the body 100, airflow from the one or more elongated slits 233 may dry/disinfect one part of the surface of the body 100, the UV light sources 235 may disinfect another part of the surface of the first body 100 and the air ionizer 237 may ionize the air around the body 100.

Figure 38A:
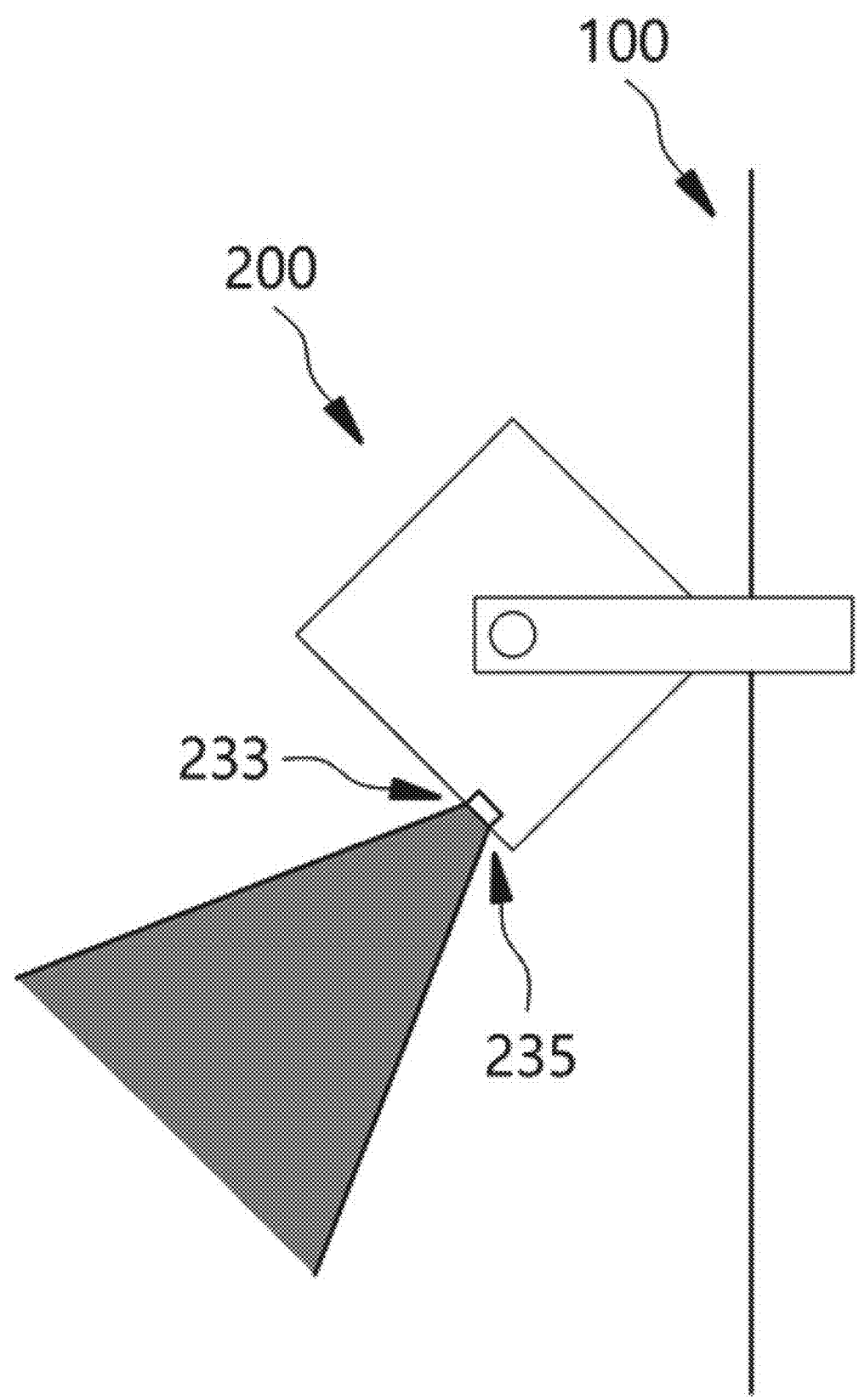
Figure 38B:
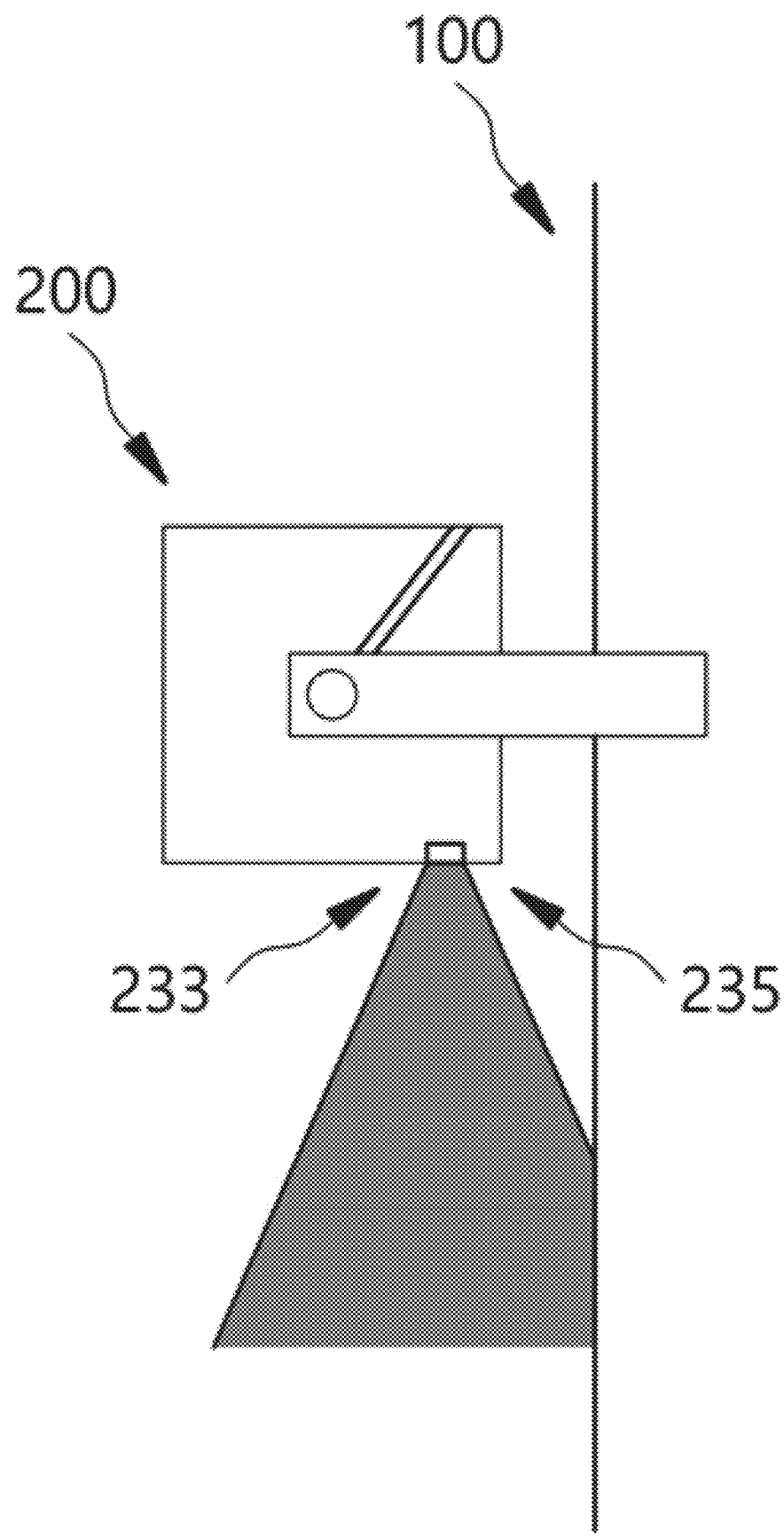
Figure 38C:
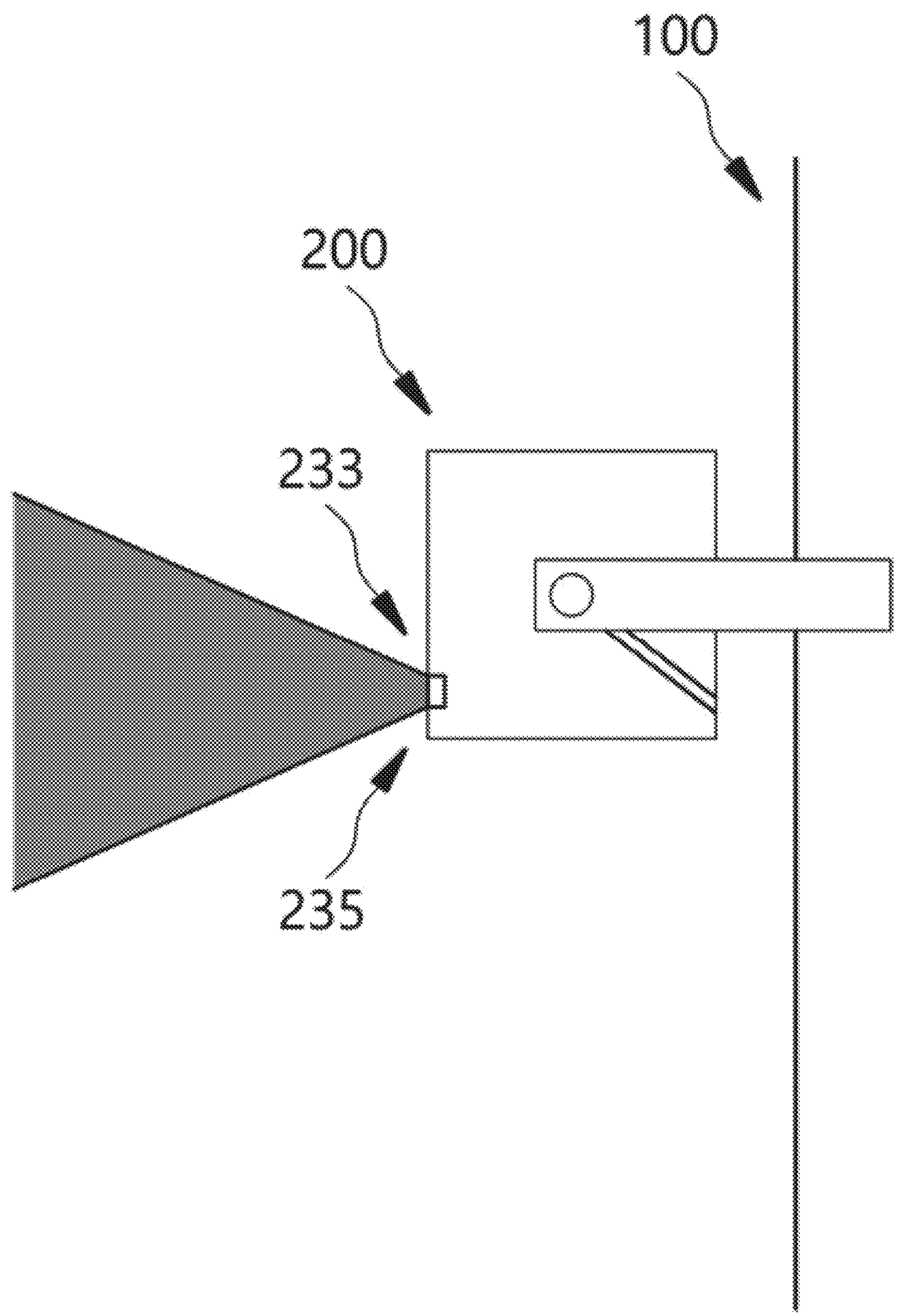

FIGS. 38A-38C are side views showing the bar 200 in use while being rotated according to embodiments of the present invention.

As illustrated in FIG. 38A, the bar 200 is angled with respect to the first body 100 such that the one or more elongated slits 233 and/or the UV light sources 235 may heat/disinfect a vicinity of the drying apparatus.

As illustrated in FIG. 38B, the bar 200 may be vertically aligned with the first body 100 such that the one or more elongated slits 233 and/or the one or more UV light sources 235 may heat/disinfect an area directly below the second body 200. For example, the one or more elongated slits 233 and/or the UV light sources 235 may heat/disinfect the floor below the bar 200.

As illustrated in FIG. 38C, the bar 200 may be orientated such that the one or more elongated slits 233 and/or the UV light sources 235 are facing away from the body 100, and the one or more elongated slits 233 and/or the US light sources may heat/disinfect an area away from the drying apparatus. Meanwhile, an air ionizer 237 (not shown) may ionize the surrounding air. In the exemplary embodiments, the air ionizer 237 may replace the one or more elongated slits 233 or the UV light sources 235.

In other embodiments, the one or more elongated slits 233 and the UV light sources 235 may be operated individually or together.

Figure 39:
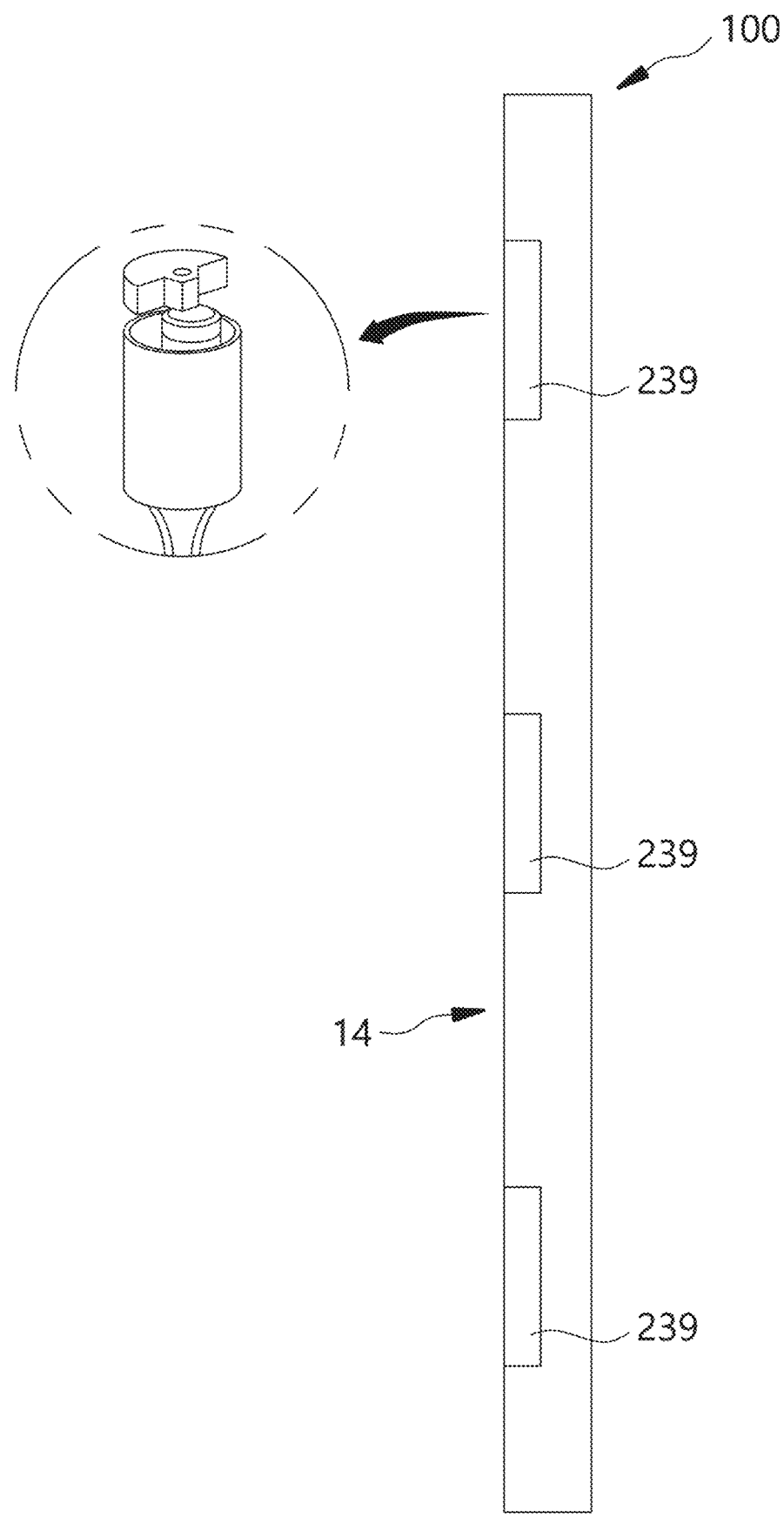
FIG. 39 is a side view of a drying apparatus including one or more vibration motors according to an embodiment of the present invention.

FIG. 39 is a side view of the body 100 including one or more vibration motors 239 according to an exemplary embodiment of the present invention. As illustrated in FIG. 39, one or more vibration motors 239 may be installed at one or more locations on the body 100. An example of a vibration motor 239 is shown in the enlarged portion of FIG. 39.

The vibration motor 239 may be a motor that includes an unbalanced mass at its shaft. When the motor is rotated, for example, under the control of the controller 53, the unbalanced mass acts to vibrate a surface, such as the front surface 14 of the body 100. The vibration of the one or more vibration motors 239 may result in water droplets being shaken off the body 100. Concurrently, or subsequently, the body 100 may be further dried by forced airflow 215 from the second air outlet 201 of the bar 200 as an additional process.

While airflow or hot air has been described as drying/disinfecting the front surface or drying face 14 of the body 100, in an alternate exemplary embodiment, ultrasonic waves generated by a transducer that includes a piezoelectric crystal may be used to remove water droplets. The piezoelectric crystal converts electrical energy (electric current) to mechanical energy (sound waves). In one exemplary embodiment, ultrasonication may be used to kill germs. Ultrasonication applied to liquids causes gas bubbles to form and then often collapse violently. Ultrasonication induced bubble formation or cavitation bubbles may kill various germs, and thus the transducer may replace or supplement the elongated slits 233 and/or the UV light sources 235.

The positioning and orientation of the outlets and any parts they depend from may be actively controlled, such as by the controller 53. During operation, the controller 53 may utilize inputs from one or more sensors to sense information about the user, such as their location or physical characteristics. The controller may additionally receive information regarding the positioning of the one or more outlets, and operate one or more associated drive mechanisms to provide a desired orientation of the outlets.

The outlets may be actively reoriented during a drying activity, for example in response to changes in the dryness of a user, the position of the user, or one or more user inputs. The control of the outlets may include performing oscillations or patterns of oscillations of the outlet orientations during drying.

In various exemplary embodiments, the bar 200 may receive at least some of an airflow generated by the one or more body flow generators 110 of the body 100. This may provide for an amplification of the airflow which is vented from the second air outlet 201 of the bar 200 in excess of the capacity of the bar flow generator 204.

The bar 200 may receive air from the body flow generators 110 by a connection to the body air outlet 101. Alternatively, the bar 200 may receive air through an airflow conduit between the body 100 and the bar 200. Such an airflow conduit may be selectively connectable.

Any airflow conduit between the body 100 and the bar 200 may be allowed to dynamically contract and extend according to the position of bar 200 relative to the body 100. To this end the conduit may comprise, for example, an accordion-form conduit which is capable of changes in its length to accommodate the different driven positions of the bar 200 on the body 100.

Exemplary embodiments of the drying apparatus have been described above. Embodiments may be modified for particular usage or suitability.

Where in the foregoing description reference has been made to elements or integers having known equivalents, then such equivalents are included as if they were individually set forth.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in a descriptive sense only and not for purposes of limitation, and also the technical scope of the invention is not limited to the embodiments. Furthermore, the present invention is defined not by the detailed description of the invention but by the appended claims, and all differences within the scope will be construed as being comprised in the present disclosure.

None of the features recited herein should be interpreted as invoking 35 U.S.C. § 112(f) unless the term "means" is explicitly used.

Many modifications will be apparent to those skilled in the art without departing from the scope of the present invention as herein described with reference to the accompanying drawings.

What is claimed is:

1. A forced airflow drying apparatus comprising:
a body including:
a pair of air inlets to receive inlet air which is channeled to an upstream side of a filter unit;
a pair of body airflow generators to receive inlet air to generate a first forced airflow;
a pair of thermoelectric devices configured to control a temperature of the first forced airflow; and
a first outlet, in communication with each body airflow generator, to receive the forced airflow from the body airflow generators and to expel the first forced airflow out of the body;
wherein the forced airflow drying apparatus further comprises:
a bar;
a first drive apparatus to movably drive the bar in a vertical direction relative to the body,
a second drive apparatus to rotate the bar along a horizontal axis relative to the first body; and
a controller to adjust the first and second driving apparatus,
wherein the bar comprises a second outlet and a second airflow generator to generate a second forced airflow, wherein the second forced airflow is expelled through the second outlet.

2. The drying apparatus of claim 1, further comprising a thermal sensor to sense a temperature of an area in need of drying.

3. The drying apparatus of claim 2, wherein the controller is configured to control the second drive apparatus to adjust the orientation of the second outlet based on information provided by the thermal sensor.

4. The drying apparatus of claim 3, wherein the controller is configured to control the second drive apparatus to orient the second outlet to perform a sweeping action.

5. The drying apparatus of claim 2, wherein the controller is configured to control the second forced airflow until the sensor indicates dryness.

6. The drying apparatus of claim 1, wherein the controller is configured to redirect the second forced airflow laterally in a left or a right direction relative to the body.

7. The drying apparatus of claim 1, wherein the controller is configured to expand or contract a degree of expansion of the second forced airflow.

8. The drying apparatus of claim 1, wherein the controller is configured to orient the second air outlet to face a front surface of the body.

9. The drying apparatus of claim 8, wherein the controller is configured to control the first drive apparatus to move the bar relative to the body, and orient the second forced airflow towards the front surface of the body.

10. The drying apparatus of claim 1, further comprising an ultraviolet (UV) light source disposed at the bar, wherein the controller is configured to control the first drive apparatus to move the bar relative to the body, and direct a UV light emitted from the UV light source towards a front surface of the body.

11. The drying apparatus of claim 10, wherein the UV light source emits UV light having a wavelength from 100 nm to 280 nm.

12. The drying apparatus of claim 10, wherein the UV light source emits UV light having a wavelength of 405 nm or 460 nm.

13. The drying apparatus of claim 1, further comprising a transducer disposed on the bar, wherein the controller is configured to control the second drive apparatus to move the bar relative to the body, and operate the transducer to generate an ultrasonic wave toward a front surface of the body.

14. The drying apparatus of claim 1, further comprising an ultraviolet (UV) light source at the bar, wherein the controller is configured to control the second drive apparatus to reposition the bar from a first position to a second position relative to the body, and control emission of UV light from the UV light source.

15. The drying apparatus of claim 1, further comprising an air ionizer disposed at the bar, wherein the controller is configured to control the second drive apparatus to reposition the bar from a first position to a second position relative to the body, and control generation of ionized air by the air ionizer.

16. The drying apparatus of claim 1, further comprising a plurality of vibration motors disposed at the body, wherein the controller is configured to control the plurality of vibration motors to vibrate a surface of the body.

17. The drying apparatus of claim 1, further comprising:
a second bar movable relative to the first bar and the body;
a third air inlet;
a third bar flow generator to receive inlet air from the third air inlet and generate a third forced airflow;
a third air outlet on the second bar for expelling the third forced airflow generated by the third flow generator;
a third drive apparatus to rotate the second bar along a horizontal axis with respect to the body,
wherein the controller is configured to control the third drive apparatus to adjust a position of the third air outlet.

18. The drying apparatus of claim 17, wherein the controller controls the orientation of the second and third air outlets, and the emission of the second and third forced airflow from the second and third air outlets, respectively.

19. The drying apparatus of claim 18, wherein the controller controls the second and third forced airflow to cooperatively sweep a wet area.

20. The drying apparatus of claim 1, wherein the drying apparatus is configured to automatically perform a sweeping action and/or evaporation of a wet area based on a preset program.

* * * * *